United States Patent [19]

Sokol et al.

[11] 4,376,298

[45] Mar. 8, 1983

[54] COMBINE DATA CENTER

[75] Inventors: David G. Sokol; Roger B. Whitaker, both of Auburn; John J. Lord, Springfield; David M. Beams, Virden, all of Ill.

[73] Assignee: Dickey-john Corporation, Auburn, Ill.

[21] Appl. No.: 175,906

[22] Filed: Aug. 6, 1980

[51] Int. Cl.³ .................. G06F 15/20; G08B 19/00; A01D 41/00
[52] U.S. Cl. .................. 364/551; 340/52 F; 340/684; 364/424; 364/580; 56/10.2
[58] Field of Search .................. 364/551, 579, 580; 340/52 F, 684, 517-526; 56/10.2, DIG. 15

[56] References Cited

U.S. PATENT DOCUMENTS

| | | | |
|---|---|---|---|
| 3,583,405 | 6/1971 | Gerhardt et al. | 340/684 X |
| 3,626,402 | 12/1971 | Price | 340/684 X |
| 3,739,367 | 6/1973 | Fathauer | 340/658 |
| 3,906,437 | 9/1975 | Brandwein et al. | 364/579 X |
| 3,935,866 | 2/1976 | Northup et al. | 56/DIG. 15 X |
| 3,988,577 | 10/1976 | Leitner et al. | 340/517 X |
| 4,068,223 | 1/1978 | Steffen | 340/684 X |
| 4,130,980 | 12/1978 | Fardal et al. | 56/10.2 |
| 4,145,746 | 3/1979 | Trussel et al. | 364/551 |
| 4,188,618 | 2/1980 | Weisbart | 364/424 |
| 4,246,566 | 1/1981 | Endo et al. | 340/52 F X |
| 4,258,421 | 3/1981 | Juhasz et al. | 340/52 F X |
| 4,267,569 | 5/1981 | Baumann et al. | 364/424 X |
| 4,271,402 | 6/1981 | Kastura et al. | 340/52 F |
| 4,296,409 | 10/1981 | Whitaker et al. | 340/684 |

Primary Examiner—Felix D. Gruber
Attorney, Agent, or Firm—Trexler, Bushnell & Wolters, Ltd.

[57] ABSTRACT

A modular monitoring and control system is provided for an agricultural machine such as a combine. The system includes an executive processing unit which is capable of cooperating with one or more monitoring and/or control modules, which module may be added to or deleted from the system for performing monitoring and control functions as desired by a particular operator. Conveniently, a video display unit provides alphanumeric display information to the operator regarding both the monitored and controlled functions of the combine machine as well as instructional messages for purposes of calibrating the monitoring and control system for operation with a particular combine. Moreover, the operator may select for a display in alphanumeric form suitable instructional information regarding any malfunctions of the combine and counter during operation and instructions for the correction thereof.

21 Claims, 18 Drawing Figures

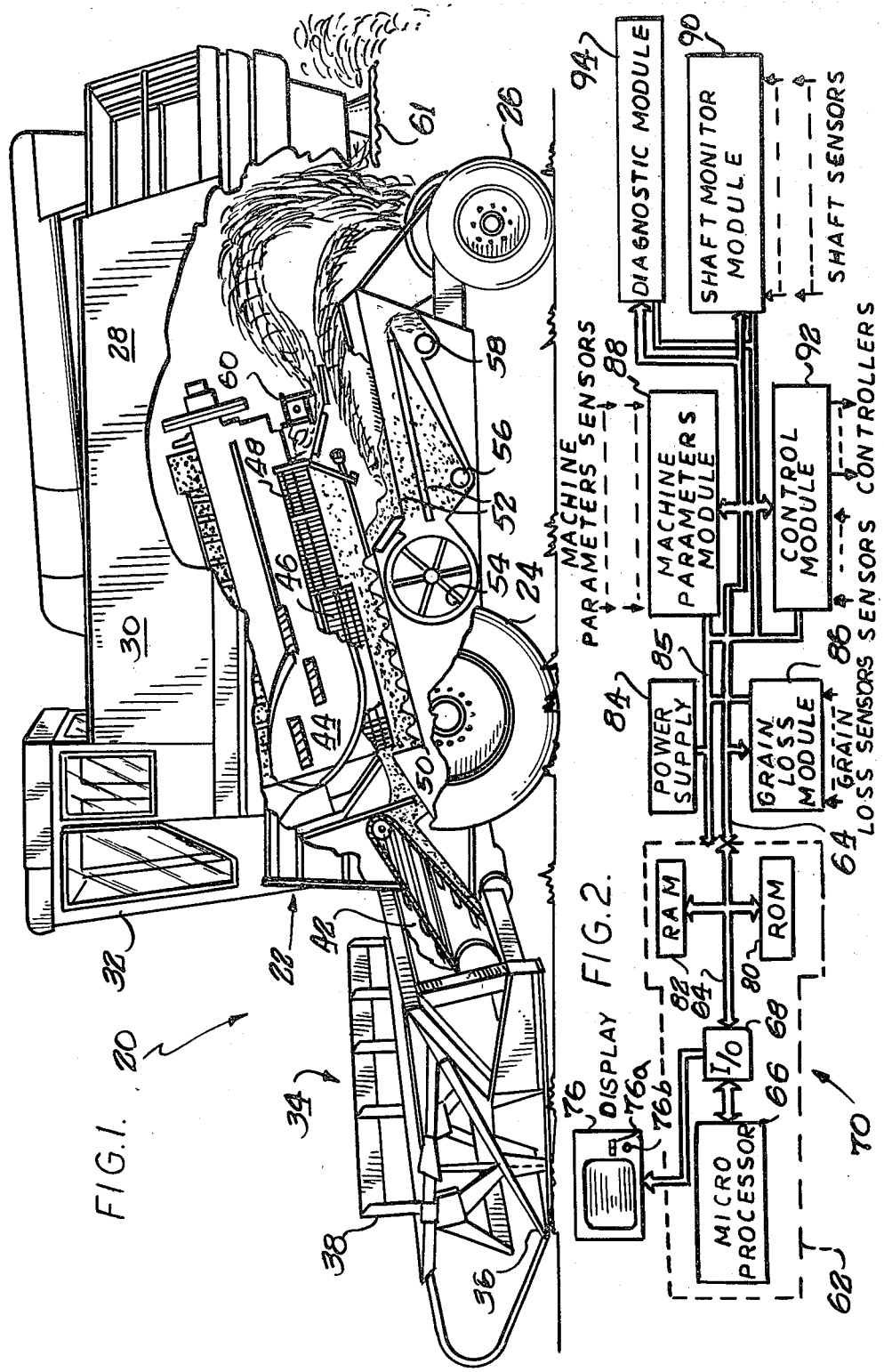

COMBINE DATA CENTER

BACKGROUND OF THE INVENTION

This invention relates to a monitoring and control system for complex machinery, and more particularly to such a system for monitoring and controlling the operation of a piece of farm machinery such as a combine.

While the present invention may find utility in various machinery, the disclosure will be facilitated by a reference to the monitoring and control of the operation of a harvesting machine such as a combine.

In modern harvesting machinery, the useful grain is separated from other parts of the plant as the machine moves over the field to be harvested. Such combines may be either self-propelled or pulled behind a tractor, utilizing a conventional power take-off from the tractor. Briefly, such combines generally perform a complete harvesting operation from the mowing or cutting down of the plants up to and including the separation of the useful grain portions from the plants and discharge of the chaff, stalks and other non-useful plant parts.

In such a combine, a plurality of machinery elements such as rotating shafts, belts and other drive parts are utilized to power the structures for carrying out all of the operations necessary to obtain the useful grain from the harvested plants. Moreover, most of these drive parts are driven from various power take-off arrangements from a main engine of the combine machine, or from a tractor drawing the machine, where the combine is not of the self-propelled type.

Additionally, it is known that the ratios between the ground speed of the combine and various of the moving shafts and other drive components should be held at predetermined values in order to achieve a given efficiency of combining operation. In this regard, the term "load control" is often utilized to refer to systems for properly coordinating the ground speed of the combine in order to obtain maximum efficiency in the combining operation for given crop density and field conditions.

Various apparatus for monitoring the operation of combines has been proposed in the past, specific examples being shown in the following U.S. Pat. Nos.: 3,515,144 to Morrison; 3,583,405 to Gerhardt; 3,610,252 to DeCoene et al; 3,638,659 to Dahlquest et al; and 3,797,502 to Reed et al. Additionally, one particularly useful monitoring and control system is disclosed in the co-pending application of Whitaker et al, Ser. No. 19,287, filed Mar. 12, 1979, now U.S. Pat. No. 4,296,409, and commonly assigned with the present application.

With the advent of modern electronic data processing components, a number of additional monitoring and control functions, as well as improved operation of a monitoring and control system for such a combine, have become feasible. For example, combine monitoring systems, with the exception of the aforementioned co-pending application, have heretofore been specifically designed for use with a particular make and model of combine machine. Even then, due to variations in construction and operation between combine machines of the same make and model, some difficulties may arise in properly adjusting or calibrating a given monitor for accurate and reliable operation with a given combine. The aforementioned co-pending application advantageously solves a number of these problems by including suitable controls accessible to a dealer, installer or the farmer himself for adjusting or calibrating the monitoring circuitry operation to a particular combine machine. Advantageously, the present invention offers some improvement in this regard, by automating a significant portion of the required calibration.

Additionally, combine monitoring systems heretofore known have generally been designed as integral systems, incorporating a predetermined and unchangeable number of monitoring functions. Accordingly, one desirous of purchasing such a system must decide which functions are appropriate to his particular operation and choose a monitoring system offering those functions. Should this purchaser later require the addition of other monitoring or control functions, he may well be required to purchase a complete new monitoring and control system, and realize a substantial loss on the one originally purchased. Moreover, a particular operator may require a combination of monitoring and control functions which is simply not available in heretofore known monitoring systems, or is available only in conjunction with a number of additional functions which the operator does not need or require and which add to the expense of the unit.

Advantageously, the monitoring system of the invention is modular in form, permitting a monitoring and control system to be substantially custom configured for a given operator's requirements. As such, even having once configured such a system it is still possible to add to or delete from the monitoring and control functions provided, at minimum cost and with minimum labor, should the operator's requirements change after initial configuration and installation.

Heretofore known monitoring systems, while often quite effective and accurate in their monitoring and reporting of the values of various combine operating parameters, have not heretofore been capable of "self-monitoring". That is to say, it has heretofore been up to the operator to determine from the displays or other readouts of values provided whether a given deviation in a value from an expected norm indicates a failure in a portion of the combine machine itself, or a failure on the part of some portion of the monitoring system. The present monitoring system, however, makes advantageous use of modern data processing equipment to form a number of self-diagnostic functions, thereby alerting the operator to possible malfunctions in parts of the monitoring system itself.

OBJECTS AND SUMMARY OF THE INVENTION

Accordingly, it is a general object of the present invention to provide a novel and improved monitoring and control system for a complex piece of farm machinery such as a combine.

A more specific object is to provide such a monitoring and control system which substantially automatically performs necessary calibration and adjustment operation for use thereof with a particular combine machine.

Another object is to provide such a monitoring and control system which is capable of performing a number of self-diagnostic functions, alerting the operator to possible malfunctions in parts of the monitoring system itself.

Yet another object is to provide such a monitoring and control system which is substantially modular in its design, permitting a system to be substantially custom-configured to the needs of a particular operator.

BRIEF DESCRIPTION OF THE DRAWINGS

The foregoing as well as other objects, features and advantages of the present invention will be more readily appreciated upon consideration of the following detailed description of the illustrated embodiment, together with the accompanying drawings, wherein:

FIG. 1 is a side elevation, partially broken away and partially in schematic form of a combine machine;

FIG. 2 is a circuit diagram, in block schematic form, of the novel monitoring and control system of the invention;

DETAILED DESCRIPTION OF THE ILLUSTRATED EMBODIMENT

Figure 3A:
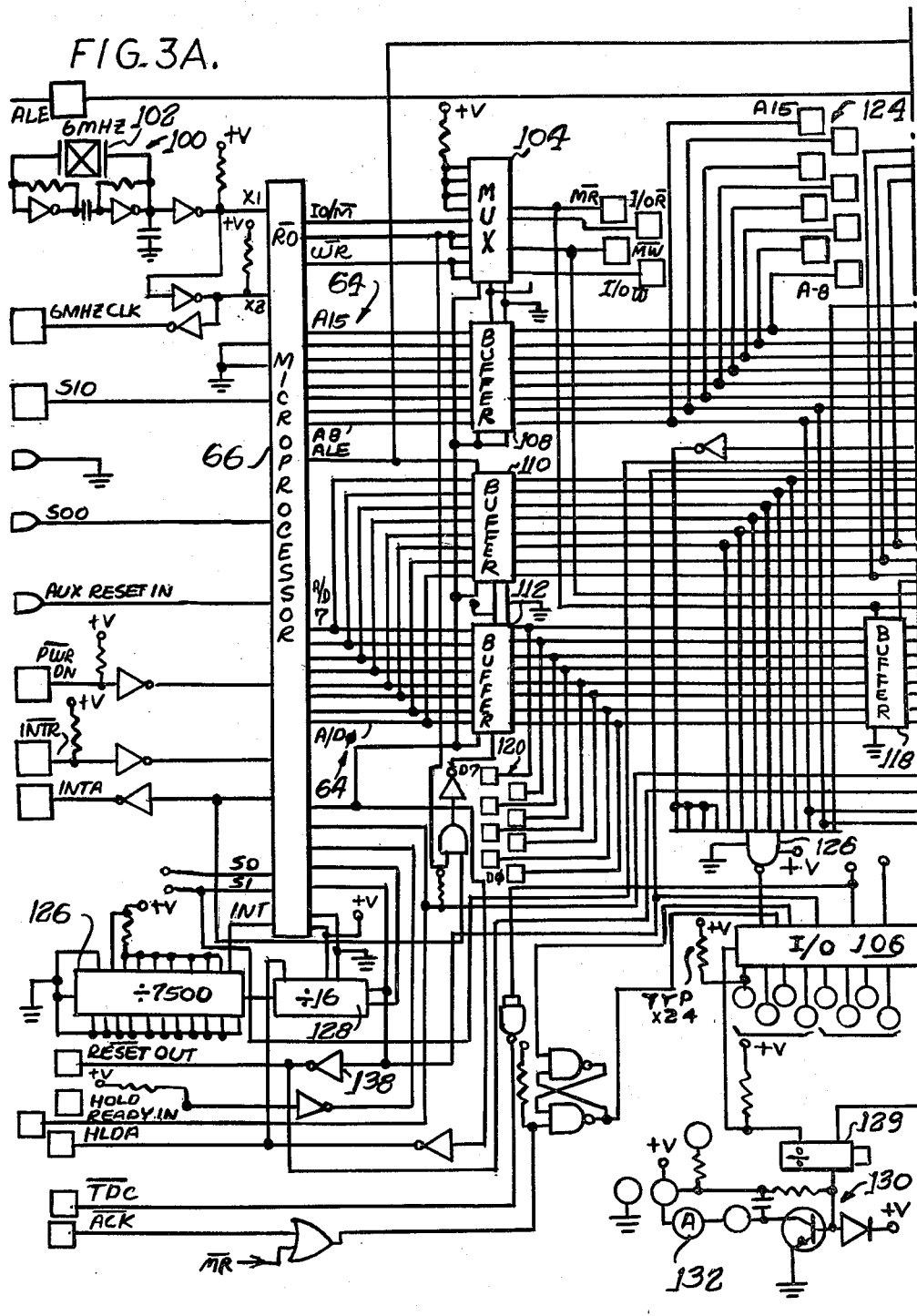
FIGS. 3A and 3B together form a circuit schematic diagram of an executive processor modular component of the monitoring system of the invention.

The means, apparatus and structure by which the novel improvements in accordance with the invention are achieved in the exemplary embodiment described herein comprise various microprocessor components and associated memories, registers or storage spaces, together with specific routines or programs for the control of the respective apparatus or means by the central control unit or executive processor.

Referring now to the drawings and initially to FIG. 1, a typical combine machine of the self-propelled type is designated generally by the reference numeral 20. Other types of combines are known in the art, for example combines which are pulled behind a tractor with a suitable power take-off. The invention will be understood from the following description to be readily applicable to either type of combine machine. Moreover, the specific structures of the combine 20 to be hereinafter described may vary somewhat in their proportions or arrangements in different combine machines, the present disclosure being that of an exemplary or "typical" combine machine.

In accordance with conventional construction, the combine 20 includes a main frame or body 22 carried on a pair of forward drive wheels 24 and a pair of steerable rear wheels 26.

An engine 28 is mounted generally in the top portion of the body 22 and a grain tank or storage bin 30 is carried on the body 22 generally in the front of the engine 28. An operator's station or cab 32 is located generally in front of this grain tank or storage bin 30. The operator's station 32 includes both conventional controls (not shown) for the operation of the combine 20 and also a control and display panel (shown schematically in FIG. 2) of the monitoring and control system of the present invention.

Other conventional features of the combine 20 include a forwardly disposed header or harvesting platform, designated generally 34, which includes a mowing board 36, above which is rotatably mounted a reel 38 which propels the mowed crop rearwardly into a transversely mounted auger (not shown). This auger carries the mowed crop to the base of a conveyor 42 which then carries the crop upwardly and rearwardly to a threshing apparatus. This threshing apparatus includes a rotating threshing drum or cylinder 44 which detaches grain from the crop material by its threshing action in cooperation with a concave or stationary cylinder member 46. In the illustrated embodiment, the flow of the crop material over the threshing drum 44 is generally in an axial direction. Other combine structures are known, however, wherein the threshing drum structure is mounted transversely of the direction of travel of the combine and hence the flow is substantially radially around the threshing cylinder. The present invention is equally useful in conjunction with either type of combine machine.

Residue material from the threshing cylinder 46 is then propelled rearwardly onto a screen 48, and detached grain flowing from the concave or cylinder 46 and screen 48 onto a conveyor auger 50 which carries the grain rearwardly to one or more fore-and-aft extending shakers or sieves 52, which further reciprocate in the fore-and-aft direction. The chaff or other plant material which falls onto the shakers or sieves 52 is then separated from the grain by the action of a large blower or fan 54 which blows the lighter chaff material outwardly to be discarded along with the plant residue material propelled to the end of the threshing cylinder 44. The separated grain falls through the sieves into a clean grain conveyor 56, which delivers the separated grain to the grain tank or storage bin 30. Unseparated material propelled to the rear of the shakers or sieves 52 is delivered to a tailings conveyor 58 which delivers the unseparated grain back to the threshing drum 44 for a second pass through the intervening structures. Suitable choppers and/or spreaders 60, 61 may also be provided rearwardly of the chaff and waste plant material outlets, to spread the discharged residue material over the field in the wake of the combine machine.

Also in accordance with the conventional practice, one or more temperature sensors, pressure sensors and/or RPM sensors (not shown) are associated with the engine 30 for monitoring the operation thereof. Additionally, a number of tachometer or rotation sensors (not shown) are provided for drive shafts or other rotating drive components associated with the moving parts thus far mentioned. Other suitable switch components or sensors are also provided for detecting the level of grain in the storage bin 30 and for detecting the level of crop material deposited above the chaffers or sieves 52. Similarly, sensors are provided for monitoring the rotational speed of the reel 38 and the height of the header 34 and cutter bar 36 thereof.

Suitable grain loss sensors of known construction may also be positioned at various locations in the combine, to detect the amount of separated grain passing through these locations. The structure and function of such grain loss sensors and theory of operation thereof in estimating grain loss is more fully set forth, for example in the Paper "Combine-Harvester Grain Loss Monitor" by W. B. Reed et al, Paper Number 68-607 presented at the 1968 Winter Meeting of the American Society of Agricultural Engineers, Dec. 10-13, 1968. Suffice it to say that these sensors comprise pressure sensitive transducers or impact sensors, such that grain falling thereon produces detectable pulse signals. Under normal harvesting conditions, the loss of grain in the harvesting operation may be estimated to a known degree of accuracy by monitoring the grain flowing through various portions of the combine machine. Moreover, a definite correlation exists between the amount of grain detected at these various points and the grain loss of the combine as a whole. This correlation is a good indicator of the efficiency of operation of the combine machine 20.

The foregoing represents a conventional combine construction, together with a representative arrangement of conventional sensors for monitoring the operation of various structures of the combine.

Reference is next invited to FIG. 2, wherein a monitoring and control system in accordance with the present invention is illustrated in block diagrammatic form. In accordance with a feature of the invention, this monitoring and control system, designated generally by the reference numeral 70 is modular in form, so that various components thereof may be selectively included or omitted so as to configure a monitoring and control system as required by a particular operator. The block diagram of FIG. 2, however, includes an exemplary one of each modular component.

In this regard, an executive processor module 62 comprises a master monitoring and control component, and is provided with a bidirectional data bus 64 for selective interconnection with the other components of the system. This executive processor 62 preferably comprises a programmed special purpose computer of microprocessor 66 for processing the information received by way of a suitable input/output (I/O) port 68 and from the bidirectional data bus 64, for example, for display to the operator of the combine of suitable combine operating parameters. The executive processor 62 also provides master control of the operation of the other modules by way of the bidirectional data bus 64.

In accordance with another feature of the invention, a novel display unit 76 is driven by the executive processor 62 to provide the aforementioned display of information to the operator. Advantageously, this display unit 76 comprises a CRT or video unit, capable of displaying a plurality of lines of alphanumeric information. As will be discussed later, in addition to displaying information related to the operation of the combine, various diagnostic information regarding the operation of the monitoring system and associated sensors may also be displayed thereon. Moreover, under the control of executive processor 62 and a pair of operator accessible control members or switches 76a, 76b, the video display unit 76 also displays suitable informational messages to the operator, for example, regarding the proper calibration of the monitoring and control system 70 for use with a particular combine. Other instructional messages are also provided, directed to the correction or repair of any problems detected in the operation of the combine itself or in the operation of any of the sensors mentioned above or the wires or cables coupling these sensors with the monitoring and control system 70.

The executive processor 62 also includes suitable memory components 80, 82. These memory components 80 and 82 preferably include ROM-type or non-volatile memory components 80 for storing permanent, non-alterable information for operation of the system 70. This memory portion of the system also includes RAM-type or reprogrammable memory components 82 for accommodating changeable information, for example for accommodating the calibration of the system 70 for operation in conjunction with a particular combine machine. These memory components 80, 82 are coupled by the data bus 64 to the microprocessor 66 and to other components of the system 70. A suitable power supply 84 is also provided and is coupled by cable 85 to the other components of the system 70.

A grain loss module 86 is also coupled wth the bidirectional data bus 64. This grain loss module 86 receives input signals from one or more grain loss sensors, which as mentioned above are mounted at suitable locations in the combine machine for detecting the amount of grain passing through such locations. The grain loss module 86 is advantageously configured to process the information received from the grain loss sensors into data in a form usable by the executive processor 62. For example, this data may be stored in the RAM-type memory components 82, to be displayed in real time in accordance with a predetermined display sequence or as called upon by the operator.

Similarly, a machine parameters module 88 is coupled with the various sensors mentioned above associated with the combine engine, for example oil pressure and temperature sensors. This machine parameters module 88 also comprises processing components for processing the signals received from the machine parameters sensors into data in suitable form to be passed out on the bidirectional data bus 64 to the executive processor 62 and/or RAM 82.

In similar fashion, a shaft monitor module 90 is coupled with the bidirectional data bus 64 and receives input from the shaft sensors or rotational sensors mentioned above which are provided at suitable points on the various shafts, rotating bodies and/or drive mechanisms within the combine machine. In similar fashion to the above-mentioned modules, this shaft monitor module 90 includes suitable processing components for converting the shaft sensor input signals to data in a form usable by the executive processor 62 and/or RAM 82.

A control module 92 is also coupled with the bidirectional data bus 64 and receives inputs from one or more sensors such as a reel speed sensor or a header height sensor. This control module 92 also includes suitable processing components for converting the input signals received from these sensors into data in a form usable by the executive processor 62 and RAM 82. Additionally, the control module 92 includes suitable control components for producing control signals to regulate the sensed component to achieve a desired or preselected operation thereof, for example the reel speed or the header height. This desired operation may be selected by the operator for maximizing the efficiency of the combine operation. These control components drive suitable load controllers which may comprise electrical or hydraulic apparatus for setting the height of the header 34 or cutter bar 36 or the speed of the reel 38. In this way, maximum efficiency of combine operation may be automatically controlled by the control module 92, in conjunction with the executive processor 62.

In one form, the control module 92 comprises a load control module which receives input from one or more selected load sensors which may comprise selected ones of the shaft sensors mentioned above. These selected load or shaft sensors preferably are those associated with rotating parts of the combine machine whose operation or rotational speed varies in a detectable way in response to varying loads imposed thereon by the incoming crop material during the combining operation. This load control module also includes suitable processing components, to be described later, which are capable of operation independently of the executive processor 62 for converting the input signals received from these selected sensors and to control signals for output to controllers which control the ground speed of the combine. Since there is a predetermined relationship between the ground speed of the combine and the rate of operation of the various rotating components thereof, control of the ground speed thereby controls the load imposed upon these components during the combining operation. That is, for given crop conditions, a proper setting of the ground speed of the combine can ensure optimum efficiency thereof by controlling the intake of crop material and hence the load imposed upon various of the internal operating systems and components of the combine.

In accordance with one practical and preferred embodiment of the invention, a diagnostics module 94 is also coupled with the data bus 64. Preferably, this diagnostics module 94 comprises memory components containing data corresponding to the expected values of the signals to be produced by each of the sensors associated with the monitoring and control system 70. Additionally, this data includes information regarding various possible failure modes of the sensors, such as an open-circuit or closed-circuit condition of the sensor or of the cable joining the sensor with the system 70, or other such faults which would result in sensor output signals outside of expected range of operating values of a properly functioning sensor. Accordingly, the data from the diagnostics module 94 may be compared by the executive processor 62 with the actual data received from the sensors in order to determine if the sensors and connecting cables are functioning properly. To this end, the diagnostics module also preferably contains data of an instructional nature for displaying instructional messages to the operator on the video display unit 76 in the event that an improperly functioning sensor or cable is encountered. Such instructional messages preferably include not only identification of the malfunctioning sensor or cable and the nature of the malfunction, but also instructions regarding proper repair or replacement of the sensor or cable for correction of the identified malfunction.

The details of the structure and operation of the circuit blocks illustrated in FIG. 2, as well as the portions thereof responsible for the operations discussed hereinabove will be more readily appreciated now upon reference to the remaining figures of the drawings.

Figure 3B:
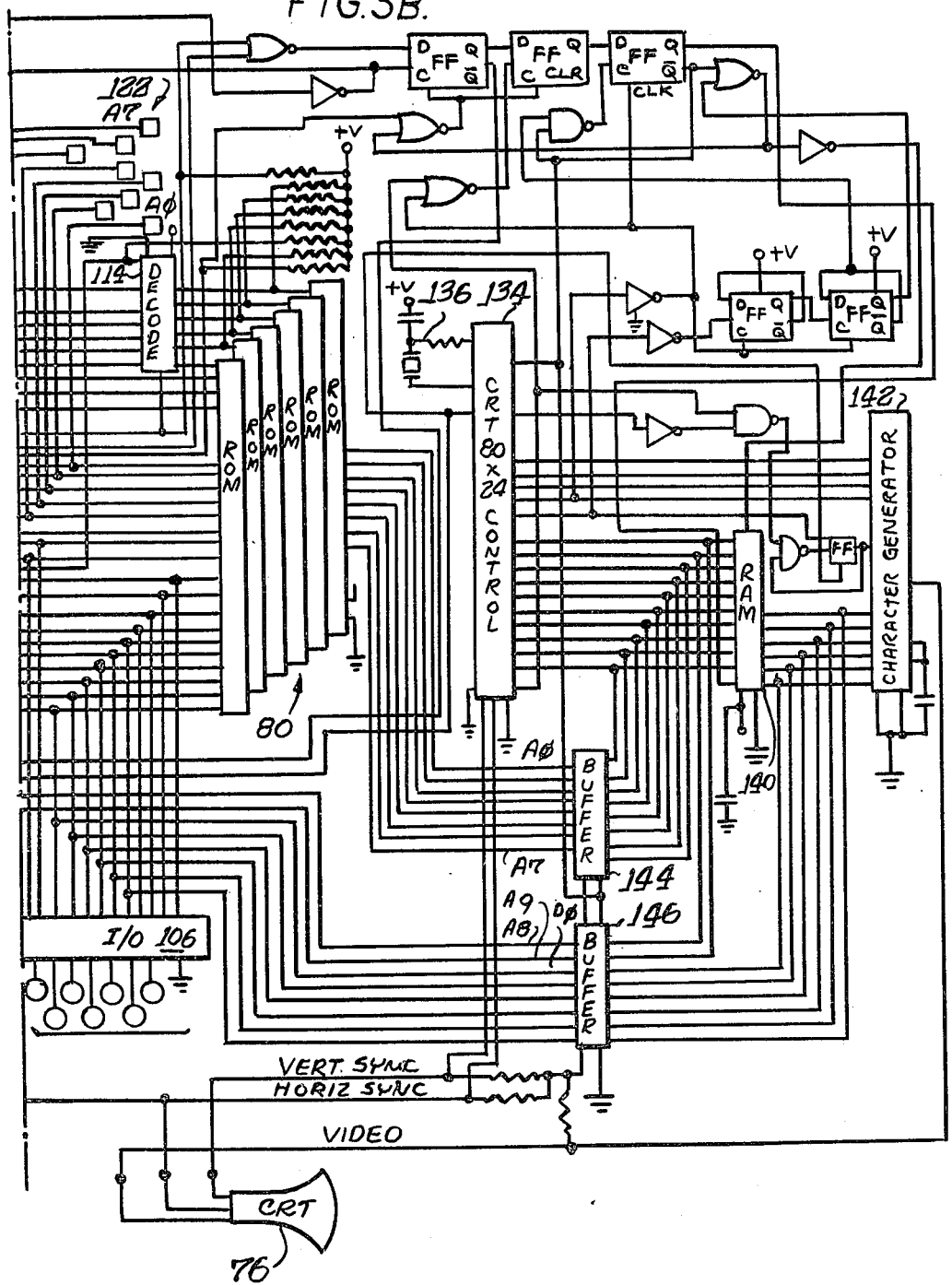

Referring now to FIGS. 3A and 3B, a detailed circuit diagram of the microprocessor 66 and I/O and a portion of the ROM 80 and FIG. 2 are illustrated. A remaining portion of the ROM 80 and RAM 82 of FIG. 2 will be discussed immediately hereinbelow with reference to FIGS. 4A and 4B.

Reference is initially directed to FIGS. 3A and 3B wherein the microprocessor 66 is illustrated together with its various input and output connections. A master timing or clock control signal of on the order of 6 megahertz is provided by a suitable oscillator circuit designated generally 100 which includes a 6 megahertz crystal 102. The outputs of this oscillator circuit are fed to $X_1$ and $X_2$ inputs of the microprocessor 66. In the illustrated embodiment, this microprocessor 66 is of the type generally designated 8085A manufactured by Intel. This microprocessor 66 is an eight-bit processor having a sixteen-bit address bus, the first or lowest order eight bits of which are multiplexed with and eight-bit data bus. This eight-bit data bus an sixteen-bit address bus together form the data bus 64 of FIG. 2. Additional inputs to the microprocessor 66 include an auxiliary reset input (AUX RESET), a power down ($\overline{\text{PWR DN}}$), an interrupt input ($\overline{\text{INTR}}$), a hold ($\overline{\text{HOLD}}$) input and (READY) input. Outputs include an IO/$\overline{\text{M}}$ output, an $\overline{\text{RD}}$ output and a $\overline{\text{WR}}$ output, in addition to the above-mentioned address and data bus outputs. Additional outputs include outputs designated HLDA and $\overline{\text{RESET}}$ OUT. These inputs and outputs are provided with suitable buffers and suitable pullups to a positive voltage supply as indicated in FIG. 3A.

The memory addressing and read/write control provided by the IO/$\overline{\text{M}}$, $\overline{\text{RO}}$ and $\overline{\text{WR}}$ outputs is fed through a data selector or multiplexer 104 (e.g., 74LS257) which produces therefrom suitable memory write ($\overline{\text{MW}}$), memory read ($\overline{\text{MR}}$), and I/O write (I/O $\overline{\text{W}}$) and I/O read (I/O $\overline{\text{R}}$) control outputs for controlling, writing and reading from the associated memory components and for reading or writing with respect to an I/O port 106, part of which is also shown in FIG. 3B and which will be discussed further hereinbelow. A plurality of buffers 108 (e.g., 74LS244), 110 (e.g., 74LS373) and 112 (e.g., 74LS245) interconnect the address and data bus lines with additional components of FIG. 3B. In particular, the buffer 108 joins the highest order eight bits of the address lines with an address decoder 114 (e.g., 74LS288) of FIG. 3B and with address inputs of a plurality of ROM components designated generally by the reference numeral 80, which forms a portion of the ROM 80 of FIG. 2. The buffer 112 bidirectionally joins the multiplexed data bus lines and lower order address lines with a similar bidirectional buffer 118 (e.g., 74LS245), this second buffer 118 being coupled with further data inputs of the ROM's 80. Selection of one or more of these buffers 110, 112 effectively demultiplexes the multiplexed address and data outputs from the microprocessor 66 in order to feed the respective address or data information thereof out on separate address and data busses. In this regard, these data busses are indicated generally by the reference numeral 120 while the address busses thus demultiplexed are indicated by the reference numeral 122 in FIG. 3B. The remaining address lines fed through the buffer 108 are similarly indicated generally by reference numeral 124 where they are fed out from the circuit of FIG. 3A. Suitable select logic for the multiplexer 104 and buffers 108, 110 and 112 is provided as illustrated at the lower left-hand portion of FIG. 3A.

Additionally, at the lower left-hand portion of FIG. 3A a divide-by-7500 divider chain 126 and a divide-by-16 divider chain 128 are joined together to provide a master interrupt sequence of pulses for the microprocessor 66 from the 6 megahertz clock signal input. In this regard, the microprocessor is arranged to provide a control sequence of reading and writing with respect to various peripheral components which include the various modules described above with reference to FIG. 2, on a repeating cycle of substantially one second duration. In particular, 24 separate time slots are provided within this cycle, each of substantially 41 milliseconds duration. Each of these 41 millisecond time slots is sufficient for carrying out one complete scan or read/write cycle of the entire system illustrated in block form in FIG. 2 and performing necessary monitoring and control functions. Moreover, the 41 millisecond time slots are sufficiently close to ensure a substantially continuous monitoring and control of those functions to be monitored and controlled in the system of FIG. 2, as well as providing additional time for the carrying out of diagnostic or calibration functions by the operator. These latter functions appear to the operator to be substantially continuous, although they are actually distributed among the available time segments within each of the successive 41 millisecond time slots. The one second duration of the total cycle also provides a convenient time basis for generating a real time clock, for example, for keeping track of engine hours of the combine for maintenance and repair purposes.

Referring both to FIG. 3A and FIG. 3B, it will be seen that the data selector 104 outputs memory read and memory write (MR and MW) also control a chip select input of the buffer 118 as well as read and write control inputs of the ROM's 80. The decoder 114 selects the chip select inputs of the ROM's 80, which in the illustrated embodiment are six in number and preferably of the type generally designated 2716. In particular, it will be seen that the selected memory chip is then addressed by the remaining address lines from the microprocessor 66 by way of the buffers 108 and 110, while the data selected therefrom is read out by way of either or both of the buffers 118 and 112. In this regard, the buffers 118 and 112 are bidirectional buffers for bidirectionally coupling the data lines of the memories 80 with the data lines of the microprocessor 66. Suitable pullup resistors for the chip select inputs of the ROM's 80 are also provided as indicated in FIG. 3B.

The I/O port 106 is addressed by selected ones of the address lines of microprocessor 66 by way of the buffers 108 and 110 which feed respective inputs of a multiple-input NAND gate 126 whose output feeds the I/O port 106. Additional interconnections between the I/O port 106 and the ROM 80 data lines are illustrated in FIG. 3B. In the illustrated embodiment, the I/O port 106 is of the type generally designated as a programmable I/O 8255 manufactured by Intel. In the illustrated embodiment, most of the I/O ports of the programmable input-/output 106 are not utilized. However, one such I/O port drives a divider 129 which in turn supplies a suitable operating frequency to a drive circuit designated generally 130 for operating an audible alarm 132, provided for alerting the operator to failure conditions detected during combine operation.

Additionally, a pair of I/O ports of the programmable I/O 106 are utilized to receive control switch inputs from a pair of control switches 76a, 76b, also illustrated in FIG. 2 and associated with the video display unit 76. Briefly, the control switch 76a permits vertical motion upwardly or downwardly of a cursor for selecting lines of information or display functions pictured on the display 76 while the control 76b directs the microprocessor 66 to display further information or perform further functions with respect to the selected line. Advantageously, the monitoring control system of the present invention is controllable by the operator through but two control members or switches 76a and 76b, which greatly simplifies and facilitates the monitoring and control functions for operation of the combine 20 such that even a relatively unskilled operator may readily utilize the system of the invention.

The remaining circuitry of FIG. 3B is associated with control of the video display 76 and includes suitable components for providing a multiple line alphanumeric display of the data selected by the operator on the video display screen 76. Briefly, a CRT control unit 134 which in the illustrated embodiment is of the type generally designated DP83450 and manufactured by National Semiconductor receives a suitable clock frequency from a crystal oscillator 136. The CRT control chip 134 also receives the $\overline{\text{RESET}}$ OUT line from the microprocessor 66 by way of a buffer 138 in FIG. 3A. This CRT controller 134 has a plurality of outputs which feed suitable logic including a CRT and image RAM 140 which in the illustrated embodiment is of the type designated MK4118. This RAM 140 in turn feeds a character generator 142, which in the illustrated embodiment is of the type generally designated DM8678, manufactured by National Semiconductor. Suitable intervening logic is provided including a pair of unidirectional buffer components 144 and 146. The buffer 144 is interposed between address lines taken from the ROM's 80 and the respective address lines joining the CRT controller 134 with the RAM 140. Similarly, the buffer 146 is interposed between a remaining two of these address lines and between selected data lines from the input/output port 106 and the respective lines joining the RAM 140 with the character generator 142.

The remaining intervening logic in the upper right-hand portion of FIG. 3B provides control over the video image generated by the components 134, 140 and 142 for display on the CRT or video display 76. Briefly, this logic circuitry converts the 24-line-by-80 character display format output of the CRT controller 134 to a 24-line-by-40 character format. In this regard, the CRT 76 receives its video control input from the output of the character generator 142 and its respective horizontal and vertical syncontrol inputs from outputs of the CRT controller 134.

Figure 4A:
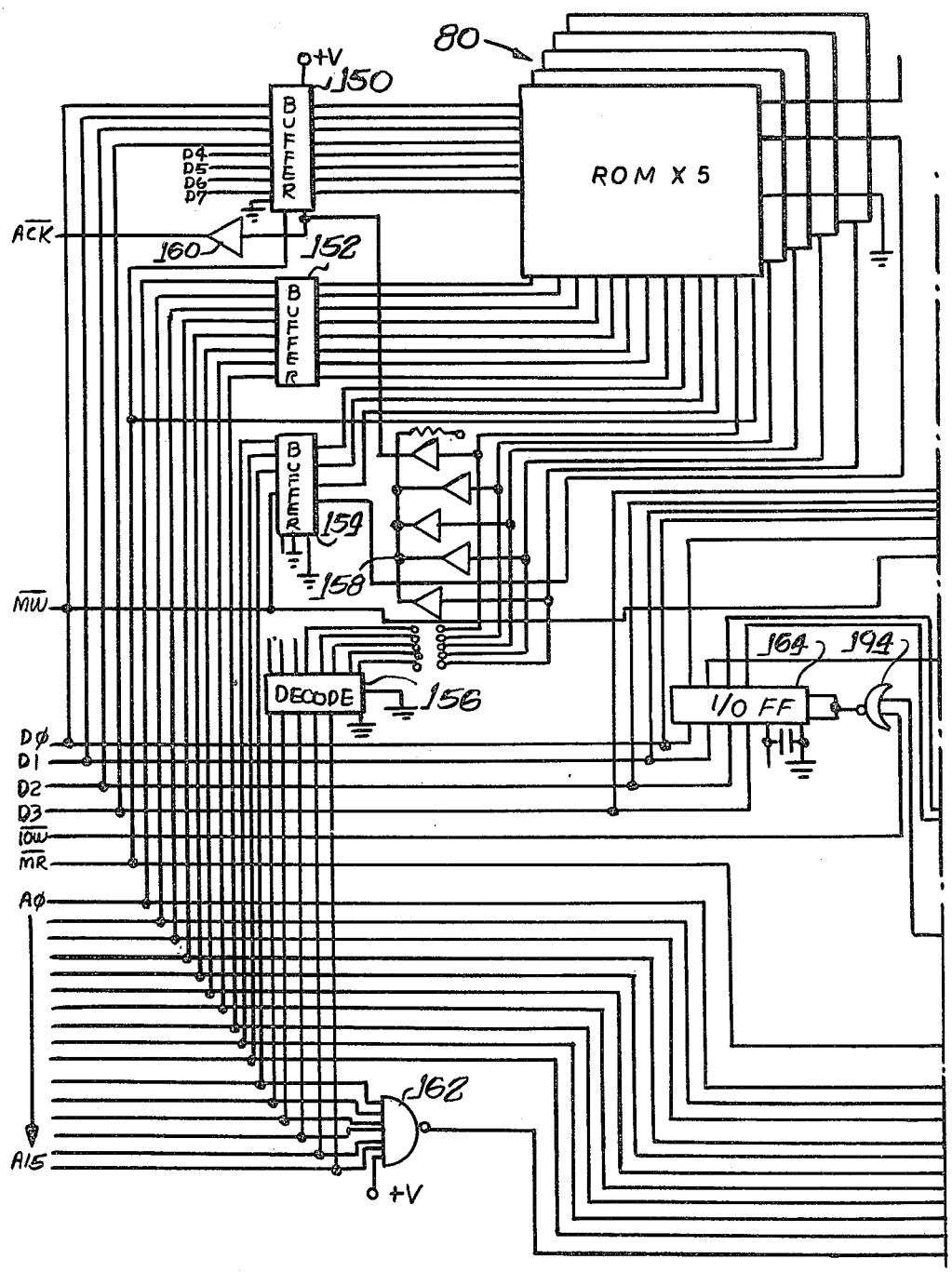
FIGS. 4A and 4B together form a circuit schematic diagram of a memory module of the monitoring and control system of the invention.
Figure 4B:
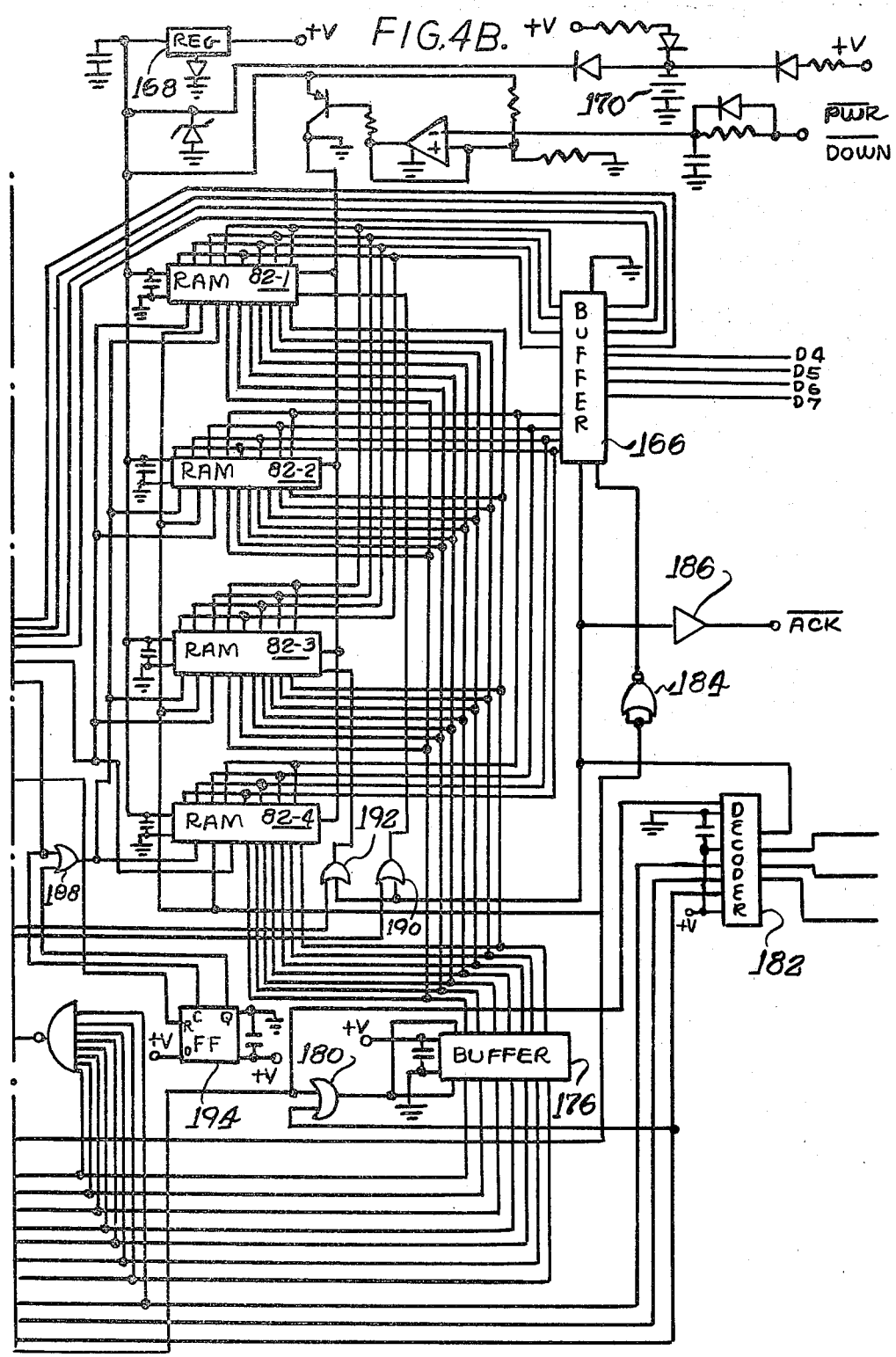

Referring now to FIGS. 4A and 4B, additional ROM and RAM memory components comprising detailed circuit diagram of a remaining porion of the ROM 80 as well as the RAM 82 of FIG. 2 are illustrated. Referring initially to FIG. 4A, the additional ROM components comprise five additional ROM components or chips designated generally by the reference numeral 80. The input and output connections of these ROM's are generally in common, with the exception of chip select inputs which are separately indicated. A bidirectional buffer component 150 (e.g., 74LS245) interfaces between the data input/output ports of the ROM's 80 and the data lines of the data bus 64. A pair of unidirectional buffers 152, 154 (e.g., 74LS244) interface between the read and write control lines and address lines of the ROM's 80 and the corresponding read and write control lines and lowest order 11 address lines of the data bus 64. The remaining five address lines of the data bus 64 are fed to the respective chip select inputs of the five ROM's 80 by way of a suitable decoder 156 (e.g., 74LS138). These last five address lines may be selectively jumpered so as to use as many or as few as desired of the ROM's 80, to provide the program space required for the central processing unit microprocessor 66 of FIG. 3A. These decoded address lines from the decoder 156 also feed a further array of buffer components designated generally 158 which produce a control output signal in response thereto to a control input of the buffer 150 and by way of a further buffer 160 to an $\overline{ACK}$ output which feeds a similarly labeled input to the circuit of FIGS. 3A and 3B. These six highest order address lines also feed respective inputs of a multiple input NAND gate 162 whose output feeds the circuit of FIG. 4B to be discussed hereinbelow. A quad flip-flop device of the type generally designated 74LS75 also receives the four lowest order data lines and feeds the circuit of FIG. 4B.

Referring now to FIG. 4B, it will be seen that the four highest order data lines also feed four inputs of a bidirectional buffer component 166 (e.g., 74LS245) which in turn buffers these lines to be fed to inputs of a first RAM component 82-1 which comprises a first of four such components forming the RAM block 82 of FIG. 2. A suitable voltage regulator component 168 (e.g., 78L05) feeds positive supply voltage inputs of the four RAM's 82-1, 82-2, 82-3 and 82-4. The RAM's 82-2, 82-3 and 82-4 receive bidirectional data lines from the buffer 166 as indicated. The remaining four data lines to the buffer 166 are the four highest order bits of the eight-bit data portion of the bidirectional data bus 64. Advantageously, redundant RAM space is provided in this fashion for non-volatile storage of machine calibration data or the like, should one or more of the RAM's 80-1 through 80-4, inclusive, momentarily lose power. In this regard, a suitable battery 170 is also provided and coupled to the same positive voltage input lines as the regulator 168 to retain the non-volatile contents of the memories 80-1 through 80-4, inclusive, while the combine machine is turned off and the regulator power source, i.e., from the combine battery, is not functioning. A power down ($\overline{PWR\ DOWN}$) logic line is also provided, together with suitable interconnected logic components to maintain the non-volatile contents of the memories when the combine turned off in this fashion and to assure retention of the memory under control of the battery 170.

The eight lowest order address lines also feed respective inputs of a multiple input NAND gate 172 of FIG. 4B whose output feeds one input of a two-input NOR gate 174 of FIG. 4A. The other input of this NAND gate 174 is fed from the $\overline{IOW}$ input line while the output thereof feeds the enable inputs of the quad flip-flop integrated circuit 164 thereof. The same eight lowest order address lines also feed a unidirectional buffer component 176 (e.g., 74LS244) of FIG. 4B which feeds these buffered address lines to the address inputs of the four RAM components 82-1 through 82-4, inclusive. The five highest order address lines trigger a control input of the buffer 176 by way of the aforementioned NAND gate 162 and a further two-input OR gate 180. This same NAND gate 162 also feeds one input of a decoder 182 which also receives the remaining three address lines (A7, A8 and A9). The A9 address line also feeds the remaining input of the two-input OR gate 180. The memory read ($\overline{MR}$) control line from FIG. 4A also feeds both inputs of a two-input NOR gate 184 of FIG. 4B which feeds a control input of a bidirectional buffer 166. A remaining control output of this buffer feeds the $\overline{ACK}$ line mentioned above by way of a suitable buffer 186. Suitable select logic is provided to the chip select inputs of the RAM's 82-1 through 82-4, inclusive, by way of three OR gates 188, 190 and 192. The OR gate 188 receives one input from the Q output of a flip-flop 194 and the other input from the $\overline{MW}$ input of FIG. 4A, which also feeds the C input of the flip-flop 194. The OR gates 190 and 192 receive one input in common from an output of the decoder 182 and their second inputs from respective outputs of the input/output flip-flop circuit 164 of FIG. 4A.

Figure 5:
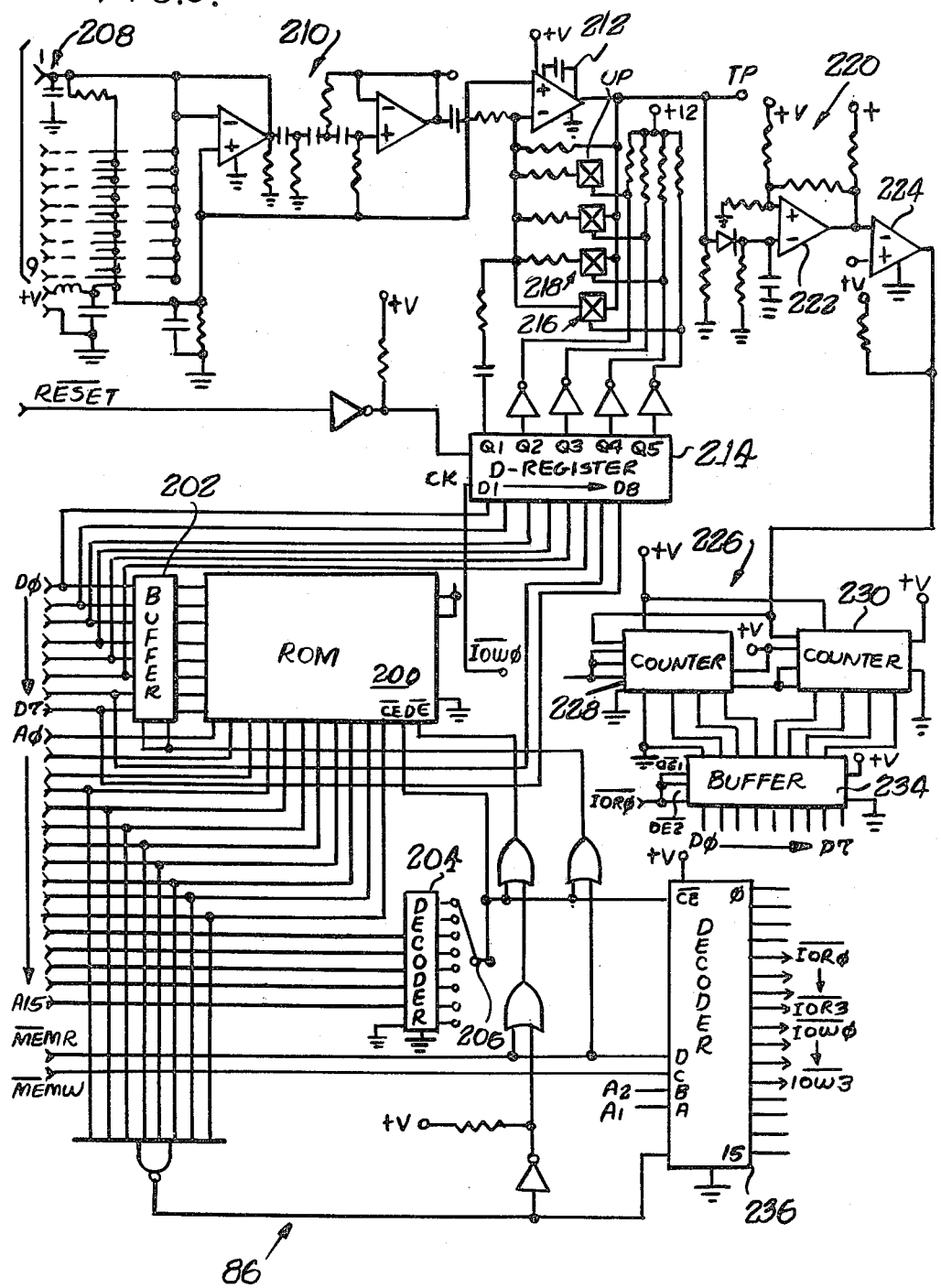
FIG. 5 is a circuit schematic diagram of a grain loss module of the monitoring and control system of the invention.

Reference is next invited to FIG. 5 wherein the grain loss module 86 of FIG. 2 is illustrated in additional detail. The grain loss module includes a ROM 200 which receives the data lines of the data bus 64 by way of a suitable buffer 202 (e.g., 74LS244) and receives selected ones of the address lines directly. The remaining five highest order address lines feed a decoder 204 which at its output is provided with a suitable selector switch 206, to select one of the outputs thereof as a chip enable line for the ROM 200.

In accordance with a feature of the invention, and as mentioned above, the ROM 200 acts as a program memory for the operation of the grain loss module 86. In particular, the ROM 200 carries all of the necessary instructions for causing the executive processor 62 of FIG. 2 to identify the grain loss module, check on the operability of the program in memory 200 and to select the grain loss module for monitoring as frequently as necessary within the operating cycle of the executive processor 62 to substantially constantly monitor the grain loss sensors associated with the grain loss module 86.

In this regard, in the illustrated embodiment nine inputs designated generally 208 receive as many as nine grain loss sensor outputs. As known in the art, these sensors may comprise piezoelectric elements or pressure sensitive transducers responsive to grain falling thereon for emitting responsive signals. These signals are fed in common to an amplifying and filtering circuit designated generally by the reference numeral 210 which in turn feeds a programmable gain amplifier 212. The gain of this amplifier 212 is programmed by data received from the ROM 200 by way of a D-register 214 (e.g., 74LS273) which enables one or more of a plurality of electronic bilateral switching elements designated generally 216, each of which functions to interconnect an associated resistive element, designated generally 218, across the feedback path of the programmable gain amplifier 212, thus setting the gain thereof.

The output of the programmable gain amplifier 212 feeds an envelope detector circuit designated generally 220 and comprising a pair of operational amplifiers 222 and 224. The output of the envelope detector 220 in turn feeds a counter designated generally by the reference numeral 226 and comprising a pair of four-bit counters 228 and 230 (e.g., 74LS163A). These counters 228, 230 function to count the summed pulses from the grain loss sensor and provide an eight-bit count to an output buffer 234 (e.g., 74LS244) which feeds the eight data lines of the data bus 64. A 4-to-16 decoder/demultiplexer 236 (e.g., 74LS154) is provided with inputs from the two lowest order address lines of the data bus 64 and from memory read and memory write ($\overline{MEMR}$ and $\overline{MEMW}$) lines and provides decoded or demultiplexed control output signals as indicated. The memory read and memory write control lines also feed suitable logic gates arranged for controlling the $\overline{CE}$ and $\overline{OE}$ inputs of the ROM 200 as indicated. The input/output read and write control lines $\overline{IOR\emptyset}$ and $\overline{IOW\emptyset}$ provided by the decoder 236 are fed to the D-register 214 and buffer 234 as indicated.

Figures 6, 11B:
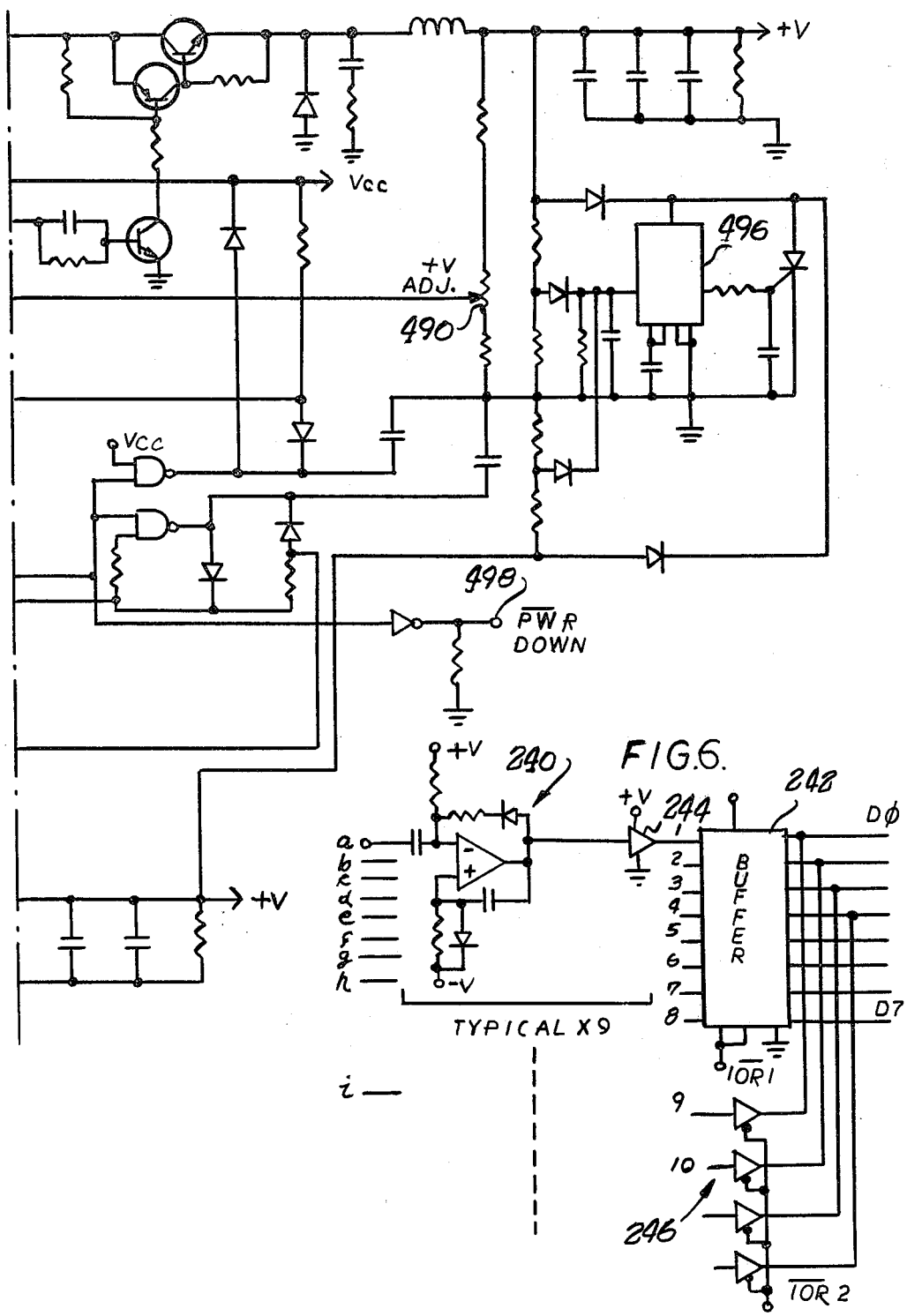
FIG. 6 is a circuit schematic diagram of an optional additional portion of the grain loss module of FIG. 5.
FIGS. 11A and 11B together form a circuit schematic diagram of a power supply module of the modular monitoring and control system of the invention.

Referring briefly to FIG. 6, an additional, optional data input circuit for the grain loss sensors is illustrated. The nine inputs from the grain loss sensors each feed a similar input amplifier circuit, designated generally by the reference numeral 240, which feeds a buffer circuit 242 by way of a suitable intervening buffer 244. The outputs of this buffer 242 feed the eight data lines of the data bus 64. Additional individual buffer components designated generally by the reference numeral 246 are provided for receiving similar amplified inputs from grain loss sensors in excess of the eight sensors accommodated by the buffer component 242. This circuit functions to permit individual checking of the grain loss sensors for correct operation, in conjunction with the diagnostic function of the invention as discussed above.

Figure 7A:
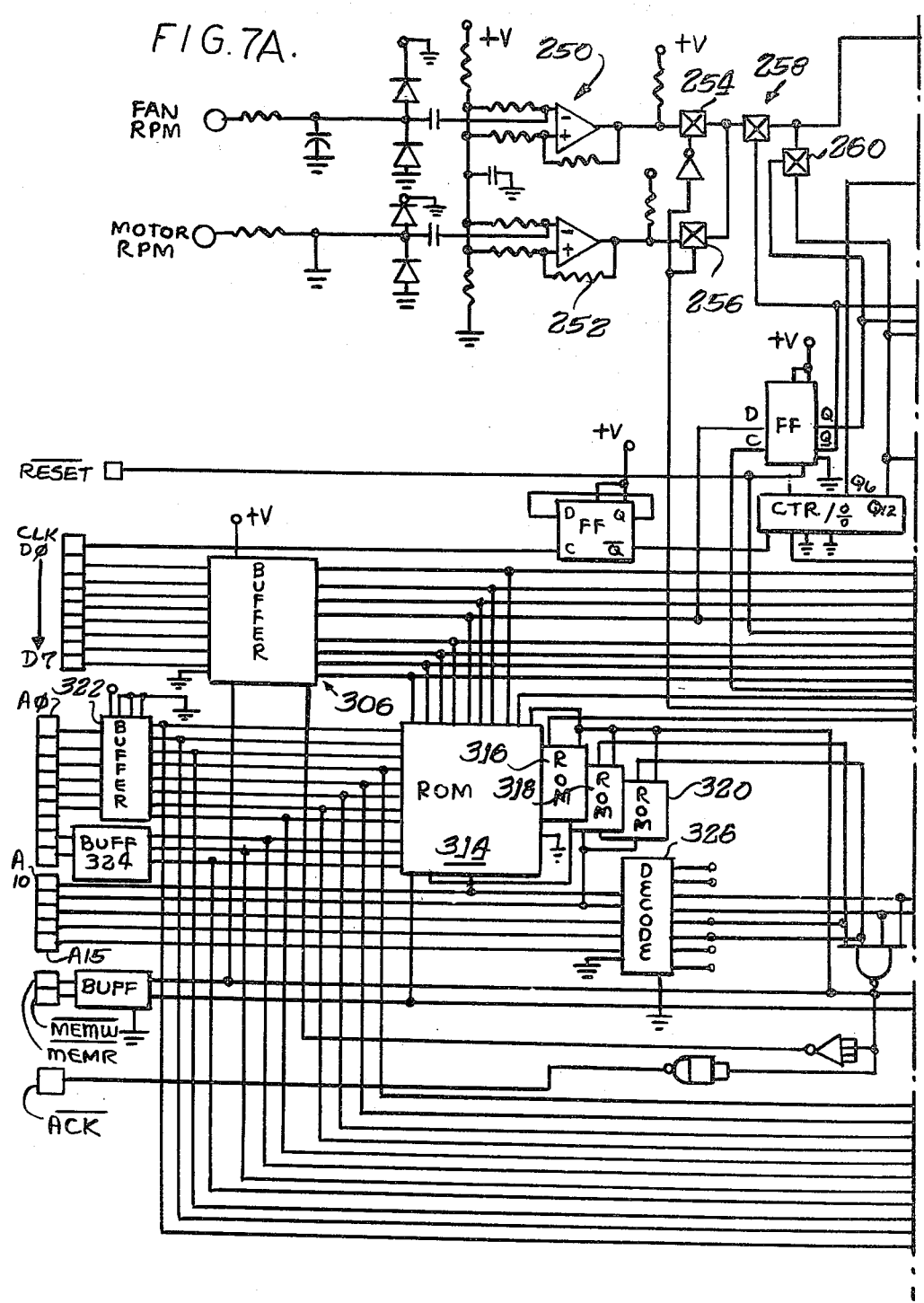
FIGS. 7A, 7B and 7C form a circuit schematic diagram of a machine parameters monitoring module of the modular monitoring and control system of the invention.
Figure 7B:
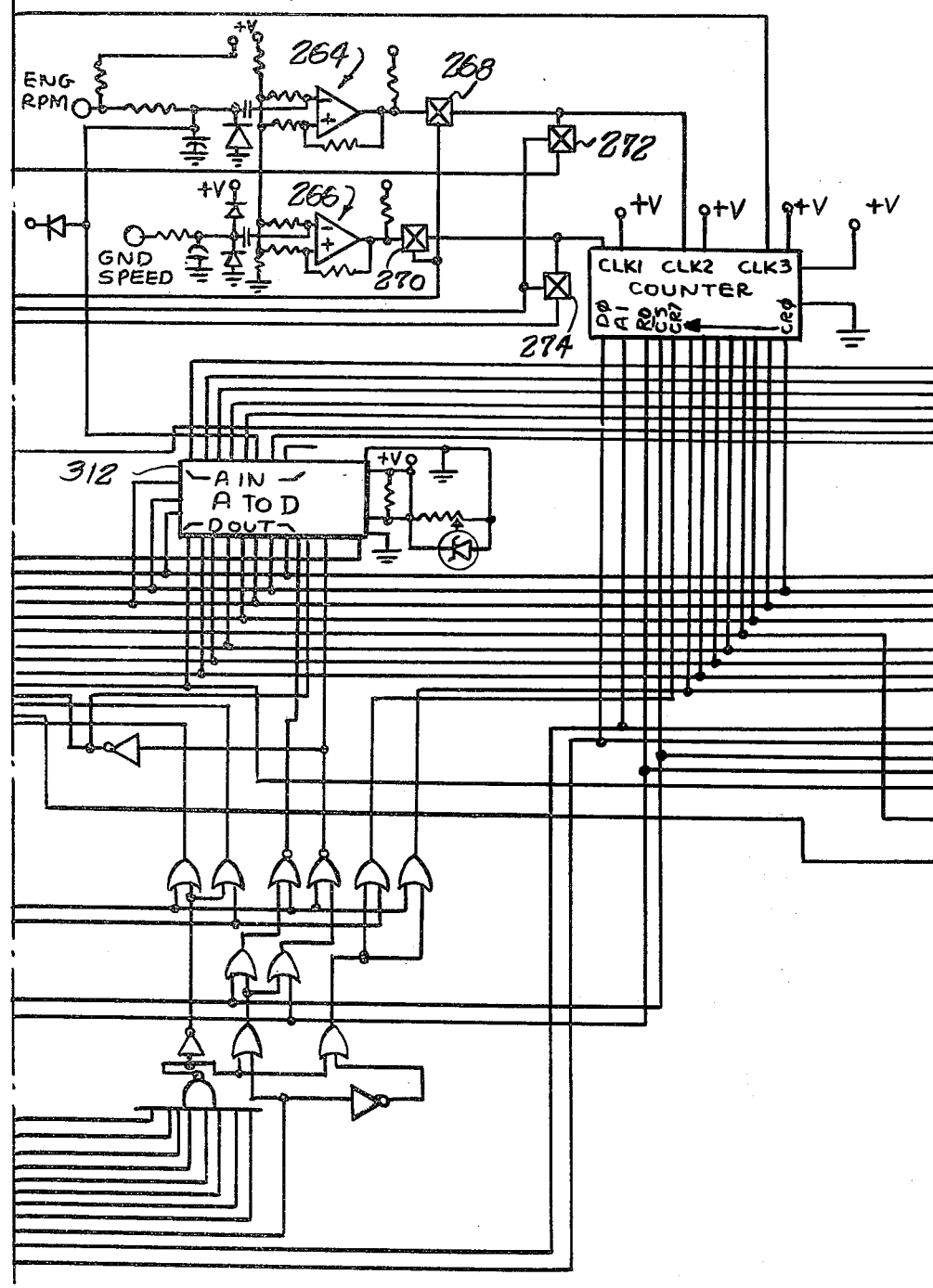
Figure 7C:
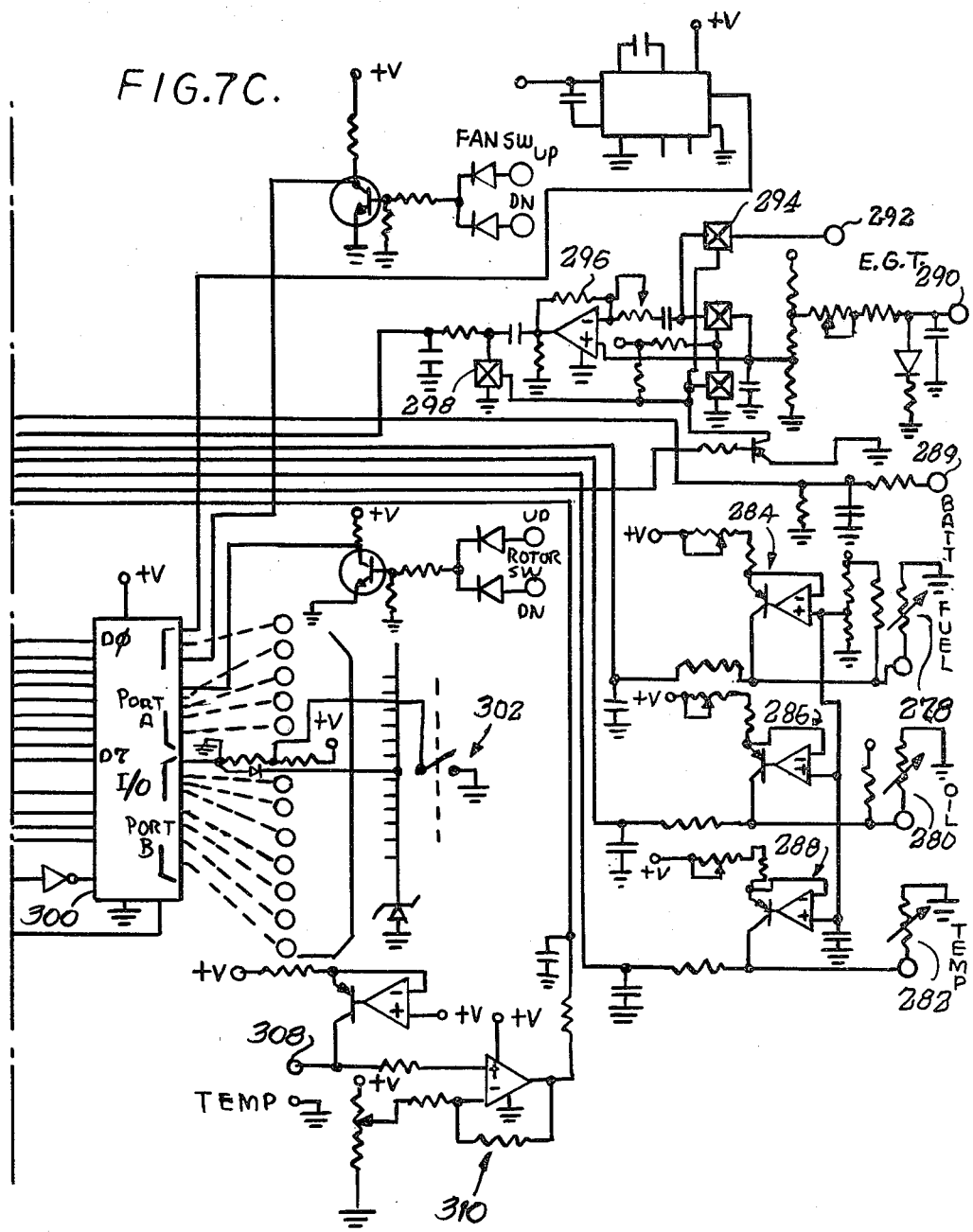

Reference is next invited to FIGS. 7A, 7B and 7C wherein the machine parameters module 88 of FIG. 2 is illustrated in detail. Inputs from rotation sensors for detecting the rotational speeds of the fan 54 and the rotor are provided to a pair of operational amplifier input circuits designated generally by reference numerals 250 and 252. The outputs of these circuits 250 and 252 are fed to a switching network comprising four bilateral switches 254, 256, 258 and 260. These switches are controlled as will be described later for selecting one or both of the fan rpm and rotor rpm input signals for monitoring. In similar fashion in FIG. 7B, an engine rpm sensor and a ground speed sensor or tachometer sensor feed similar input amplifier circuits 264 and 266, which feed a similar network of bilateral switches 268, 270, 272 and 274. The amplified signal from the rotation sensor or sensors selected by the switching networks are fed to count or clock inputs of a binary counter integrated circuit 276. This circuit comprises three independent binary counters for independently counting and receiving up to three separate selected inputs. One of these counters is in turn selected by suitable address inputs $A_0$ and $A_1$ of the counter 276 and the selected count is output on lines $CR_0$ through $CR_7$ thereof. In the illustrated embodiment, this counter 276 is of the type designated INTEL 8253.

Referring to FIG. 7C, additional sensor inputs are provided for a plurality of parameters associated with the combine engine. These inputs each feed a similar input amplifier circuit and are illustrated along the right-hand side of FIG. 7C. A fuel transducer 278, an oil pressure transducer 280 and a coolant pressure transducer 282 are all represented as variable resistance elements. The output signals from these transducers each feeds a suitable RC circuit fed from a constant current source 284, 286, 288. By providing such a constant current source at each input, the range of output voltage due to variation of the variable resistance transducer associated with each input falls within a preselected range.

An engine exhaust gas temperature transducer in the form of a thermocouple is coupled across a pair of inputs 290, 292 which feed a suitable switching circuit comprising three bilateral switches designated generally by the reference numeral 294 which selectively feed these inputs to an operational amplifier 296. The output of the operational amplifier is provided with a suitable RC network and a further bilateral switch 298. These bilateral switches 294 and 298 are selectively actuable for feeding the signals from the engine exhaust gas temperature sensor into the circuit of FIG. 7B. A battery charge level input 289 feeds an RC input circuit which in turn feeds the circuit of a plurality of sensors for detecting functions having two states, for example on/off, up/down, etc., feed respective inputs of a pair of ports of an input/output (I/O) circuit 300, which in the illustrated embodiment is of the type generally designated INTEL 8255. Two typical such two-state inputs are a fan on/off switch and a rotor on/off switch, each of which feeds a pair of inputs to a suitable switching transistor, which in turn feeds a corresponding port of the I/O 300. Other similar two-state monitored functions are symbolized by a simple single-pole-single-throw switch 302 which feeds a corresponding input of the I/O 300 by way of a suitable pulse shaping network. The outputs of the I/O are designated $D_0$ through $D_7$ and feed the corresponding data lines of the data bus 64 by way of a bidirectional buffer circuit 306 (e.g., 74LS245), illustrated in FIG. 7A. A further, inside/outside temperature sensor input (i.e., inside/outside the cab 32) is indicated at reference numeral 308, and feeds a suitable input amplifying circuit designated generally 310. The output of this amplifier circuit 310 also feeds the circuit in FIG. 7B, to which reference is next invited.

The outputs of the circuits associated with engine exhaust gas temperature, battery charge level, and the fuel, oil pressure and coolant transducers as well as the inside/outside temperature are fed to respective analog input terminals of an A to D converter circuit 312. The digital outputs of this circuit 312 also feed the data lines of the data bus 64 by way of the bidirectional buffer 306 of FIG. 7A.

Referring again to FIG. 7A, the bidirectional buffer 306 also interfaces with a memory unit comprising four ROM's 314, 316, 318 and 320 which contain the necessary program information for the operation of the machine parameters module 88. In the same fashion as with the grain loss module 86 discussed above, these memories 314–320, inclusive, also contain suitable information identifying the machine parameters module, and the monitoring requirements thereof, and coact with the executive processor 62 in assuring proper monitoring of the engine or machine parameters 88 during the timed cycle of operation of the executive processor 62.

Address inputs of the ROM's 314–320, inclusive, are fed from the first eleven of the sixteen address lines of the data bus 64 by way of suitable unidirectional buffers 322, 324 (e.g., 74LS244). The remaining address lines feed respective inputs of a decoder circuit 326 (e.g., 74LS138), whose outputs feed a further decoding network (see also FIG. 7B) comprising a plurality of logic gating elements for controlling the overall operation and selection or addressing of the various sensor inputs described above, as well as chip selection of the ROM's 314, 320, and selection and control of the A to D converter 312. Suitable interconnecting logic from the address lines also cooperates in the foregoing as well as in control of the counter 276 and I/O component 300.

Figure 8A:
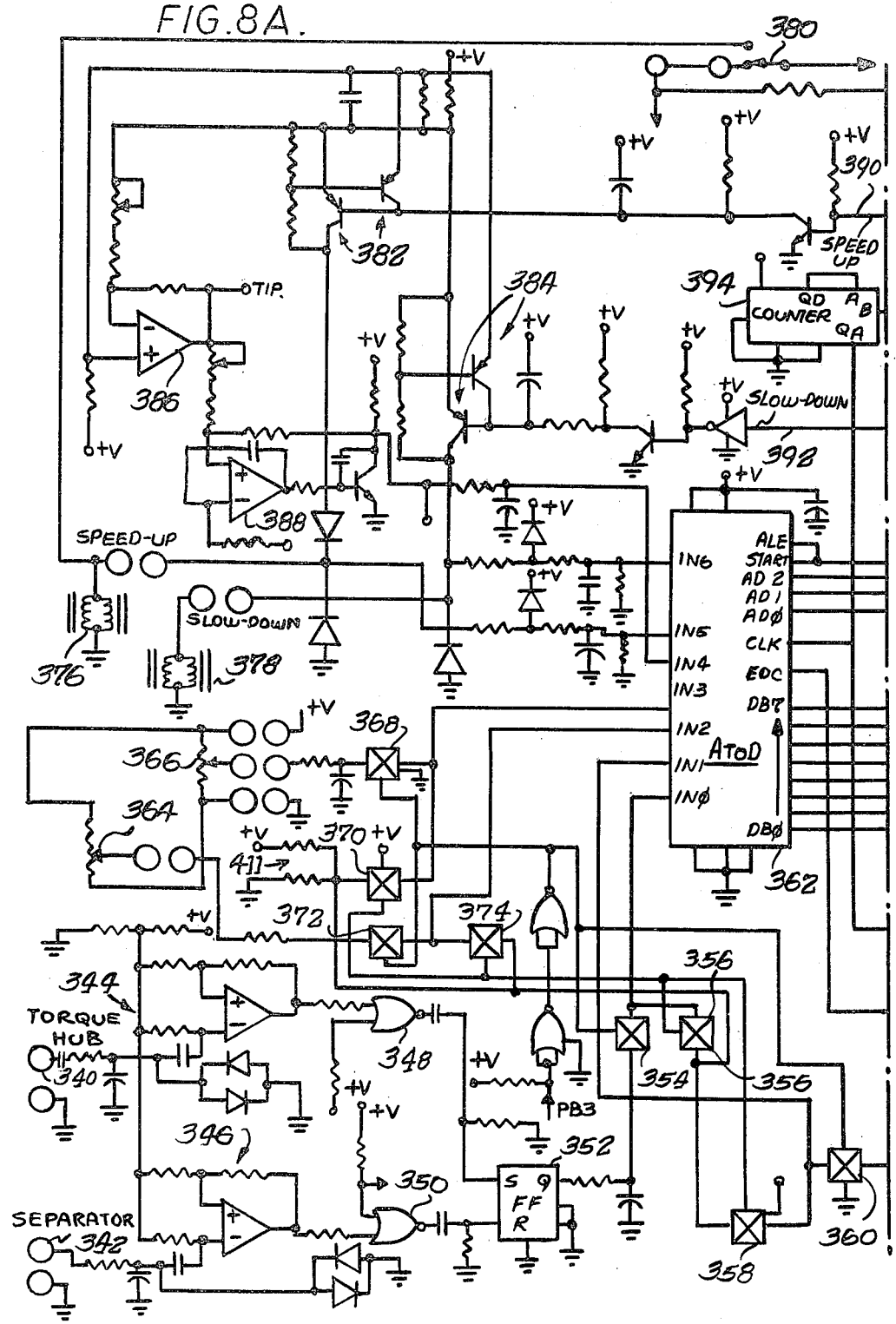
FIGS. 8A and 8B together form a circuit schematic diagram of a load control module of the modular monitoring and control system of the invention.
Figure 8B:
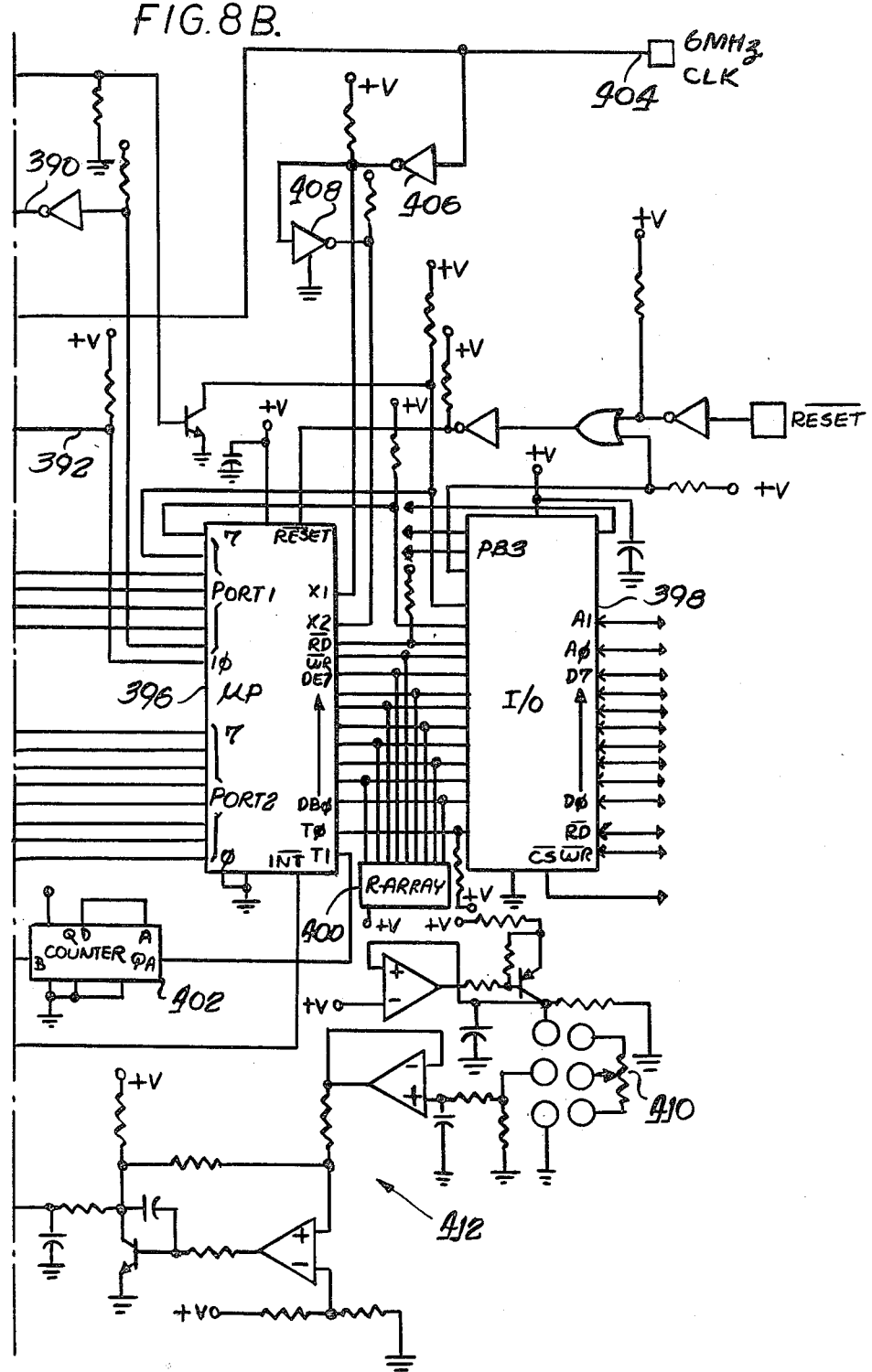

Reference is next invited to FIGS. 8A and 8B wherein an exemplary control module 92 of FIG. 2 is illustrated in additional detail. In particular, the control module of FIGS. 8A and 8B comprises a load control module, which, as mentioned above, comprises an intelligent controller having an additional, "slave" microprocessor for operation of the control functions thereof substantially independently of the executive processor 62. In this regard, the monitoring functions are carried out in conjunction with the executive processor 62. However, the control functions of the load control module are sufficiently complex to warrant the addition of a dedicated processor, thus advantageously reducing the complexity required of the executive processor 62. For example, should a particular operator choose not to include the load control function in his system, he is not paying for any part thereof in the executive processor 62.

Referring now to FIGS. 8A and 8B, two sensor inputs are utilized from rotating portions of the combine whose rotational characteristics vary with variations of the load imposed thereof. In particular, a torque hub sensor input 340 and a separator sensor input 342 are associated respectively with a torque hub power take-off from the combine engine 28 and with the drive for the separator or threshing cylinder 44. From the relationship between the rotation of these two elements, the load imposed on the combine can be monitored. Each of these inputs feeds a similar input amplifier circuit, designated generally by the reference numerals 344 and 346. These circuits in turn feed a pair of NOR gates 348 and 350 whose outputs feed respective set and reset inputs of an RS flip-flop 352. The Q output of this flip-flop 352 is integrated by an RC filter and fed to a bilateral switch 354 which forms a switching network together with similar bilateral switches 356 and 358 for selecting the resultant signal from the torque hub and separator sensor inputs.

The outputs of this switching network, taken from the outputs of bilateral switches 354 and 356, feed respective inputs of an A to D converter circuit 362 (e.g., ADC 0808) which receives remaining inputs from a desired load setting potentiometer 364 which the operator sets to the desired load. Also operator-adjustable is a response adjustment potentiometer 366 whose wiper arm feeds the resultant desired response signal (which sets the control system closed loop gain) to a further switching network comprising four bilateral switches 368, 370, 372 and 374. The resultant selected output signal is fed to one of two further input ports of the A to D converter 362. Additional input ports of the A to D converter 362 are fed from the control portion of the load control module 92, which comprises two pairs of relays 376, 378.

Specifically, the relays 376 are designated as the speed-up relays while the relays 378 are designated as the slow-down relays. Briefly, these relays cooperate with the hydrostatic drive of the combine 20 to control the ground speed thereof either increasing or decreasing the ground speed in response to control signals received from the control portion of the load control module 92, to be described hereinbelow. The control signals fed to these relays are sampled and fed back to the A to D converter for use in this control function.

A suitable analog network sets the control signals to the relays 376 and 378 and is illustrated in the upper portion of FIG. 8A. Briefly, a manual/auto control switch 380 is also provided to remove control of the relays 376, 378 from the control module 92 for manual control of the combine speed by the operator, if desired. The output driver transistors for the relays 376 are indicated by the reference numeral 382 while the similar output driver transistors for the relays 378 are indicated by the reference numeral 384. Suitable operational amplifiers 386, 388 set the desired signals for control signal feedback to the A to D converter 362. The respective speed-up and slow-down control signals are fed in from the circuit of FIG. 8B on respective lines 390, 392. A counter integrated circuit 394 is wired as a symmetrical decade or divide-by-ten counter and produces an output to a clock (CLK) input of the A to D converter 362. The address lines of the A to D converter are fed from a microprocessor component 396 of FIG. 8B, and data bus lines of the A to D converter and microprocessor are respectively interconnected.

Referring now to FIG. 8B, the microprocessor 396, in the illustrated embodiment, is of the type generally designated 8048 and as mentioned above, provides full time control. A suitable input/output device (I/O) 398 interconnects the microprocessor 396 with the two lowest order address lines and with the data lines of the data bus 64. In the illustrated embodiment this input/output (I/O) device is one of the type generally designated 8255. A resistor array 400 provides suitable pullup resistors to the respective interconnecting lines between the microprocessor 396 and the I/O 398.

A further counter 402 is wired as a symmetrical devide-by-ten or decade counter the same as the counter 394 of FIG. 8A. The output of this counter feeds a suitable timing signal to an input $T_1$ of the microprocessor 396. Briefly, the buffered 6 megahertz clock signal is input at a terminal 404 to the input of the first counter 394, whereby the output thereof is substantially on the order of 600 KHz. The counter 402 receives this output and again divides-by-ten, whereby the output thereof is substantially on the order of 60 KHz. The buffered 6 megahertz clock at input terminal 404 also feeds a suitable master clock signal to the $X_1$ and $X_2$ inputs of the microprocessor 396 by way of suitable buffers 406, 408.

Figure 9:
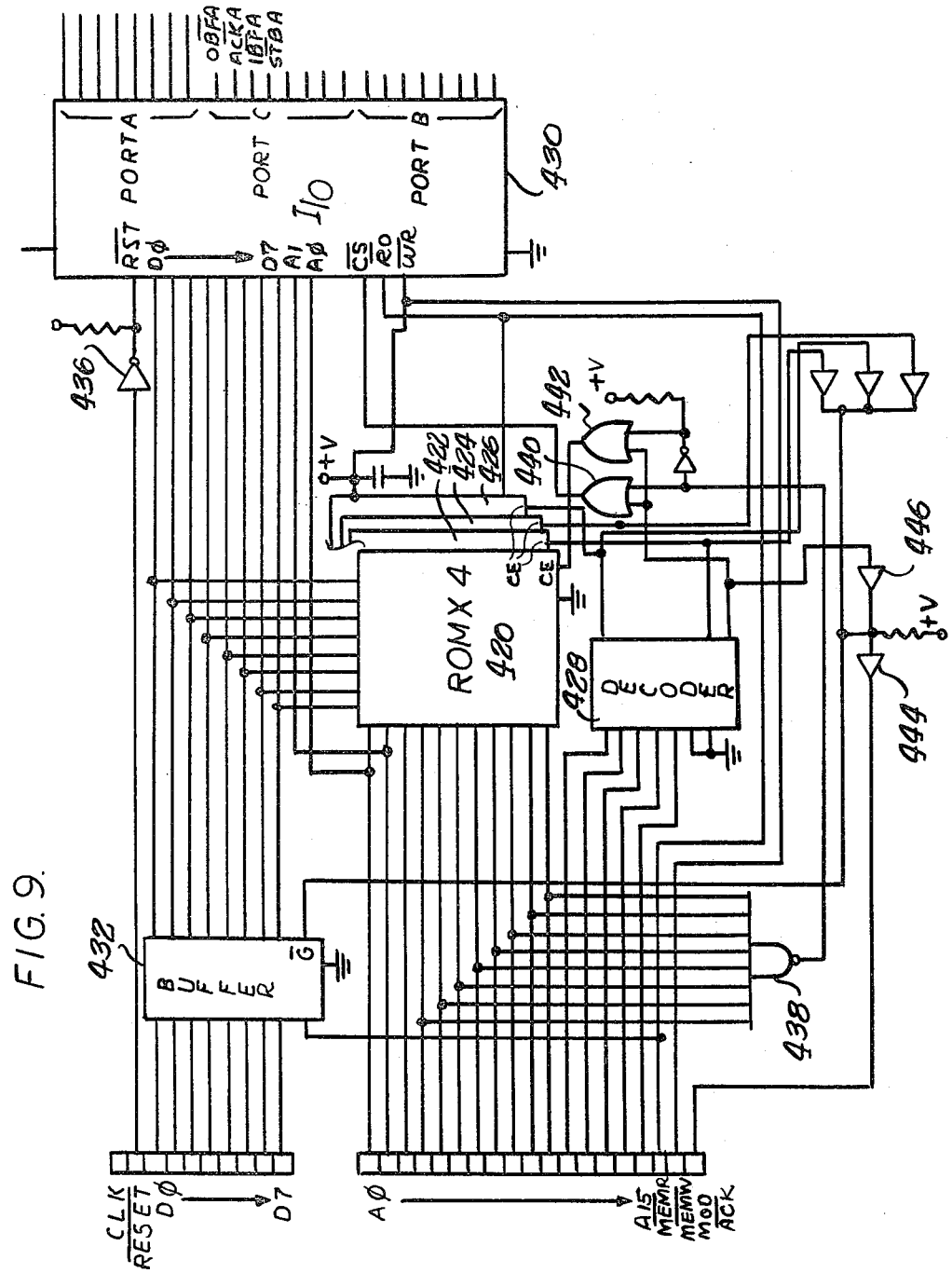
FIG. 9 is a circuit schematic diagram of another portion of the load control module of FIGS. 8A and 8B.

Remaining inputs to the microprocessor 396 include suitable positive voltage supplies and a $\overline{RESET}$ input fed by way of suitable buffers. The control signal for the bistable switches described above (FIG. 8A) is taken from an output $PB_3$ of the I/O component 398. This output $PB_3$ is fed into suitable intervening logic components (FIG. 8A). The control lines 390 and 392 for the relays 376 and 378 are fed from two output ports of the microprocessor 396 (FIG. 8B). The bilateral switch 360 of FIG. 8A receives a remaining input signal from a hydrostat potentiometer 410 which acts as a sensor of the position of a hydrostatic drive element for controlling the speed of the combine. An analog signal processing circuit designated generally 412 is interposed between this potentiometer and the input to the bilateral switch 360. Accordingly, the bilateral switches 354, 356, 358 and 360 select signals to be fed to the inputs of the A to D converter 362 in response to the control signals from the port $PB_3$ of the I/O 398. Either the sensor inputs 340, 342, 364, 366 and 410 or a reference voltage from a resistive voltage divider 411 and may be so selected. The reference voltage is used to test the control portion of the load control module 92. Referring now to FIG. 9, the memory components associated with the load control module of FIGS. 8A and 8B are illustrated. A read only memory array comprising from two to four ROM's 420, 422, 424 and 426 contains the necessary program memory for the operation of the microprocessor 396 and additionally contain the necessary identification and operating information for cooperation of the load control module 92 with the executive processor 62 of FIG. 2. In this regard, the identification portion of the memory includes instructions for the proper monitoring functions within the master cycle of operations of the executive processor 62, in the same fashion as described above for the ROM components associated with the machine parameters module 88 and with the grain loss module 86.

The ROM's 420–426, inclusive, are addressed by the sixteen address lines of the data bus 64 directly, with the exception of the highest order five address lines which are fed through a decoder circuit 428 (e.g., 74LS138) and decoded for purposes of chip select or chip enable of the four ROM's 420–426. Additionally, memory read and memory write control inputs ($\overline{MEMR}$ and $\overline{MEMW}$) are fed to suitable read and write control inputs of the four ROM's 420–426 as well as to a suitable read/write control input of an input/output device (I/O) 430. In the illustrated embodiment, this input/output device 430 comprises an INTEL 8255 I/O. The data lines of the data bus 64 are fed through a bidirectional buffer 432 (e.g., 74LS245) to the data ports of the ROM's 420–426, inclusive, and to similar data ports of the I/O 430. A reset control input ($\overline{RESET}$) is also fed to the reset input of the I/O 430 by way of a suitable buffer 436. The I/O 430 is also addressed by the two lowest order address lines $A_0$, $A_1$ of the data bus 64. The chip select ($\overline{CS}$) input of the I/O 430 is fed from selected ones of the address lines by way of suitable intervening logic including a multiple input NAND gate 438 and an OR gate 440. A similar OR gate 442 feeds the chip enable input of the first ROM 420, while the decoder 428 feeds remaining enabling inputs of the OR gates 440 and 442. An output module control line $\overline{MOD\ ACK}$ is fed out from the decoder 428 by way of suitable buffers 444 and 446 and suitable buffered outputs of the decoder 428 are combined to form an additional control of the G input of the buffer 432. Additionally, the memory read control line feeds a suitable control input of the buffer 432.

Figure 10A:
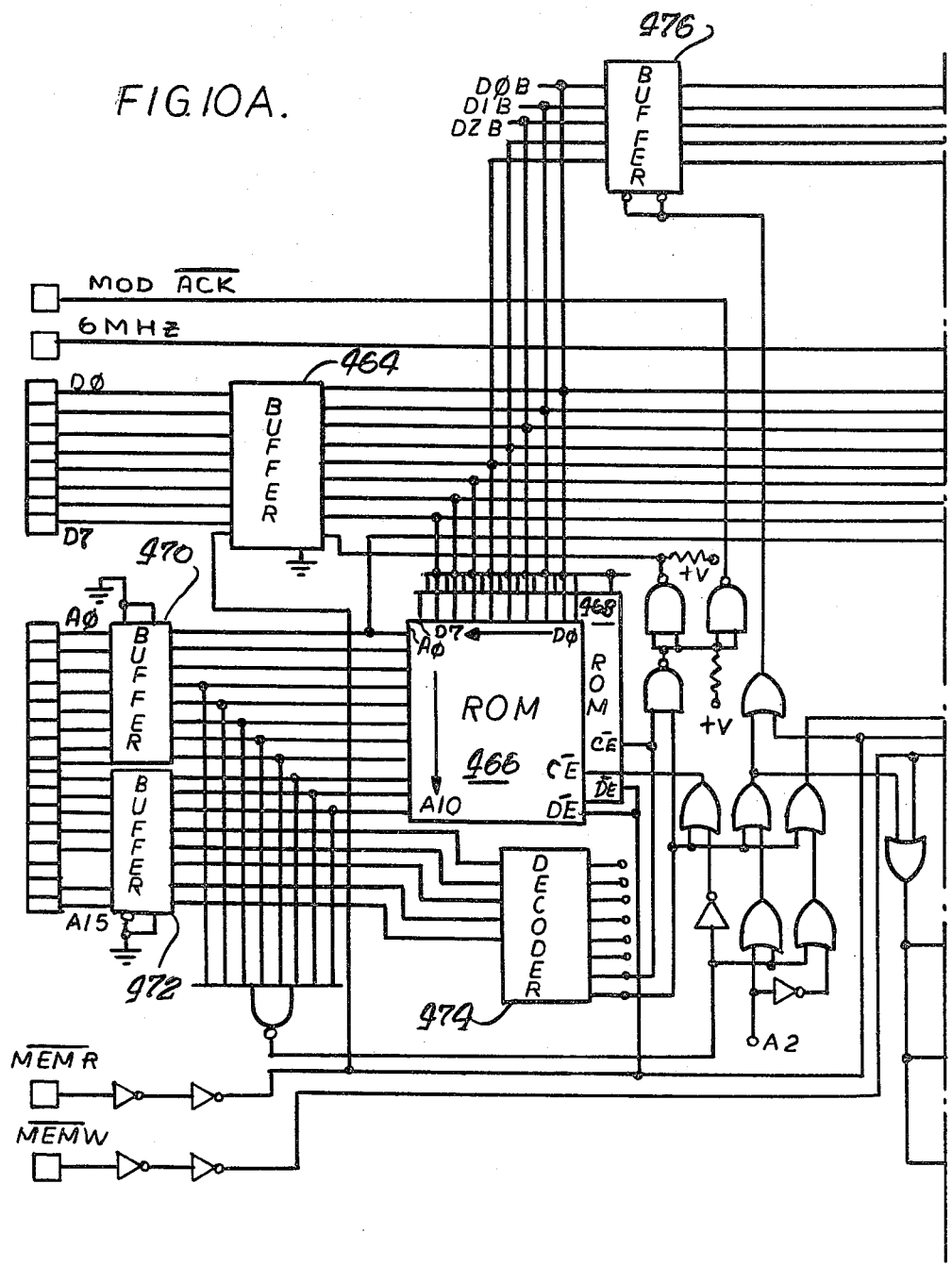
FIGS. 10A and 10B together form a circuit schematic diagram of a shaft monitoring module of the modular monitoring and control system of the invention.
Figure 10B:
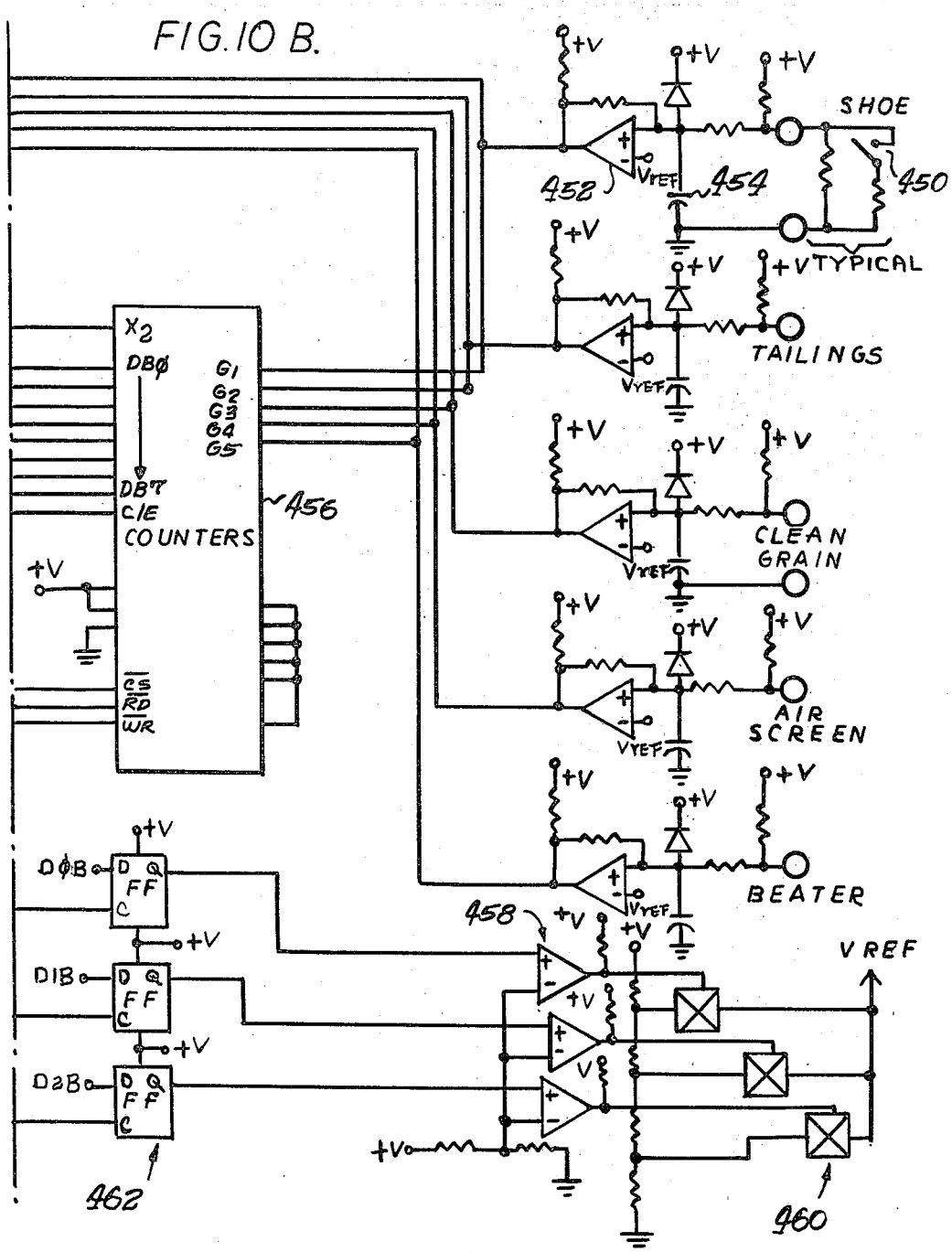

Referring now to FIGS. 10A and 10B, the shaft monitor module 86 of FIG. 2 is shown in additional detail. Referring initially to FIG. 10B, it will be seen that a plurality of shaft rotation sensors have inputs to substantially identical operational amplifiers along the right-hand side of the figure. In this regard, substantially identical sensors are utilized whereby only one such sensor is illustrated in schematic form as a switch. While various sensors may be used with the present invention, this particular switch 450 represents a reed switch which is activated repeatedly on and off in response to the rotation of one or more magnetic bodies affixed to the shaft or other rotating element whose rotational speed is to be monitored. However, it will be recognized that any suitable sensor providing a periodic pulse output whose frequency is proportional to the rotational speed of a shaft being monitored would provide a suitable input for this purpose. The other points monitored are the speed of the tailings elevator 58, the speed of the clean grain elevator 56, the air screen, and the beater. Each of these inputs feeds a similar operational amplifier circuit, whereby only the circuit associated with the shoe sensor 450 will be described. An operational amplifier 452 compares the analog voltage developed across a capacitor 454 in response to the pulse output from the sensor 450 with a reference voltage level $V_{ref}$. The resultant output is fed to a corresponding input of an integrated circuit counter component 456. In the illustrated embodiment this counter is of the type AMD 9513. Briefly, the inputs fed by the various shaft sensor amplifier outputs comprise gate inputs ($G_1$, $G_2$, etc.) which serve to gate through a master clock signal received at an input terminal $X_2$, as controlled by the output of the associated sensor amplifier. Accordingly, a counter associated with each gate counts the pulses thus gated through to establish a multi-bit digital value corresponding to the frequency of rotational speed of the associated monitor shaft. These digital values are output on data lines $DB_0$ through $DB_7$, inclusive. In the illustrated embodiment, the master frequency input $X_2$ of the counters 456 is fed from the 6 megahertz master clock frequency of the system.

The reference voltage $V_{ref}$ is fed from a network comprising a plurality of operational amplifiers designated generally by the reference numeral 458, each of which feeds a corresponding bilateral switch, designated generally by the reference numeral 460. These bilateral switches 460 are each arranged at one leg of a voltage divider to thereby feed a different reference voltage to the $V_{ref}$ inputs of the amplifiers 452 depending upon which of the associated operational amplifiers 458 is activated for allowing the corresponding voltage through the bilateral switches 460. These operational amplifiers 458 have their non-inverting inputs tied in common to a positive voltage source from a suitable voltage divider and their positive inputs tied to the respective Q outputs of three flip-flop integrated circuits designated generally by the reference numeral 462. These flip-flop circuits receive their C inputs in common from the circuit of FIG. 10A to be described below and receive their controlling D inputs from the three lowest order bits of the data lines of the data bus 64.

Referring now to FIG. 10A, the data lines of the data bus 64 are fed through a bidirectional buffer 464 (e.g., 74LS245) to the corresponding data terminals of a pair of ROM's 466, 468 (e.g., 2716). These ROM's 466, 468 form the program memory of the shaft monitor module, and perform the same identifying and operational functions in cooperation with the time sequence or cycle of operation of the executive processor 62 as described above with reference to the similar ROM components of the other modules. The sixteen address lines of the main data bus 64 are fed through a pair of suitable unidirectional buffers 470, 472 (e.g., 74LS244), the first eleven buffered address lines being fed directly to the ROM's 466 and 468 and the five higher order buffered address lines being fed to a decoder 474 (e.g., 74LS138) for chip enable or chip select of one of the ROM's 466, 468.

Suitable additional logic components controlled by the decoder 474 and by the memory read and memory write control inputs ($\overline{MEMR}$ and $\overline{MEMW}$) are provided for suitable directional control of the bidirectional buffer 464, as well as for the chip enable controls of the ROM's 466 and 468. This logic circuit also feeds control inputs of a further tristate buffer 476 (e.g., 74LS367) which interfaces between the outputs of the op amps associated with the shaft sensors and five respective corresponding data terminals of the ROM's 466 and 468.

Figure 11A:
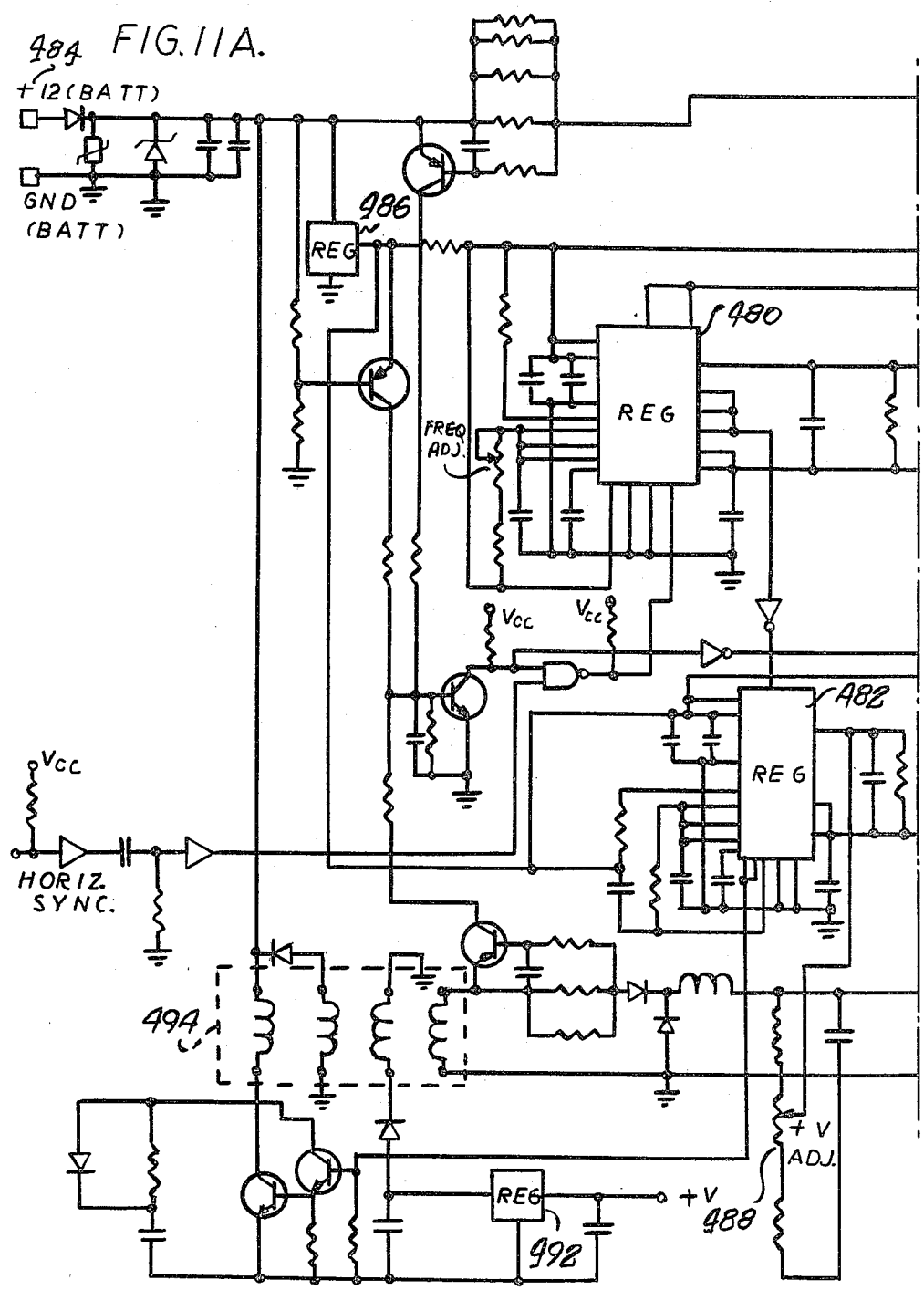

Referring briefly to FIGS. 11A and 11B, an exemplary power supply 84 is illustrated in detail. Briefly, a pair of switching voltage regulator integrated circuit components 480 and 482 are provided and are of the type generally designated ZN1066. Suitable interconnecting logic is provided for adjusting the regulated voltage outputs thereof to suitable levels for powering all of the integrated circuit components thus far illustrated and described. Briefly, in this regard, positive 12 and positive 5 voltage levels are generally required for various ones of these integrated circuit components. An input from the 12-volt tractor battery is designated at the reference numeral 484, and is coupled with a further, intermediate regulating component 486 of the type generally designated 7808, which feeds inputs to the above-mentioned switching regulators 480 and 482. Positive voltage adjust potentiometers 488 and 490 (see FIG. 11B) are provided for adjusting the level of the regulated output voltages. A further regulating component 492 (FIG. 11A) is also provided for generating a negative 12-volt regulated output and is of the type generally designated 7912. A suitable transformer 494 is also indicated in dashed line intermediate the 12-volt tractor battery input 484 and the voltage regulating circuits. Referring briefly to FIG. 11B, an additional integrated circuit component of the type NC3423 is also provided at reference numeral 496, in conjunction with the positive 12-volt supply regulation. A power down (PWR DOWN) output signal line is also provided as indicated at reference numeral 498.

It will be seen from the foregoing that each of the modules is substantially self-contained, to the extent of containing its own program memory for generating the necessary program operation for the monitoring and/or control functions thereof so as to coact with the master or executive processor 62. In this way, the executive processor is advantageously programmed to accept any module having suitable input/output compatibility and to utilize the program or subroutine therefrom to effect operation thereof for performing corresponding control or monitoring functions. Hence, the invention is not strictly limited to the control and monitoring functions specifically mentioned herein but may be readily utilized to perform other similar functions as well with respect to the combine 20. Moreover, each of the modules includes in its ROM memory suitable identifying information as to both the identity and function of the monitor and as to the amount of time required in each operating cycle, and in particular the number of repetitions per cycle of operating time, required of the master processor 62 to carry out the monitoring and/or control functions of that module. Accordingly, each time the monitoring system of the invention is powered up or turned on by the operator, the master processor initially interrogates the data bus lines 64 to note the identifying ROM space in each of the modules, thereby identifying what modules are being utilized at any particular time. Hence, the monitoring and control functions of the system may be varied as desired by the operator by simply plugging in or removing one or more modules as desired, the executive processor 62 being capable of interacting with any combination of such modules.

It will be further recognized that such provision of the necessary program memories for each module in conjunction with the module itself rather than in the executive processor substantially decreases the cost and complexity of the executive processor. Advantageously then, an operator desiring to configure a relatively simple system having but one or two modules need not pay for the additional complexity which might otherwise be required of a central processing unit required to store program memory data for any conceivable combination of such modules. Rather, the purchase and addition of the modules themselves provides the additional capabilities required, via the ROM's associated with each module, for carrying out the monitoring and/or control functions thereof.

The diagnostics module 94 may be viewed as including additional ROM components also containing necessary diagnostic program information, for example in the form shown in FIG. 4A, with suitable intervening buffer components for address and bidirectional data transfer purposes. Accordingly, suitable time intervals would be provided, as programmed into the associated ROM, for operation of the diagnostics functions of the system, including ample time for the operator to utilize the display 76 for locating and reading calibration and/or diagnostic instructions.

In operation, the monitoring and control system of the invention is surprisingly simple to operate even for a relatively unskilled or untrained operator. Initially, when the system is powered up, the executive processor 62 interrogates the main data bus 64 to determine the identify and operating requirements of the modules currently coupled with the data bus 64. In this way, the operator may add or remove modules as desired at any time, the executive processor 62 determining upon each use of the monitoring and control system of the invention, which modules and associated functions are currently being utilized.

Additionally, the control of the overall operation of the monitoring and control system by way of the two operator actuatable controls 76a and 76b of the video display unit 76 is quite simple. In the illustrated embodiment, the screen of information normally displayed during operation includes alphanumeric information as to the values or states of the various combine functions being monitored. However, upon actuation of the control member 76a, a cursor may be moved vertically on the screen to any given line to receive further information regarding that function. Additional alphanumeric lines of display are further provided for selecting for display screens of information relating to the calibration of the system of the invention for operation with a particular combine 20.

Upon selection of this latter, calibration information, screens of instructional information are displayed to the operator for achieving the calibration of the monitoring and control system of the invention for accurate operation with the particular combine 20 upon which the system of the invention is installed. One or more screens of information provide full instructions for substantially automatic control, by way of the operator accessible controls 76a and 76b, of the calibration operations required in this regard.

Upon selection of diagnostic information, the video display unit 76 displays alphanumeric information concerning the function selected by the operator, and permits further details regarding specific malfunctions and procedures for their correction to be further selected for display by the further operation of the cursor by way of control 76a and selection of additional information corresponding to the cursor position selected by operation of control 76b. In this latter regard, sufficient additional time is reserved or set aside and the overall time cycle of operation of the executive processor 62 to permit real time display of these calibration and diagnostic informational messages and instructions, while still carrying on the monitoring and control functions of the system.

An exemplary machine code program for the executive processor 62, and for the ROM programs of the machine parameters module 88, the load control module 92 and the shaft monitor module 90 described above has been submitted as an appendix.

```
:10000000210034343E0351003ACE3B17DA0008FFDC
:10001000C3803C00000000000C3833C00000000000DF
:100020000C3863C00C3400000C3893C0000000000C0
:100030000C383C00000000000C35E0200C3C00400SB
:100040003ACE3BE60SCA5E02E521380022AF3CE129
:100050000C9237CFE38C203003E9232FF373E18207F
:1000600021003811003801550071790723771A366D
:100070003CC27A0078121303369002B7022C0383264
:100080007CFE40FA070131A03E21C324C2802C229D
:1000900083C22863C2283C2283CAF32FE37F4E0
:1000A0008032FE373A00283AFD371FD236003E20AC
:1000B0003C0E3BC30903E0032CE3BCD4E02CD7D31
:1000C0000CD7B043E0432203CFE3AD93B1FD2FCDB
:1000D000CCD2B0621FFFF19D2FC002AD93BF68059
:1000E0002D93B3ACE3BF60222CE3B23E93AD93BFA
:1000F0001FDAED003ACE3BE6FD32CE3B3AD93BE495
:100100007F32D93BC3C900011E0116A0210034F390
:10011000A77230315C2100D3E0032FE3776454CA4
:10012000454354524F4E494320434F4E5452414F37
:1001300020414E44204D4F4F49544F52494E47286
:100140005359535454D4D414C4654544E434344FD8
:100150004E2E20204F4F45544144354420594F5526
:1001600020494820444541C4502046D52524573
:10017000504149525C2520434F4E54494E55544409
:100180204F5045524154494F4E20453320504F23
:100190005353742420C4554N4442204D414E55CE
:1001A000414C204D4F4F54524F4C2E20434155406
:1001B000494F4E209532D41445649534544444CEC
:1001C000454354524F4E494320434F4E5452414F97
:1001D00020414E44204D4F4F49544F52494E4720E6
:1001E00053595354454D4D414C4654544E434344F38
:1001F0004E2E2053485542205359535441D204B6
:100200004F574E20464F5203020534543414EE3
:1002100042052455354541554542E202049462050E8
:10022000524F424C454D205354494C4C20455255E
:100230005349535345523020434F4E54414353420594F28
:100240005552204948204445414C435220464F52282
:1002500020413535495354414E43452E2001BE63
:100260001C30A01EE21D43B3602EBC37C0221A27D
:100270003E22D5B21D43B36002100000CD4503FE74
:10028000552B7E110A00C200031947E6F000F0F02D
:100290000F4F7841E60F914F11D43B1AE601FE0152
:1002A000DACB0278FE01CA390379110008FE00CAD0
:1002B000BF023D19F57CFEF8CA6403F1C3AD02EB41
:1002C00021D43B3E02A677EBC37C0279FE00C27CC0
:1002D00027CD60867EB21D43B7EE602FE02C82AE8
:1002E000D53B73237232322D53B210008EB19F57C03
:1002F000FEF8CA6403F1EB21D43B3600EBC37C0269
:1003000007CFE47DA24033E0032FE373E0832FE37D9
:100310007E3AFD37E601CA24033AC93BF62032C9CA
:100320003BC3240319F57CFEF8CA6403F1EB21D426
:10033000383E01B677EBC37C02EB21D43B7EE60269
:1003400077EBC3CB023E0864770CE60FFE07CA5B15
:100350003FE0FCA5B03782303470370FEF778C80B
:100360002304703F121D43B7EE602FE02274039D
:1003700011FFFFC92AD53B36FF2336FFCC9C3603B9
:100380000C3C2032A3F3C36FF2336FF2336FF231127
```

```
:100390009D057323720921203C223D3C060021A209
:1003A0003E5E2356237AFEFFCA8003E50421EC0754
:1003B000195E23562A3D3C732372232223D3CE1C340
:1003C000A10321C23E223F3C78FE00CA83032120C4
:1003D0003C223D3CE5323C3C2A3F3CEBCD3F082AE9
:1003E000C03B197CPE00C2EF037DFE0CDA70043ABC
:1003F0003C3C2A3D3C4F47814F7E0D2384DA0E045C
:100400002300D00C2FC03FE00E1CA8303E52A3D80
:100410003C0E005E23567AB7CA3E04D5210400196B
:100420007EFEFFCA5404D12A3F3C1A77231 30C796D
:10043000FE05C22A04223F3C2A3D3C7323722 3223C
:100440003D3C0578FE00E1E53A3C3CC20E04223D0D
:100450003CC3D803D12A3D3C36002336002322 3D3D
:100460003C0578FE00C2 1104E1E5223D3CC3D803FF
:1004700021CA3B3E20B677E1C38303CD8E04CD2055
:100480003C21213C3E163600233DC28604C9212072
:100490003C22EF3C21A23E5E2356237AFEFFCABADD
:1004A0004E521E407195E23562AEF3C36CD237379
:1004B0002372232 2EF3CE1C397042AEF3C36C9C9DB
:1004C000FBE5D5C5F53A203CF60232203C32FE373A
:1004D0002ACC3BE52ACF3BE52AD1 3BE52AD33BE5B5
:1004E0002AD53BE52AD73BE52AE53BE52AE73BE56C
:1004F0002AE93BE52AEB3BE52AED3BE52AEF3BE524
:100500002AF13BE52AF33BE52AF53BE52AF73BE5F3
:100510003AC23B3CFE13FA25053A203CF60132204F
:100520003C32FE37AF32C23B3ACE3BE601C2420517
:100530003ACE3BF60132CE3B210003922C73BC305
:100540004A053AC93BF60132C93B2AC73BF90100CB
:1005500083AC23BB2FA6005 0C90B8FA6005 0C90F6
:1005600047AF3C0405CA6C0517C36405 32C33B7929
:1005700032C43B21C23E22C53B3AC43B4F06000970
:100580003AC33BA6C291052AC53B010500 09C376C3
:10059000052AC53B010300095E2356EBE92AC73B48
:1005A000EBCD3F08EB397D84CAB3053AC93BF6026F
:1005B00032C93BF32AC73BF93ACE3BE6FE32CE3BBB
:1005C000E122F73BE122F53BE122F33BE122F13B63
:1005D000E122EF3BE122ED3BE122EB3BE122E93B73
:1005E000E122E73BE122E53BE122D53BE122D53B9D
:1005F000E122D33BE122D13BE122CF3BE122CC3BC4
:100600003ACE3B17D21A063AFC33FE80DA1A06CDF0
:10061000C083AFC33FE80D21206 3A203CE6FD324A
:10062000203C32FE37F1C1D1E1FBC9213B3C360011
:100630002ADE3B5C557BFE15DA4706FE18D24706DC
:1006400016003E00320E3B21A23E4E2346E5C56049
:10065000690101 0009D25E06C1E1110 00C9213B18
:100660003C347EFE0ECAA906E101EE07094E234680
:10067000A6F030A677DBBC287067CBAC28706037E
:10068000A5F030A57E1C90303030A6F030A67E518
:10069000D5110101 9D1D29F06E1E123C34A06E139
:1006A0007CFE17D29906C37506C1E121CA3B7EF6CE
:1006B0001077C9FFFFFFFFFFFFFFFFFFFFFFFFFFF7
:1006C000FFFFFFFFFFFFFFFFFFFFFFFFFFFFFFFF3A
:1006D000FFFFFFFFFFFFFFFFFFFFFFFFFFFFFFFF2A
:1006E000FFFFFFFFFFFFFFFFFFFFFFFFFFFFFFFF1A
```

```
:1006F000FFFFFFFFFFFFFFFFFFFFFFFFFFFFFFFF0A
:10070000FFFFFFFFFFFFFFFFFFFFFFFFFFFFFFFFF9
:10071000FFFFFFFFFFFFFFFFFFFFFFFFFFFFFFFFE9
:10072000FFFFFFFFFFFFFFFFFFFFFFFFFFFFFFFFD9
:10073000FFFFFFFFFFFFFFFFFFFFFFFFFFFFFFFFC9
:10074000FFFFFFFFFFFFFFFFFFFFFFFFFFFFFFFFB9
:10075000FFFFFFFFFFFFFFFFFFFFFFFFFFFFFFFFA9
:10076000FFFFFFFFFFFFFFFFFFFFFFFFFFFFFFFF99
:10077000FFFFFFFFFFFFFFFFFFFFFFFFFFFFFFFF89
:10078000FFFFFFFFFFFFFFFFFFFFFFFFFFFFFFFF79
:10079000FFFFFFFFFFFFFFFFFFFFFFFFFFFFFFFF69
:1007A000FFFFFFFFFFFFFFFFFFFFFFFFFFFFFFFF59
:1007B000FFFFFFFFFFFFFFFFFFFFFFFFFFFFFFFF49
:1007C000FFFFFFFFFFFFFFFFFFFFFFFFFFFFFFFF39
:1007D000FFFFFFFFFFFFFFFFFFFFFFFFFFFFFFFF29
:1007E000FFFFFFFFFFFFFFFFFFFFFFFFFFFFFFFF19
:1007F000FFFFFFFFFFFFF15E9FFFFFFFFFFFFFFF09
:10080000C38705C3ED00C3BB00C30028C3082BC3CA
:10081000018C30A18C35E1CC31418C3001EC324E7
:100820001EC32E18C34A18C35018C36A18C37018C1
:10083000C33A18C39018C3B71DC3A21DC38D1DC39F
:10084000DD18C3331AC3D61AC3B919C3A619C30A0C
:100850001AC3121BC3401CC36B1CC3751CC3861C6C
:10086000C39F1CC3B71CC3C11CC3CB1CC3FE1CFF4E
:10087000FFFFFFFFFFFFFFFFFFFFFFFFFFFFFFFF88
:10088000FFFFFFFFFFFFFFFFFFFFFFFFFFFFFFFF78
:10089000FFFFFFFFFFFFFFFFFFFFFFFFFFFFFFFF68
:1008A000FFFFFFFFFFFFFFFFFFFFFFFFFFFFFFFF58
:1008B000FFFFFFFFFFFFFFFFFFFFFFFFFFFFFFFF48
:1008C000FFFFFFFFFFFFFFFFFFFFFFFFFFFFFFFF38
:1008D000FFFFFFFFFFFFFFFFFFFFFFFFFFFFFFFF28
:1008E000FFFFFFFFFFFFFFFFFFFFFFFFFFFFFFFF18
:1008F000FFFFFFFFFFFFFFFFFFFFFFFFFFFFFFFF08
:100900003E0132DE3BCD2408119A0301A403CD271A
:100910008CD6308C3230953595354454D204D4511
:100920004E5500010E00111709CD1208C37B093E78
:1009300063 2DE3BCD2408117203018403CD270863
:10094000C3520953595354454D205741524E494EB5
:1009500047000107001143 09CD1208CD6308CD6699
:100960008C30308CD2408 3E0032DE3B114A0301D0
:100970005603CD2708CD6608C3030821A23E5E2397
:100980005623E5EBE511010019E1DAB90911F50784
:1009900019567DD6056F7AE5210000112800FE006A
:1009A000CAA809193DC2A309110300194D44E15E0B
:1009B0002356CD1208E1C37E09E1C3030821DE3BC3
:1009C0003613CD2408117203018403CD27080102D8
:1009D000002AF027EBCD120821C93BB77EFE00CAE2
:1009E000030807D2F10901AA02114A0BF5CD1208 3A
:1009F000F107D2000A015A02113 00BF5CD1208F1AD
:100A0000007D20FCA010A02110 90BF5CD1208F107EE
:100A1000D21E0A01BA0111E70AF5CD1208F107D278
:100A20002D0A016A0111C30AF5CD1208F107D23C63
:100A30000A011A0111A40AF5CD1208F107D24B0AD6
:100A400001CA0011830AF5CD1208F107D2030B018B
:100A50007A00115D0AF5CD1208F1C3030853595 30A
```

```
:100A600054454D204552524F522030202D20494EA2
:100A70005445525255505420502454454D505449BA
:100A80004F4E0053595354454D204552524F52201A
:100A9000312020544E5245534F4C564544420535417
:100AA00041434B0053595354454D204552524F52E8
:100AB00020322020204E564D20504F574552204C4F4B
:100AC00053530053595354454D204552524F5220D1
:100AD0003320205041525449414C204E564D20461F
:100AE00041494C55524500535953544454D204552A8
:100AF000524F2034202054F54414C204E564DDA
:100B0000204641494C5552450053595354454D2088
:100B10004552524F2035202054E4445464 94EAD
:100B20004544204D4F44554C45204641554C400EA
:100B300053595354454D204552524F2036202090
:100B4000554E44454649 4E454400535953 54454D2E
:100B500020455252 4F2037 2020 554E4454649999
:100B60004E45 4400CD2408CD660821DE3B361201F7
:100B70000700110E0CCD1208017A0011EF0BCD12F7
:100B80000801F20011D10BCD12083A1CFCE680CA14
:100B9000A70B01AC0011BC0BCD12080124011 1C739
:100BA0000BCD1208C3030801AC0011C70BCD12080E
:100BB000012401 11BC0BCD1208C3030B2D4449 5375
:100BC00041424C44442D002D454E41424C454442D5B
:100BD000005354 4C45543 542F454E445522046 4FF3
:100BE000522 04D45545249432 0554E49 545300 53C9
:100BF000454C4543 542F454E 44552204F52 20B4
:100C0000454E474C49534820554E495453005397B
:100C100053544454D20434F4E54524F4C204D4F 44 5A
:100C2000554C45204D454E50011A00001C700CD43
:100C300027081118010 13F01CD270801AC0011C799
:100C40000BCD120801240111BC0BCD12083A1CFC7B
:100C5000E67F111CFC21983C77CD3608C3030811B0
:100C6000A00001C700CD270811180 1013F01CD27C1
:100C70000801AC0011BC0BCD120801240111C70BF7
:100C8000CD12083A1CFCF680111CFC21983C77CD53
:100C90003608C3030BFFFFFFFFFFFFFFFFFFFFFF53
:100CA000FFFFFFFFFFFFFFFFFFFFFFFFFFFFFFFF54
:100CB000FFFFFFFFFFFFFFFFFFFFFFFFFFFFFFFF44
:100CC000FFFFFFFFFFFFFFFFFFFFFFFFFFFFFFFF34
:100CD000FFFFFFFFFFFFFFFFFFFFFFFFFFFFFFFF24
:100CE000FFFFFFFFFFFFFFFFFFFFFFFFFFFFFFFF14
:100CF000FFFFFFFFFFFFFFFFFFFFFFFFFFFFFFFF04
:100D0000FFFFFFFFFFFFFFFFFFFFFFFFFFFFFFFFF3
:100D1000FFFFFFFFFFFFFFFFFFFFFFFFFFFFFFFFE3
:100D2000FFFFFFFFFFFFFFFFFFFFFFFFFFFFFFFFD3
:100D3000FFFFFFFFFFFFFFFFFFFFFFFFFFFFFFFFC3
:100D4000FFFFFFFFFFFFFFFFFFFFFFFFFFFFFFFFB3
:100D5000FFFFFFFFFFFFFFFFFFFFFFFFFFFFFFFFA3
:100D6000FFFFFFFFFFFFFFFFFFFFFFFFFFFFFFFF93
:100D7000FFFFFFFFFFFFFFFFFFFFFFFFFFFFFFFF83
:100D8000FFFFFFFFFFFFFFFFFFFFFFFFFFFFFFFF73
:100D9000FFFFFFFFFFFFFFFFFFFFFFFFFFFFFFFF63
:100DA000FFFFFFFFFFFFFFFFFFFFFFFFFFFFFFFF53
:100DB000FFFFFFFFFFFFFFFFFFFFFFFFFFFFFFFF43
:100DC000FFFFFFFFFFFFFFFFFFFFFFFFFFFFFFFF33
```

```
:100DD000FFFFFFFFFFFFFFFFFFFFFFFFFFFFFFFF23
:100DE000FFFFFFFFFFFFFFFFFFFFFFFFFFFFFFFF13
:100DF000FFFFFFFFFFFFFFFFFFFFFFFFFFFFFFFF03
:100E0000FFFFFFFFFFFFFFFFFFFFFFFFFFFFFFFF2
:100E1000FFFFFFFFFFFFFFFFFFFFFFFFFFFFFFFE2
:100E2000FFFFFFFFFFFFFFFFFFFFFFFFFFFFFFFD2
:100E3000FFFFFFFFFFFFFFFFFFFFFFFFFFFFFFFC2
:100E4000FFFFFFFFFFFFFFFFFFFFFFFFFFFFFFFB2
:100E5000FFFFFFFFFFFFFFFFFFFFFFFFFFFFFFFA2
:100E6000FFFFFFFFFFFFFFFFFFFFFFFFFFFFFFF92
:100E7000FFFFFFFFFFFFFFFFFFFFFFFFFFFFFFF82
:100E8000FFFFFFFFFFFFFFFFFFFFFFFFFFFFFFF72
:100E9000FFFFFFFFFFFFFFFFFFFFFFFFFFFFFFF62
:100EA000FFFFFFFFFFFFFFFFFFFFFFFFFFFFFFF52
:100EB000FFFFFFFFFFFFFFFFFFFFFFFFFFFFFFF42
:100EC000FFFFFFFFFFFFFFFFFFFFFFFFFFFFFFF32
:100ED000FFFFFFFFFFFFFFFFFFFFFFFFFFFFFFF22
:100EE000FFFFFFFFFFFFFFFFFFFFFFFFFFFFFFF12
:100EF000FFFFFFFFFFFFFFFFFFFFFFFFFFFFFFF02
:100F0000206BD0915006409160020F0917000009 23
:100F10000301640B0312290C06125F0CFFFFFFFF95
:100F2000FFFFFFFFFFFFFFFFFFFFFFFFFFFFFFD1
:100F3000FFFFFFFFFFFFFFFFFFFFFFFFFFFFFFFC1
:100F4000FFFFFFFFFFFFFFFFFFFFFFFFFFFFFFFB1
:100F5000FFFFFFFFFFFFFFFFFFFFFFFFFFFFFFFA1
:100F6000FFFFFFFFFFFFFFFFFFFFFFFFFFFFFFF91
:100F7000FFFFFFFFFFFFFFFFFFFFFFFFFFFFFFF81
:100F8000FFFFFFFFFFFFFFFFFFFFFFFFFFFFFFF71
:100F9000FFFFFFFFFFFFFFFFFFFFFFFFFFFFFFF61
:100FA000FFFFFFFFFFFFFFFFFFFFFFFFFFFFFFF51
:100FB000FFFFFFFFFFFFFFFFFFFFFFFFFFFFFFF41
:100FC000FFFFFFFFFFFFFFFFFFFFFFFFFFFFFFF31
:100FD000FFFFFFFFFFFFFFFFFFFFFFFFFFFFFFF21
:100FE000FFFFFFFFFFFFFFFFFFFFFFFFFFFFFFF11
:100FF000FFFFFFFFFFFFFF25CAFFFFFFFFFFFFFF10
:101000003ADE3BFE00C2000811003821003401B96D
:101010000C8EB7EA7EBFA191077E509E1DA0008239F
:1010200013C311103A383C3CFE02F2331032383C04
:10103000C30008AF32383C3ADE3BFE00C200081164
:101040000038210034301B9C8EB7E17A7EBFA5B101A
:10105000E509E1DA00082313C348103620C3501015
:10106000CDDA11363E2336203AD93BA7F271103630
:101070003E21FC377E2FE607160415CA85100FD2D5
:101080007A10C3A2103A1E3C1FDA97103A1E3CF6A3
:1010900001321E3CC342113AD93BE6FE32D93BC372
:1010A00042117AFE01C2D6103AD93BE602C2BB1009
:1010B0003AD93BF60232D93BC300083AD93BE601A4
:1010C000C242113AD93BF60132D93B3A1E3CE6FE08
:1010D000321E3CC342113AD93BE604C2E9103AD968
:1010E0003BF60432D93BC34F113ADA3BC60132DA40
:1010F0003B3ADA3BFE01CA57113ADA3BFE10DA00FE
:101100003ADA3BFE28D223113AD93BF60832D905
:101110003B3ADB3B3D32DB3BC200083E0632DB3B69
:101120000C357113AD93BF61032D93B3ADB3B3D323B
:101130000DB3BCA1B113ADB3B3D32DB3BCA1B11C315
```

```
:101140000083E0032DA3B3AD93BE68132D93B3ED9
:101150000632DB3BC30008 3AD93BA7F27A117AFE8C
:101160003CA6F113AD93BF64032D93BC300083A63
:10117000D93BF62032D93BC300080128000CDDA1153
:1011800007AFE03CAAF113AD93BF64032D93B3ADC7A
:101190003B5F3ADF3BE61FBBCA0008C6015F3ADF90
:1011A0003BE6E0B332DF3B36200936 3EC300083A67
:1011B000D93BF62032D93B3ADD3B5F3ADF3BE61FB5
:1011C000BBCA000 83D5F3ADF3BE6E0B332DF3B36A7
:1011D0002001D8FF09363EC30008D52ADF3B3E1F59
:1011E000A56F2600292929E52929D11911003419CB
:1011F000D1C93AE03BE601FE01C200083AE13B3D8D
:1012000032E13BC200083E2432E13BAF3A01FCC66A
:10121000132E53B3A02FCCE0032E63B2A03FCCE1B
:101220000F620E62F32E73B1101FC21E53BCD3CE7
:101230008CD51QS01B30311EC3BCD1208C30008DA
:101240003A203CE6FE32203C32FE37C300083ACE5C
:101250003BE40CA87123A203CE6FB32203CC3B77B
:10126000123A203CF60432203C21213C7EFE0CA8A
:101270000082323237DFE36C26C12117203018401
:101280003CD2708C300083A203CFE10DA9F12C69F
:10129000132203CD2AF12E6FB32203CC3C5123ADA
:1012A000CE3BE620CAC5123A203CC610C2971233A7C
:1012B000CE3BE620CABA12C3C5123A203CE60F3232
:1012C000203CC3C5123ACE3BE410C2D912117203BC
:1012D00018403CD2708C3EA123ADE3BFE06CAEAC0
:1012E0001201720311F512CD1208 3ACE3BE68F328D
:1012F000CE3BC30008535953544 54D205741524EDD
:10130000494E47204D454E55002121 3C01320 27E79
:10131000FE00C22D13232323E5C5114313CD0F086F
:101320000C339137DFE35D20008C30F1335235EC8
:10133000 0235623E5C5CD1808C1212 8000 94D44E1F5
:10134000C324132020202020202020202020202003
:1013500020202020202020202020202020202 0208D
:10136000202020202020202000 21C93BB77EFE05
:1013700000CA0008F5E53ACE3BF630 32CE3B3ADE05
:101380003BFE06C290130152002AF027EBCD120853
:10139000E1F107D29C13014E14CD6C0807D2A613BD
:1013A00013F14CD6C0807D2B013013014CD6C0886
:1013B0007D2BA13012114CD6C0807D2C41301124D
:1013C00014CD6C0807D2CE13010314CD6C0807D2DC
:1013D000D81301F413CD6C0807D2000801E513CD32
:1013E0006C08C300085359535445402045525246E81
:1013F0005220300053595354454D204552524F52BC
:1014000020310053595354454D204552524F5220DC
:1014100032005359535445404D204552524F52 2033B8
:1014200000535953544 54D204552524F522 03400D9
:10143000535953544 54D204552524F5220 35005375
:10144000595354454D20 45525255 2203600 53595E
:1014500053544 54D204552524F52 203700FFFFFF55
:10146000FFFFFFFFFFFFFFFFFFFFFFFFFFFFFFFF8C
:10147000FFFFFFFFFFFFFFFFFFFFFFFFFFFFFFFF7C
:10148000FFFFFFFFFFFFFFFFFFFFFFFFFFFFFFFF6C
:10149000FFFFFFFFFFFFFFFFFFFFFFFFFFFFFFFF5C
:1014A000FFFFFFFFFFFFFFFFFFFFFFFFFFFFFFFF4C
```

```
:1014B000FFFFFFFFFFFFFFFFFFFFFFFFFFFFFFFF3C
:1014C000FFFFFFFFFFFFFFFFFFFFFFFFFFFFFFFF2C
:1014D000FFFFFFFFFFFFFFFFFFFFFFFFFFFFFFFF1C
:1014E000FFFFFFFFFFFFFFFFFFFFFFFFFFFFFFFF0C
:1014F000FFFFFFFFFFFFFFFFFFFFFFFFFFFFFFFFFC
:10150000FFFFFFFFFFFFFFFFFFFFFFFFFFFFFFFFEB
:10151000FFFFFFFFFFFFFFFFFFFFFFFFFFFFFFFFDB
:10152000FFFFFFFFFFFFFFFFFFFFFFFFFFFFFFFFCB
:10153000FFFFFFFFFFFFFFFFFFFFFFFFFFFFFFFFBB
:10154000FFFFFFFFFFFFFFFFFFFFFFFFFFFFFFFFAB
:10155000FFFFFFFFFFFFFFFFFFFFFFFFFFFFFFFF9B
:10156000FFFFFFFFFFFFFFFFFFFFFFFFFFFFFFFF8B
:10157000FFFFFFFFFFFFFFFFFFFFFFFFFFFFFFFF7B
:10158000FFFFFFFFFFFFFFFFFFFFFFFFFFFFFFFF6B
:10159000FFFFFFFFFFFFFFFFFFFFFFFFFFFFFFFF5B
:1015A000FFFFFFFFFFFFFFFFFFFFFFFFFFFFFFFF4B
:1015B000FFFFFFFFFFFFFFFFFFFFFFFFFFFFFFFF3B
:1015C000FFFFFFFFFFFFFFFFFFFFFFFFFFFFFFFF2B
:1015D000FFFFFFFFFFFFFFFFFFFFFFFFFFFFFFFF1B
:1015E000FFFFFFFFFFFFFFFFFFFFFFFFFFFFFFFF0B
:1015F000FFFFFFFFFFFFFFFFFFFFFFFFFFFFFFFFFB
:10160000FFFFFFFFFFFFFFFFFFFFFFFFFFFFFFFFEA
:10161000FFFFFFFFFFFFFFFFFFFFFFFFFFFFFFFFDA
:10162000FFFFFFFFFFFFFFFFFFFFFFFFFFFFFFFFCA
:10163000FFFFFFFFFFFFFFFFFFFFFFFFFFFFFFFFBA
:10164000FFFFFFFFFFFFFFFFFFFFFFFFFFFFFFFFAA
:10165000FFFFFFFFFFFFFFFFFFFFFFFFFFFFFFFF9A
:10166000FFFFFFFFFFFFFFFFFFFFFFFFFFFFFFFF8A
:10167000FFFFFFFFFFFFFFFFFFFFFFFFFFFFFFFF7A
:10168000FFFFFFFFFFFFFFFFFFFFFFFFFFFFFFFF6A
:10169000FFFFFFFFFFFFFFFFFFFFFFFFFFFFFFFF5A
:1016A000FFFFFFFFFFFFFFFFFFFFFFFFFFFFFFFF4A
:1016B000FFFFFFFFFFFFFFFFFFFFFFFFFFFFFFFF3A
:1016C000FFFFFFFFFFFFFFFFFFFFFFFFFFFFFFFF2A
:1016D000FFFFFFFFFFFFFFFFFFFFFFFFFFFFFFFF1A
:1016E000FFFFFFFFFFFFFFFFFFFFFFFFFFFFFFFF0A
:1016F000FFFFFFFFFFFFFFFFFFFFFFFFFFFFFFFFFA
:1017000000100401201000000100010002410FF23
:10171000FFFF6010000008F2110000804E12000868
:101720000611200008009130000806A13000000AD
:10173000FFFFFFFFFFFFFFFFFFFFFFFFFFFFFFFFB9
:10174000FFFFFFFFFFFFFFFFFFFFFFFFFFFFFFFFA9
:10175000FFFFFFFFFFFFFFFFFFFFFFFFFFFFFFFF99
:10176000FFFFFFFFFFFFFFFFFFFFFFFFFFFFFFFF89
:10177000FFFFFFFFFFFFFFFFFFFFFFFFFFFFFFFF79
:10178000FFFFFFFFFFFFFFFFFFFFFFFFFFFFFFFF69
:10179000FFFFFFFFFFFFFFFFFFFFFFFFFFFFFFFF59
:1017A000FFFFFFFFFFFFFFFFFFFFFFFFFFFFFFFF49
:1017B000FFFFFFFFFFFFFFFFFFFFFFFFFFFFFFFF39
:1017C000FFFFFFFFFFFFFFFFFFFFFFFFFFFFFFFF29
:1017D000FFFFFFFFFFFFFFFFFFFFFFFFFFFFFFFF19
:1017E000FFFFFFFFFFFFFFFFFFFFFFFFFFFFFFFF09
:1017F000FFFFFFFFFFFFF35EEFFFFFFFFFFFFFFFD4
:10180000CDF518CD0119CDAC18C9CDE918CD011908
:10181000CDAC18C9CDF518CD01192AD23B2AD23B3F
```

```
:101820007EFE00C8F640EB7723EB23C32018CDF5EE
:1018300018CD4619EB22D23B5950CD621913CDDD9C
:10184000182AD23B040CDBD18C911000001470330
:101850000DE918CD4619EB22D23B5950CD62191370
:101860000CDDD182AD23BCDC818C9110000014703AD
:10187000CDF518CD4619EB22D23B5950CD62191344
:101880000CDDD182AD23BCDC818C91100000147038D
:10189000CDF518CD4619EB22D23B5950CD62191324
:1018A0000CDDD182AD23B06BFCDD218C92AD23B7E45
:1018B000FE00C8E6BFEB7723EB23C3AF187EB077FB
:1018C00023E519E1D2BD18C9362023E519E1D2C8B4
:1018D00018C97EA0772EE519E1D2D218C97B2F6FF2
:1018E0007A2F6701010009EBC921CF3B3638233637
:1018F00037233634C921CF3B363C23363B23363899
:101900000C9EB22D23B21D13B7986575921CF3B7A74
:101910000BED2741923B6C21F197BFEC0D28319061D
:1019200002AD23B7EFE00CA35192378FE28CA7EE3
:101930001904C3241921D03B7ABEC07BFE99D830FC
:10194000FEC1D29C19C921D13B7A86577886477A45
:101950000B8DA6219C292197BB9DA6219CA6219C37C
:10196000921921CF3B7ABED2741923BEC07BFEC030
:10197000D28819C921CA3B3E01B6773333C921CA7F
:101980003B3E02B6773333C921CA3B3E01B67733BB
:1019900033C921CA3B3E04B6773333C921CA3B3E23
:1019A0003B6773333C979210001600E082917CD
:1019B000D2B419190DC2AE19C9606922F53B0E00E7
:1019C00021000060B2979894F3AF63B0732F63B99
:1019D000D2D81919D2B190C05C2C519060129790E
:1019E000894F788847DAFA193AF53B0732F53BD246
:1019F000DE1919D2DE1903C3DE193AF53B0732F5B9
:101A0000B3BD2091A19D2091A03C97BE60F577B1773
:101A1000D2211A2979174F781747157F2131AC332B2
:101A20001AB77B1F47791F4F7C1F677D1F6F15F20C
:101A30000211AC922F53B6049424B1E00140129 7B21
:101A4000BE5FDA5A1A7C91677B98D25F1A7C816728
:101A5000B77A1757D23E1AC3671A7C91677B985F93
:101A60007A371757D23E1A3AF63B6F7A32F63B1660
:101A7000001297B855FDA8D1A7C91677B98D2921A51
:101A80007C8167B77A1757D2711AC39A1A7C91670B
:101A90007B985F7A371757D2711A3AF53B6F7A32D3
:101AA000F53B601297B8B5FDAC01A7C91677B9826
:101AB000D2C51A7C8167B77A1757D2A41AC3CD1A3B
:101AC0007C91677B985F7A371757D2A41A7C2AF5E6
:101AD0003B444D6F63C90E006082979174FDAECB5
:101AE0001A93D2ED1A05C2DA1AC3F31A934F2C05D2
:101AF000C2DA1A06082979174FDA071B93D2081B96
:101B000005C2F51AC30E1B934F2C05C2F51A4461BA
:101B10004DC93E0632EB3B01EC3B3E0032D53B214A
:101B2000E73B7EE6F032D43B3E2002033AD53B3C15
:101B300032D53B3AD63BE6FE32D63B7EE60F32E765
:101B40003B21E83B3E0077237723772AE53B3AE7C2
:101B50003B2917291729172291722E53B32E73B1E96
:101B60001421E53B7E8777237E8F77237E8F772333
:101B70007E8F2777237E8F2777237E8F27771DC23F
:101B80000611B7EE6F01F1F1F1FC38F1B7EE60F57D2
```

:101B9000FE00C2A21B3AD63BE601FE01C2C91BC32E
:101BA000AA1B3AD63BF60132D63B3AD43BE6701F2D
:101BB0001F1F1F5F3AEB3BBBC2F31B3E2E02033AD3
:101BC000D53B3C32D53BC3F31B3AD43BE6701F1FD9
:101BD0001F1F5F3AEB3BBBC2E51B3AD63BF6013217
:101BE000D63BC3BB1B3E2002033AD53B3C32D53B20
:101BF000C3FF1B7AC63002033AD53B3C32D53B3A91
:101C0000EB3B3D32EB3B0FDA8C1B2B3AEB3BFE0000
:101C1000C2821B3AD53BFE07C22A1C3E20020B0A99
:101C2000FE20C2281C3E300203033E00023AD43B91
:101C300007D23F1C0B0BAFE20C2351C3E2D02C9E9
:101C40000128001100342100388EB36A009EB36A042
:101C500097CFE3BC2491C7DFEC0C2491CC9C5E5CA
:101C6000F5CD3F08F1E1C1373F19C9010000011006E
:101C700000210000C93AD93BE601C2751C3AD93BA4
:101C8000F68032D93BC93AD93BE601C2B01C3AC210
:101C90003BE603C2861C3AD93BE660CA861CC93AB9
:101CA000D93BE601C2B01C3AC23BE603CA9F1CC93D
:101CB000E1CD751CC3030811D51C014A03CD1208E0
:101CC000C911E31C019A03CD1208C911EF1C01725E
:101CD00003CD1208C94E4F524D414C2053435245˙3B
:101CE000454E0053595354454D204D454E55005304
:101CF000595354454D205741524E494E4700F52106
:101D0000320222F73B21213C22363C7EFE00CA3CB7
:101D10001D235E23567BB9C2261D7AB8C2261D2B11
:101D20002B3603C3641D237DFE35D2541DE52AF7EF
:101D30003B112800192F73BE1C30B1D2322363C3F
:101D4000C5EB2AF73B4D44EB11661DCD0F08C123AF
:101D500023C3271D2A363C7DFE21CA641D2B360372
:101D600023712370F1C920202020202020202052
:101D700020202020202020202020202020202063
:101D800020202020202020202020202000E3228F3F
:101D90003CE13ACE3BF60832CE3BCDD51D1323C3F2
:101DA000A71DE3228F3CE13ACE3BF60832CE3BCD75
:101DB000D51D1323C3BC1DE3228F3CE13ACE3BF675
:101DC0000832CE3BCDD51DE52A8F3CE33ACE3BE62B
:101DD000F732CE3BC9C546EB3E00D3FF3E02D3FFF0
:101DE000703E00D3FF3E03D3FF703ACD3BFE08CADE
:101DF000F91D3E06D3FFC3FD1D3E10D3FFEBC1C945
:101E0000C5626B7EA7CA161EEEFFCA221E7E6069DF
:101E1000770313C3011EC12128009444DC513C314
:101E2000011EC1C9E5D5C5EB3E06D3FF7E3293C0A
:101E30003E07D3FF7E32943C3E0AD3FF7E32953C70
:101E40003E0BD3FF7E32963C3A913CE60832913C01
:101E50003A923CE6F08C32923C545D21933C463A47
:101E6000933CB8CA711E3A913CF68032913CC378DB
:101E70001E3A913C3C32913C3A943CB8CA8A1E3A94
:101E80000913CF64032913CC3911E3A913C3C3291D8
:101E90003C3A953CB8CAA31E3A913CF62032913C9C
:101EA000C3AA1E3A913C3C32913C3A963CB8CABC1B
:101EB0001E3A913CF61032913CC3C31E3A913C3C11
:101EC00032913C3A913CE607FE04C2D31E3E00C16B
:101ED000D1E1C93A913CE607FE01C2F81E23463A19
:101EE000923C3C32923CE607FE04CA021F3A913C07
:101EF000E60832913CC35F1E3A913CE607FE02C2FF

```
:101F0000081F3E08C1D1E1C93A913C17D2161FCD36
:101F1000331FC1D1E1C917D2211FCD451FC1D1E164
:101F2000C917D22C1FCD871FC1D1E1C9CD991FC1BF
:101F3000D1E1C9EB3E00D3FF3E06D3FF703E06D38E
:101F4000FF7EC3541FEB3E00D3FF3E07D3FF703E1E
:101F50007D3FF7EB8C25B1F3E01C93ACD3BE620E6
:101F6000FE20C2701F3AC93BF61032C93B3E04C97D
:101F70003ACD3BF60832CD3B3AC93BF60832C93B75
:101F80003E10D3FF3E02C9EB3E00D3FF3E0AD3FF13
:101F9000703E0AD3FF7EC3A81FEB3E00D3FF3E096B
:101FA000D3FF703E0BD3FF7EB8C2AF1F3E01C93ACC
:101FB000CD3BE608FE08C2C41F3AC93BF61032C941
:101FC0003B3E04C93ACD3BF62032CD3E3AC93BF605
:101FD000832C93B3E06D3FF3E02C9FFFFFFFFFFA9
:101FE000FFFFFFFFFFFFFFFFFFFFFFFFFFFFFFFF01
:101FF000FFFFFFFFFFFF4570FFFFFFFFFFFFFFFF3A
:10200000FFFFFFFFFFFFFFFFFFFFFFFFFFFFFFFFE0
:10201000FFFFFFFFFFFFFFFFFFFFFFFFFFFFFFFFD0
:10202000FFFFFFFFFFFFFFFFFFFFFFFFFFFFFFFFC0
:10203000FFFFFFFFFFFFFFFFFFFFFFFFFFFFFFFFB0
:10204000FFFFFFFFFFFFFFFFFFFFFFFFFFFFFFFFA0
:10205000FFFFFFFFFFFFFFFFFFFFFFFFFFFFFFFF90
:10206000FFFFFFFFFFFFFFFFFFFFFFFFFFFFFFFF80
:10207000FFFFFFFFFFFFFFFFFFFFFFFFFFFFFFFF70
:10208000FFFFFFFFFFFFFFFFFFFFFFFFFFFFFFFF60
:10209000FFFFFFFFFFFFFFFFFFFFFFFFFFFFFFFF50
:1020A000FFFFFFFFFFFFFFFFFFFFFFFFFFFFFFFF40
:1020B000FFFFFFFFFFFFFFFFFFFFFFFFFFFFFFFF30
:1020C000FFFFFFFFFFFFFFFFFFFFFFFFFFFFFFFF20
:1020D000FFFFFFFFFFFFFFFFFFFFFFFFFFFFFFFF10
:1020E000FFFFFFFFFFFFFFFFFFFFFFFFFFFFFFFF00
:1020F000FFFFFFFFFFFFFFFFFFFFFFFFFFFFFFFFF0
:10210000FFFFFFFFFFFFFFFFFFFFFFFFFFFFFFFFDF
:10211000FFFFFFFFFFFFFFFFFFFFFFFFFFFFFFFFCF
:10212000FFFFFFFFFFFFFFFFFFFFFFFFFFFFFFFFBF
:10213000FFFFFFFFFFFFFFFFFFFFFFFFFFFFFFFFAF
:10214000FFFFFFFFFFFFFFFFFFFFFFFFFFFFFFFF9F
:10215000FFFFFFFFFFFFFFFFFFFFFFFFFFFFFFFF8F
:10216000FFFFFFFFFFFFFFFFFFFFFFFFFFFFFFFF7F
:10217000FFFFFFFFFFFFFFFFFFFFFFFFFFFFFFFF6F
:10218000FFFFFFFFFFFFFFFFFFFFFFFFFFFFFFFF5F
:10219000FFFFFFFFFFFFFFFFFFFFFFFFFFFFFFFF4F
:1021A000FFFFFFFFFFFFFFFFFFFFFFFFFFFFFFFF3F
:1021B000FFFFFFFFFFFFFFFFFFFFFFFFFFFFFFFF2F
:1021C000FFFFFFFFFFFFFFFFFFFFFFFFFFFFFFFF1F
:1021D000FFFFFFFFFFFFFFFFFFFFFFFFFFFFFFFF0F
:1021E000FFFFFFFFFFFFFFFFFFFFFFFFFFFFFFFFFF
:1021F000FFFFFFFFFFFFFFFFFFFFFFFFFFFFFFFFEF
:10220000FFFFFFFFFFFFFFFFFFFFFFFFFFFFFFFFDE
:10221000FFFFFFFFFFFFFFFFFFFFFFFFFFFFFFFFCE
:10222000FFFFFFFFFFFFFFFFFFFFFFFFFFFFFFFFBE
:10223000FFFFFFFFFFFFFFFFFFFFFFFFFFFFFFFFAE
:10224000FFFFFFFFFFFFFFFFFFFFFFFFFFFFFFFF9E
:10225000FFFFFFFFFFFFFFFFFFFFFFFFFFFFFFFF8E
:10226000FFFFFFFFFFFFFFFFFFFFFFFFFFFFFFFF7E
:10227000FFFFFFFFFFFFFFFFFFFFFFFFFFFFFFFF6E
```

```
:10228000FFFFFFFFFFFFFFFFFFFFFFFFFFFFFFFF5E
:10229000FFFFFFFFFFFFFFFFFFFFFFFFFFFFFFFF4E
:1022A000FFFFFFFFFFFFFFFFFFFFFFFFFFFFFFFF3E
:1022B000FFFFFFFFFFFFFFFFFFFFFFFFFFFFFFFF2E
:1022C000FFFFFFFFFFFFFFFFFFFFFFFFFFFFFFFF1E
:1022D000FFFFFFFFFFFFFFFFFFFFFFFFFFFFFFFF0E
:1022E000FFFFFFFFFFFFFFFFFFFFFFFFFFFFFFFFFE
:1022F000FFFFFFFFFFFFFFFFFFFFFFFFFFFFFFFFEE
:10230000FFFFFFFFFFFFFFFFFFFFFFFFFFFFFFFFDD
:10231000FFFFFFFFFFFFFFFFFFFFFFFFFFFFFFFFCD
:10232000FFFFFFFFFFFFFFFFFFFFFFFFFFFFFFFFBD
:10233000FFFFFFFFFFFFFFFFFFFFFFFFFFFFFFFFAD
:10234000FFFFFFFFFFFFFFFFFFFFFFFFFFFFFFFF9D
:10235000FFFFFFFFFFFFFFFFFFFFFFFFFFFFFFFF8D
:10236000FFFFFFFFFFFFFFFFFFFFFFFFFFFFFFFF7D
:10237000FFFFFFFFFFFFFFFFFFFFFFFFFFFFFFFF6D
:10238000FFFFFFFFFFFFFFFFFFFFFFFFFFFFFFFF5D
:10239000FFFFFFFFFFFFFFFFFFFFFFFFFFFFFFFF4D
:1023A000FFFFFFFFFFFFFFFFFFFFFFFFFFFFFFFF3D
:1023B000FFFFFFFFFFFFFFFFFFFFFFFFFFFFFFFF2D
:1023C000FFFFFFFFFFFFFFFFFFFFFFFFFFFFFFFF1D
:1023D000FFFFFFFFFFFFFFFFFFFFFFFFFFFFFFFF0D
:1023E000FFFFFFFFFFFFFFFFFFFFFFFFFFFFFFFFFD
:1023F000FFFFFFFFFFFFFFFFFFFFFFFFFFFFFFFFED
:10240000FFFFFFFFFFFFFFFFFFFFFFFFFFFFFFFFDC
:10241000FFFFFFFFFFFFFFFFFFFFFFFFFFFFFFFFCC
:10242000FFFFFFFFFFFFFFFFFFFFFFFFFFFFFFFFBC
:10243000FFFFFFFFFFFFFFFFFFFFFFFFFFFFFFFFAC
:10244000FFFFFFFFFFFFFFFFFFFFFFFFFFFFFFFF9C
:10245000FFFFFFFFFFFFFFFFFFFFFFFFFFFFFFFF8C
:10246000FFFFFFFFFFFFFFFFFFFFFFFFFFFFFFFF7C
:10247000FFFFFFFFFFFFFFFFFFFFFFFFFFFFFFFF6C
:10248000FFFFFFFFFFFFFFFFFFFFFFFFFFFFFFFF5C
:10249000FFFFFFFFFFFFFFFFFFFFFFFFFFFFFFFF4C
:1024A000FFFFFFFFFFFFFFFFFFFFFFFFFFFFFFFF3C
:1024B000FFFFFFFFFFFFFFFFFFFFFFFFFFFFFFFF2C
:1024C000FFFFFFFFFFFFFFFFFFFFFFFFFFFFFFFF1C
:1024D000FFFFFFFFFFFFFFFFFFFFFFFFFFFFFFFF0C
:1024E000FFFFFFFFFFFFFFFFFFFFFFFFFFFFFFFFFC
:1024F000FFFFFFFFFFFFFFFFFFFFFFFFFFFFFFFFEC
:102500001148030iBF03CD270821E13B36242323D3
:102510002336203AE23B32E53B3AE33B32E63B3AB4
:10252000E43B32E73BCD5108110000001BF03CD2D44
:1025300008018803i1EC3BCD120821DC3B3617CD66
:102540005408019A03114E25CD1208C35A25535938
:102550005354454D204D454E55003AC93BE6E332B4
:10256000C93B2100FC3ACD3BE65032CD3B3E04D381
:10257000FF3A00FCFEAAC284253ACD3BE67F32CD6D
:102580003BC3BC253ACD3B17DAA4253ACD3BF680B3
:1025900032CD3B3C32CD3B3E00D3FF3E06D3FF362F
:1025A000AAC36D253ACD3BE67F32CD3B3ACD3BF613
:1025B0000832CD3B3AC93BF60832C93B3E07D3FF50
:1025C00003A00FCFEAAC2D3253ACD3BE67F32CD3B92
:1025D000C30B263ACD3B17DAF3253ACD3BF68032D2
:1025E000CD3B3C32CD3B3E00D3FF3E07D3FF36AA66
```

```
:1025F000C3BC253ACD3BE67F32CD3B3ACD3BF60816
:10260000320D3B3AC93BF60832C93B3E0AD3FF3ACA
:102610000FCFEAAC32226 3ACD3BE67F32CD3BC368
:102620006F263ACD3B17DA42263ACD3BF68032CDC3
:102630003B3C32CD3B3E00D3FF3E0AD3FF36AAC31C
:10264000B263ACD3BE67F32CD3B3ACD3BE608FE4A
:102650008CA67263ACD3BF62032CD3B3AC93BF655
:10266000832C93BC36F263AC93BF61032C93B3E1C
:10267000BD3FF3A00FCFEAAC83ACD3B17DAA826D6
:102680003ACD3BF68032CD3B3C32CD3BE607FE04F3
:10269000C29B263AC93BF60432C93B3E00D3FF3EFB
:1026A000BD3FF36AAC36F263ACD3BE608FE08C21D
:1026B000EB263AC93BF61032C93BC93ACD3BF6209E
:1026C00032CD3B3AC93BF60832C93BC9FFFFFFFF99
:1026D000FFFFFFFFFFFFFFFFFFFFFFFFFFFFFFF0A
:1026E000FFFFFFFFFFFFFFFFFFFFFFFFFFFFFFFFFA
:1026F000FFFFFFFFFFFFFFFFFFFFFFFFFFFFFFFFEA
:10270000FFFFFFFFFFFFFFFFFFFFFFFFFFFFFFFFD9
:10271000FFFFFFFFFFFFFFFFFFFFFFFFFFFFFFFFC9
:10272000FFFFFFFFFFFFFFFFFFFFFFFFFFFFFFFFB9
:10273000FFFFFFFFFFFFFFFFFFFFFFFFFFFFFFFFA9
:10274000FFFFFFFFFFFFFFFFFFFFFFFFFFFFFFFF99
:10275000FFFFFFFFFFFFFFFFFFFFFFFFFFFFFFFF89
:10276000FFFFFFFFFFFFFFFFFFFFFFFFFFFFFFFF79
:10277000FFFFFFFFFFFFFFFFFFFFFFFFFFFFFFFF69
:10278000FFFFFFFFFFFFFFFFFFFFFFFFFFFFFFFF59
:10279000FFFFFFFFFFFFFFFFFFFFFFFFFFFFFFFF49
:1027A000FFFFFFFFFFFFFFFFFFFFFFFFFFFFFFFF39
:1027B000FFFFFFFFFFFFFFFFFFFFFFFFFFFFFFFF29
:1027C000FFFFFFFFFFFFFFFFFFFF53595354454D2E
:1027D00020434F4E54524F4C204D4F44554C4500D2
:1027E000FFFFFFFF0025FFFFFFFFFFFF0017000FA8
:1027F000CA270422800355 9AFFFFFFFFFFFFFFF58
:*******************************************
:10A000004D41434 94E45205041524 14D455445EC
:10A010005253204D4F44554C4500434F50595249DF
:10A020004748542031393830204449434B45592D55
:10A030004A4F484E20434F52502E00AF210000326D
:10A04000F93B32463C32473C3214 3C32E03BC93AA1
:10A05000D93BE601CA4FA0C36AA0CA64A01157A5A4
:10A06000CD1208C91162A5C360A0CD5A08C3030868
:10A0700080006A1050141A4080241A60A0221B078
:10A08000020274A10C02ADA10402DEA106022FA2FD
:10A09000020 3D4A2040372A2060380A2080 3C6A28C
:10A0A000A038EA20C0 39CA2130341A40204AAA2D9
:10A0B0000304B8A20404E2A20504F0A20604FEA26E
:10A0C0000 7040CA308041AA3090428A30A0436A34E
:10A0D000B0444A30C0452A3130441A4050660A37B
:10A0E00020E90A3040EBCA3060EE9A3130F60A3F7
:10A0F000131060A3131160A3000200A1FFFF000072
:10A10000CD3BA0C36AA03A143CEE0132143CE601F8
:10A11000CA1FA11122AF015201CD1208C325A111FE
:10A120001EAFC316A1AF32103C3AD93BE601CA714B
:10A13000A13AC23BA7C229A13A103CC60132103C49
:10A140003AD93BE601CA71A13AC23BA7CA40A13A3B
```

```
:10A15000103CFE05DA29A13A143CE6FE32143C21FB
:10A16000193CAF77237723771108FC21193CCD3CAC
:10A1700008C36AA0CD5A08CD5D08E620CA95A11192
:10A180000A002A0BFC7CFE08D2A4A119110BFCCDFA
:10A1900068A2C3A4A111F6FF2A0BFC7CFE08DAA476
:10A1A000A1C38BA1CD76A4CD6008C377A1CD5A03F9
:10A1B000CD5D08E620CACCA11101002A10FC197C53
:10A1C000E6036711OFCCD68A2C3D2A111FFFFC343
:10A1D000BBA1CD8EA4CD0DA2CD6008C3B0A1CD5A38
:10A1E00008CD5D08E6201101 00CCFDA12A0DFC1967
:10A1F0007CE60367110DFCCD68A2C301A211FFFF2D
:10A20000C9CDA1A4CD0DA2CD6008C3E1A1CD570851
:10A210006110E042A10FCEBCD48083A0DFC5F3AFB
:10A220000EFC57CD4208616A1116FCCD68A2C9CD5B
:10A230005A08CD5D08E620CA53A23A0FFCFE95D21B
:10A240005FA2C60132193C21193C110FFCCD360822
:10A25000C35FA23A0FFCA7CA5FA2C6FFC344A2CD48
:10A26000F5A4CD6008C332A22193C21193CCD3996
:10A2700008C93AF93BEE0232F93BCD20A5C34FA005
:10A280003AF93BEE0132F93BCD2BA5C34FA03AF989
:10A290003BEE0832F93BCD41A5C34FA03AF93BEE66
:10A2A0004032F93BCD4CA5C34FA03AF93BEE1032FA
:10A2B000F93BCDCCB1C34FA03AF93BEE2032F93B8C
:10A2C000CDD7B1C34FA03AF93BEE0432F93BCD698B
:10A2D000B1C34FA03AF93BEE8032F93BCD36A5C36E
:10A2E0004FA03A463CEE0132463CCD7FB1C34FA071
:10A2F0003A463CEE0232463CCD8AB1C34FA03A46C4
:10A300003CEE0432463CCD74B1C34FA03A463CEE1D
:10A3100008 32463CCD95B1C34FA03A463CEE1032D0
:10A32000463CCDA0B1C34FA03A463CEE2032463C5D
:10A33000CDE2B1C34FA03A463CEE4032463CCDC1DF
:10A34000B1C34FA03A463CEE8032463CCDABB1C3E0
:10A350004FA03A473CEE0132473CCDB6B1C34FA0C7
:10A36000CD2408CD6608 3E0E32DE3B1177A30103EE
:10A3700000CD1208C303084D2E502E204D4F4455DA
:10A380004C45205741524E494E47204D454E5500B1
:10A39000CD2408CD6608 3E0F32DE3B11A7A30103BD
:10A3A00000CD1208C316A44D2E502E204 3524954FE
:10A3B0004943414C20414C4552 5453 00CD2408CDD3
:10A3C00066083E1032DE3B11D0A30103000316A47C
:10A3D0004D2E502E204E4F4E2D43524954494341 4D
:10A3E0004C20414C4552 5453 00CD2408CD6608 3EC4
:10A3F0001132DE3B11FDA30103 00C316A44D2E50FF
:10A400002E204D4F44554C4 5204D414C46554E4312
:10A4100054494F4E 53 00CD12081125A401FA02CD24
:10A420001208C303084D2E502E205741524E494 E5C
:10A430004 7204D454 E5500FFFFFF00A8000000FFDC
:10A44000FFCD2408CD6608 3E0232DE3B0104001138
:10A4500000A0CD120801 1E0011 6DA5CD12080152F9
:10A46000341172A5CDEDB1CD76A4CD8EA4CDA1A42D
:10A47000CDF5A4C303082A0BFC22E53BCD51083ED1
:10A48000303AF23B11EF3B016E00CD1208C92A10A1
:10A49000OFC22E53BCD51 0811EF3B010302CD1208 30
:10A4A000C93A1CFCE6802A0DFCC4D2A422E53BB3E3E
:10A4B0001032E73BCD5108 11EF3B01B600CD120839
:10A4C0003A1CFCE68011E7A4C4E1A401BC00CD1253
```

```
:10A4D00008C9EB01074ECD48087CA7FCE5A46069DC
:10A4E000C911EEA4C903C9464545542020004D4575
:10A4F00054455253003A1CFCE6803A0FFCC415AB9D
:10A5000032E53BCD51083E3032F33B11F03B010BBD
:10A5100001CD12083A1CFCE680C83E43321435C90E
:10A520003AF93BE60201B200C35AA03AF93BE60110
:10A53000010101C35AA03AF93BE680163000C35A06
:10A54000A03AF93BE60801A501C35AA03AF93BE657
:10A550004001FC01C35AA02D2044495341424C45BF
:10A560004002D20454E41424C4544200004D454E6F
:10A5700055004554E47494E45204F5645524C4F4198
:10A580004420414C41524D20504F494E4202020F0
:10A590002030205204D0000494D504C454D454E05
:10A5A0005420574945448205345540004584B8C6
:10A5B00041553535420544454D5020414C41524D205B
:10A5C000504F494E5420202020204445472046C0B
:10A5D000000004D2E502E20435249544943414C20F7
:10A5E000414C455254204449534142404C4520444536
:10A5F0005441494C000004D2E502E204E4F4E2D43BD
:10A60000524954494341C20414C455254204449FD
:10A61000534142404C4520444554414944494C0000474E6B
:10A62000420535045454420434149A4942524154F3
:10A63000494F4E20434841525420564143554100005
:10A64000FFCD2408CD6608JE0332DE3B0104001135
:10A650007CA6CD12C8015234119FA6CDEDB101FAAE
:10A660000021157B1CD12CBCD36A5CD20A5CD2BA511
:10A67000CD69B1CD41A5CD4CA5C303084D2E502EBB
:10A680002043524954494341C20414C45525420A7
:10A690004449534142404C4520444554414944494C00045AE
:10A6A0004E47494E452052504D20414C4552254092
:10A6B000000524F544F522052504D20414C4552254D
:10A6C00000000046414E2052504D20414C4552254000E
:10A6D000004F494C20502455353535524520414C50
:10A6E000045525440000434F4F4C414E5420544454D69
:10A6F0005020414C4552254000042415455535325957
:10A70000020444953434841524745794520414C4514
:04A71000525400FFA0
:02A7F6001355F9
:10A800002152A93AC23B5F87835F3E005719E9CDC9
:10A810034A9C3000834F50595249474854420301B4
:10A8200039383302044449434B4559 2D4A4F484E2032
:10A8300034F52502E003E9A32FF5F21FE573EB416
:10A8400032FF573EB432FF577E320C3C7E320D3C15
:10A850003E0077773E4432FF573E7432FF573E004A
:10A860002B77777E3201C7E32023C3E0432FF572A
:10A870003E3432FF572B7E32033C7E32043C3E0096
:10A8800077773AF857326F3C3E0B32F8573E02323B
:10A89000FE5FAF32FE5F3E0332F857C30FA8C347D7
:10A8A000AB3AF85732053C3E0432F857C39AA93AFE
:10A8B000F85732063C3E0132F857C32AAF3AF857F0
:10A8C00032073C3E0032F857C39CAB3AF857320887
:10A8D0003C3E0232F857C30FA83AE03BE602CAFA00
:10A8E000A83AE03BE6FD32E03B3ADE3BEE06C2FA38
:10A8F000A81100A001CA00CD12083AF857320B3C4B
:10A900003E0632F857C30FA821FE573E8432FF5748
```

:10A910003EB432FF573E0077777E32093C7E320AE2
:10A920003C3E0132FE5F3AF857326E3C3E0732F849
:10A9300057C30FA321413CCD46A9C4DA977CD46A2
:10A94000A9A623B677C93AFC5F2FE60CC97EE6F3C9
:10A9500077C9C30FA8C30FA8C30FA8C30FA8C30FFD
:10A96000A8C30FA8C308A9C30FA8C30FA8C30FA8E3
:10A97000C30FA8C30FA8C30FA8C30FA8C30FA8C3B2
:10A98000FA8C30FA8C30FA8C336A8C3A1A8C3AFFD
:10A99000A8C3BDA8C3CBA8C3D9A82A013CEBCD3F0F
:10A9A0008626B19220E3C22E53BCD510811EF3BAA
:10A9B000102003E3032F23BCD0F081126AF0107F5
:10A9C00000CD0F082A0E3C119001CD1508DADEA942
:10A9D0003AE03BE67E32E03BCD3DAAC38DAD2A0E88
:10A9E0003C11D007CD1508D202AA3AE03BF68132DD
:10A9F000E03B2A0BFCEB2A0E3CCD1508D412AAC36F
:10AA00008DAD3AE03BE67EF60132E03BCD3DAAC398
:10AA10008DAD3AF93BE680CD50AA11020001090044
:10AA2000CD2108119FA60152003ADE3BEE0FCC1259
:10AA300083AF93BE680019FA6CC6C08C9110200D8
:10AA40000109D0CD330811050001D500CD2108C919
:10AA5000C25BAA3ACE3BF64032CE3B3AE03BF6022E
:10AA600032E03B3ACE3BF61032CE3B3ADE3BEE0EC6
:10AA7000C0117BAA015200CD1208C94D2E502E20C4
:10AA80004352495449434140204140455254400C221
:10AA90009AAA3ACE3BF62032CE3B3AE03BF602325F
:10AAA000E03B3ACE3BF61032CE3B3ADE3BEE0EC0F8
:10AAB000115AAA01A200CD1208C94D2E502E204E67
:10AAC0004F4E2D4352495449434140204140455222D
:10AAD0005400C2DDAA3ACE3BF62032CE3B3AE03BF0
:10AAE000F60232E03B3ACE3BF61032CE3B3ADE354A
:10AAF000EE0EC011FDAA01F200CD1208C94D2E5074
:10AB00002E204D4F44554C45204D414C4554E430B
:10AB100054494F4E00CD5708C6FD4F1E8ECD4B08F1
:10AB20007CC9CD57083A6F3CD648FC3DAB4F1E8ED2
:10AB3000CD4B084C7DE680CA3BAB0C79C92F3CF568
:10AB40003E8032E73BF1C93A6E3C01F901CD77AB6B
:10AB50003A6F3C01FF01CD77AB3E2F32FD391153E7
:10AB6000AC010302CD0F083A1CFCE680CA0FA83ED8
:10AB70003320?3AC30FA8C5326F3CDE28FC3DAB59
:10AB8000326E3C3A1CFCE6803A6E3CC422AB32E5A5
:10AB90003BCD510811F03BC1CD0F08C93A073CD657
:10ABA0002E32073C3A1CFCE6803A073CC415AB3217
:10ABB000E53BCD51083E3032F33311F03B01BE0086
:10ABC000CD0F081153AC01C300CD0F083A1CFCE651
:10ABD00080CAD9AB3E0332C73821 0FFC3A073CFE8E
:10ABE000D2D215ACBEDA59AC01BE0011C100CD21E4
:10ABF00081181B0015200 3ADE3BEE10CC12083A47
:10AC0000F93BE6100181B0CC6C083AF93BE610CD77
:10AC10003FAAC359AC11A0B401BE00CD18081137DA
:10AC2000AC0152003ADE3BEE10CC12083AF93BE69A
:10AC3000100137ACC307AC452E472E542E20534588
:10AC40004E534F52204F52204341424C45204F50CB
:10AC5000454E004445472046003AFC5FE601C27479
:10AC6000AC3A463CE640F5CD8FAA1111B1D5019220
:10AC700001CD7DAD3AFC5FE620C28FAC3A463CE6A2

```
:10AC800001F5CD8FAA119FB0D501A200CD7DAD3ABF
:10AC9000FC5FE640C2AAAC3A463CE620F5CD8FAA5E
:10ACA00011C2B0D501F200CD7DAD3AFD5FE640C2E4
:10ACB000C5AC3A463CE604F5CD8FAA11EAB0D50101
:10ACC0004201CD7DAD3AFD5FE620C2E0AC3A463CA4
:10ACD000E608F5CD8FAA11D3B0D5011A01CD7DAD0F
:10ACE0003AE03BE601C239AD3AFD5FE608C203AD8A
:10ACF0003A463CE680F5CD8FAA1125B1D501BA01BF
:10AD0000CD7DAD3AFD5FE604C21EAD3A473CE6019B
:10AD1000F5CD8FAA113BB1D501E201CD7DAD3AFC55
:10AD20005FE602C239AD3A463CE620F5CD8FAA1166
:10AD300001B1D5016A01CD7DAD3AFC5FE610C25488
:10AD4000AD3A463CE602F5CD8FAA11AEB0D501CAA8
:10AD50000CD7DAD3AFC5FE680C27AAD3AF93BE6C4
:10AD600040F5CD50AA11F9A6017A003ADE3BEE0F6C
:10AD7000CC120801F9A6F1CC6C08C30FA83ADE3B4F
:10AD8000EE10CC1208D1C1F1D5CC6C08C92A033C15
:10AD9000EBCD3F08EB1104FCCD68A23AFD5FE630E5
:10ADA000CAB9AD3A143CE601CAB9AD2A04FCEB2A93
:10ADB0006FC191106FCCD68A22A16FCEB2A06FC3B
:10ADC000CD1508D2EDAD1106FCCD68A22A03FC0114
:10ADD0001000922193C3A0AFC321B3CD2E4AD3E88
:10ADE00013 21B3C21193C1108FCCD3C08CD570811
:10ADF0002A10FC444D1E3CCD4808E52A04FC3A1CB0
:10AE0000FCE680C216AE010000118B00CD4E08D1C9
:10AE1000CD4208C322AE444D11BE19CD4808D1CD54
:10AE200042087A321C3C79321D3C2A1C3C22E53B0C
:10AE30003E1032E73BCD510811EF3B015100CD0FE1
:10AE4000083A1CFCE680C292AE1104AF015700CD57
:10AE50000F082A08FC22E53B3A0AFCF61032E73BD1
:10AE6000CD510811ED3B014101CD0F08110CAF018F
:10AE70004901CD0F081122AF015201CD0F083A143C
:10AE80003CE601CA0FA8111EAF015201CD0F08C345
:10AE9000FA8110 8AF015700CD0F08CD5708 2A0899
:10AEA000FC1E8BCD4E08118927CD42087A32E53B36
:10AEB0007932E63B3E1032E73B3A0AFCA7CAD2AEF3
:10AEC0002AE53B1135CF1922E53BD2D2AE3E1132F5
:10AED000E73BCD510811ED3B014101CD0F081115A4
:10AEE000AF014901CD0F081122AF015201CD0F086A
:10AEF0003A143CE601CA0FA8111EAF015201CD0F52
:10AF000008C30FA84D5048004B50480020414352 01
:10AF100045532020004345435441524553004F4E6D
:10AF200020004F46460525040002A093CEBCD3FD1
:10AF300003EB292922E53B22093CCD51083E303250
:10AF4000F23B11EF3B01F200CD0F0811EFAF01F71B
:10AF50000CCD0F082A0C3CEBCD3F08EB292922E558
:10AF60003B220C3CCD51083E3032F23B11EF3B010D
:10AF7000A200CD0F0811EFAF01A700CD0F083A4294
:10AF80003CE604CA92AF2A093CCDA9AF1112FCCD10
:10AF900068A23A423CE608CA8EAF2A0C3CCDA9AF33
:10AFA0001114FCCD68A2C3BEAFEB01BE0ACD4308A8
:10AFB0003A0E3C5F3A0F3C57CD42086A61C93AFDF0
:10AFC0005F3248 3CE680CAE4AF3AE03BA7F2E4AF28
:10AFD0003AF93B473A423CB0F5E604CC24B3F1E6FB
```

:10AFE0000SCC3SB33A423CEZF332423CC3A2B352F7
:03AFF000504D00C1
:02AFF6002355E1
:10B00000434F50595249474854203139383020443 1
:10B010004934B45592D4A4F484E20434F52502EDD
:10B0200000CD2408CD66083E0432DE3B0102341117
:10B0300059B0CDEDB1CD74B1CD7FB1CD8AB1CD9543
:10B04000B1CDA0B1CDABB1CDB6B1CDC1B1CDCCB14B
:10B05000CDD7B1CDE2B1C303084D2E502E204E4FB7
:10B060004E2D43524954494341204C20414C45525482
:10B0700020444953414243452044354414494C00E9
:10B080000455484155535420544D502041 4C9B
:10B09000455254004655454C20414C4552540046BB
:10B0A000554C4C2042494E20414C45525400504191
:10B0B000524B494E47204252414B4520414C45524C
:10B0C000540041495220464943544552204 1 4C4578
:10B0D0005240048594452415244542046494C400D
:10B0E00054455220414C5254004859445241551510
:10B0F0004C494320464943544552204 1 4C455254FA
:10B10000004F494C204C4556454C20414C45525428
:10B11000000434F4F4C414E54204C4556454C204126
:10B120004C5254004859445241F53544154045204CBA
:10B13000455545454C20414C45525400485945524 1D3
:10B140005543943204C4556454C20414C4552542
:10B150000000000000000004D2E502E204D4F4455A1
:10B160004C4520D454E5500FF3AF93BE604015 4C
:10B1700001C35AA03A463CE604010301C35AA03A6F
:10B180004 63CE60101B100C35AA03A463CE6020142
:10B19000DE00C35AA03A463CE608013301C35AA078
:10B1A0003A463CE610015901C35AA03A463CE680B3
:10B1B0001D201C35AA03A473CE60101F801C35A43
:10B1C000A03A463CE64001A601C35AA03AF93BE644
:10B1D00010016500C35AA03AF93BE620018500C37F
:10B1E0005AA03A463CE620017A01C35AA0C5626BD8
:10B1F0007EA7CA03B2EEFFCA0FB27E60697703135F
:10B200003EEB1C121280009444DC513C3EEB1C13D
:01B21000C974
:10B30000EB2A0E3C444DCD480811BE0ACD420S1E22
:10B310003B6A160061480600CD4E0811CD11CD4252
:10B3200086A61C9CD57082A12FCCD00B3EB2A097F
:10B330003CCD1508D44CB3C9CD57082A14FCCD0018
:10B34000B3EB2A0C3CCD1508D477B3C911F2000138
:10B35000F500CD210311C2A601F2003ADE3BEE0F46
:10B36000CC1203AF93BE60101C2A6CC6C083AF9C6
:10B370003BE601CD50AAC911A20001A500CD2108CC
:10B3800011B1A601A2003ADE3BEE0FCC1203AF949
:10B390003BE60201B1A6CC6C083AF93BE602CD507F
:10B3A000AAC93A053CFE87D227B4FE14DA28B4294
:10B3B0000053C7EFE39D2DAB33E4F96F53A1CFCE6E8
:10B3C00080C2CFB3F1CD57084F115501C3F9B3F186
:10B3D000CD57084F113009C3F9B33E7996F53A1CA1
:10B3E000FCE680C2F1B3F1CD57084F117600C3F9E6
:10B3F000B3F1CD57084F112803CD48097C32E53B07
:10B400007932E63BCD510811F03B012100CD0F0809
:10B4100011A5B43A1CFCE680CA1EB411A9B40125DA

```
:10B4200000CD0F08C3ADB4003AF93BE604CDD2AA73
:10B4300011A1B40121000D0F083A1CFCE680C247DF
:10B44000B411A5B4C34AB411A9B4012500CD0F08A5
:10B45000112100012300CD210811758401520003AD9
:10B46000DE3BEE11CC12083AF93BE60401758400090
:10B470006C08C306B54F494C20305245353555252A2
:10B480004520534E534F52204F52204341424C8A
:10B490004520464149494C55524500 3F3F3F3F3F3FC5
:10B4A0003F3F3F3F00505349004B504100 3AE03B83
:10B4B000E601CA06B53A053CFE58D2DCB43AE03B98
:10B4C000E680CA06B52A0E3C119209CD1508D206AF
:10B4D000B53A053CFE41D2DCB4C306B53AF93BE6C9
:10B4E00004CD50AA112100012300CD210811D1A6BD
:10B4F000142013ADE3BEE0FCC12083AF93BE6047A
:10B5000001D1A6CC6C083A063CFE73CD57084FDA41
:10B510005DB51E56CD4B087C2FC6CE32E53B3A1C9E
:10B52000FCE680CA38B53AE53BCD5708C6E04F1E69
:10B530003ECD4B087C32E53BCD510811F03B016FBD
:10B5400000CD0F081153AC017300CD0F083A1CFC5D
:10B55000E680CA69B53E03327738C369B51ED7CDD3
:10B560004B087C2FC624C31BB53A063CFE5DD2FEC6
:10B57000B5FE2BDAA3B53AF93BE608CD50AA116F18
:10B58000001720 0CD210811E5A60192013ADE3BCF
:10B59000EE0FCC12083AF93BE60301E5A6CC6C08A0
:10B5A000C3FEB53AF93BE608CCD2AA11A1B4016FAB
:10B5B0000 0CD0F08116F00017200CD210811D9B51F
:10B5C00001F2003ADE3BEE11CC12083AF93BE608F4
:10B5D00001D9B5CC6C08C3FEB5434F4F4C414E5416
:10B5E0002054454D502053454E534F52204F52202A
:10B5F0004341424C452046414C494C5552450 03A088A
:10B600003C32E53B3E1032E73BCD510811EF3B01A8
:10B610005D01CD0F0311EBB6016301CD0F0311F1EB
:10B62000B6010C01CD0F083A0B3CFE96D26CB6FE6B
:10B63000 0ADA6DB6CD570 83A0B3CFE7CDA41B63ECD
:10B640007C2FC67E4F1E0BCD450879FE0ADA52B6F6
:10B650003E092F2108B716FF5F19EB010D01CDCF31
:10B66000083A0B3CFE68D4C0B6C30FA8003AF93BB9
:10B67000E620CDD2AA119AB4010D01CD0F08CDE17B
:10B68000B6119DB6017A003ADE3BEE11CC12083AB3
:10B69000F93BE620019DB6CC6C08C30FA8465458 2
:10B6A0004C204C4556454C2053454E534F52204F4D
:10B6B0005220 4341424C452046414C494C5552 0099
:10B6C0003AF93BE620CD3FAA1194B0017A002ADE18
:10B6D0003BEE1 0CC12083AF93BE620194B0CC6C5A
:10B6E00008110D01011601CD210809564F4C5453C4
:10B6F000004520 2D2D2D2D2D2D2D2D46002A2AA9
:0DB700002A2A2A2A2A2A2A000000000000EC
:10B7E000FFFFFFFF3BA0FFFFFFFFFFFFFF37A470A09D
:03B7F00000 00A00613380053335BB
:00000001FF
   0 SELF     0016 0H
   0 SHIFTR   00144H
   0 SPDUP    000E2H
   0 SPEAK    00170H
   0 SPERR    000BBH
```

| | | |
|---|---|---|
| O | STOP1 | 001BDH |
| O | SUBTR | 0026BH |
| O | SWCHK | 0030EH |
| O | TERM | 00154H |
| O | TERM2 | 0015AH |
| O | TESTMD | 000D4H |
| O | TORCAL | 003BDH |
| O | TORQ0 | 003C6H |
| O | TORQ1 | 003DDH |
| O | TRQFIN | 003F8H |
| O | TSTPAS | 001B4H |
| O | VERFY1 | 00286H |
| O | VERIFY | 00272H |
| O | VOLTS | 00316H |
| O | WAIT00 | 0025FH |
| O | WAITNG | 00259H |
| O | WRIT | 002A6H |
| O | WRITER | 0029DH |
| O | WROTE | 002A1H |
| O | XHYDRO | 00049H |

$

```
:1000000054003486041C00D5AD1CFC3717977BF6D2
:100010001389C3FC961A89C36535FD9314223454A1
:10002000041CC585A5543DB920F1AFF0AE546B1941
:10003000F1AE3430344BA01819F0AEF1AF546B97D9
:100040001BAFE649F8546304F619F1AE3430344284
:10005000A0B83CF0AA18F0977AE65E9723FF19A1A2
:100060019AEBD193430344B2DF153E04DA1BC0213
:10007000BBFF1819F1AA967CBB00049BAF19F1AE27
:10008000546BF686049B19F1AE343034420C69BAFF4
:10009000FBAE546BF69727A8FAEC7CFBADF0AE34BD
:1000A00030344BA0AEB924F1AF546B85E6B69597CA
:1000B00013A5E6B4BD5AFDB6B83717A19713F8E6F0
:1000C000F63400D5FC96FEF1B2E2533FA1C57408A8
:1000D0007400746B6E2D5F14340A1C5743A76F6DF
:1000E0004EED5F14330A1C5B2FC742F76F62762E9
:0F00F0002545349E04FED5F1533FA1C589C38336
:10010000F1ADBE2B3430344B0380ADB83DF0037FEE
:10011000AE3430344B18A018F0ADBE703430344BD0
:10012000310ADC8F0AE3430344BD503FDABC583FE
:10013000BF0827976720672DE63B6EEF34672D6765
:100140002D838F022D97F72DF7EF44972D1380E6EF
:10015000521D2D83D5FAC669246205FAC67034744F
:100160002460366281347424603673B1C5B926A157
:10017000D5F19183131A80FFF091B000367C81C898
:10018000EA7823FE9183B920BA04A1F19119EA9289
:1001900024973692B1242A3697B92681A1B389C013
:1001A00095340AABF08BE00EEA8EFA30953440DAE1
:0F01B000969EFA83D5F14320A114223455A24BD20
:10020000099C3B920B12019B1B019B17519B193B914
:1002100026B1BE19B19619B16E19B16E19B1BBD51F
:10022000B82BB925B100BA00BC00C5E909EA02364D
:100230002FB10031A191C9EA2F36398183B804B85F
:100240003CBA000953C34A395455A018FA0304AA0A
:10025000EB43B83C8389E0BF04EF5999DFBF28EF37
```

```
:100260005F0A83A5B5D518A01AC583FF3717977EF7
:10027000AD83ABFCD301C686FB9713A8E698971312
:100280080F698FBA183F1032A3717977BE698977E
:100290013EBF69819F8A183233D546383B920BC6B
:0C02A00002F191ECA6831936A78144A15D
:1003000099C389D7BCD2640E99C389DBBCD0349E13
:10031000C616A5B5642C54559713EAE62C99D35408
:100320005597130%F6271C89C3FC546399C3839916
:10033000C389D4BCD63599FD644399C389D8BCD44C
:100340003599FE349EC64BA5B5646323037465489
:1003500055971%ABF64399D354559713%8F6601C41
:10036000FC546399C383AF276245166E646AEF6AD3
:100370006583B9207400740876B7743A89C323037F
:1003800074667408D3D1C6B7742F89C32303746607
:100390007400%6B78904BC0299FEBD05277464ED2A
:1003A0009C89C35455547276B7ECAF549D64AD2309
:1003B00003746699FD649A89C3345A64ADBA02BC69
:1003C0003BB9188523EB9136C78195277466545540
:1003D000B6D63717C6DD9779F6DDFC546323DB1CF0
:1003E000EAC6D5FAC6EA347464F8C523CB91BC02D8
:0A03F00036F081545591ECF064F8EA
:00000001FF
:109000001B400AF32513C32523C32553C3EC1328B
:10901000FF7F3E3432F97F060405C219703E0032EC
:10902000F97F16002100707E32F87F0E0606FF05DC
:10903000C22F700DC22D7047143AFA7F07D2797093
:10904000707D279707AFE03CA56703AF87FB8C221
:10905000797023C327703AF87FFEA8DA7970FEAAE8
:10906000D279703A513CF68032513C3E0C32F97F55
:109070003A513CE6FE32513CC93A513C0FDA3E700F
:109080007F60132513C210070160C30D703A51B1
:109090003CF60432513C3A513CF64032513CC36BF1
:1090A0007008073A553C3C32553C21513C7EE64025
:1090B000C224723A533CE680C294723ADE3BFE0D03
:1090C000D2D370FE08DAD3703A513CF68032513C6C
:1090D000C300087EE680C2B0713AFA7FE680CA36E5
:1090E000723AFA7FE620CA36723AF87FFEFFCAC6A5
:1090F00072473A513CE620C2D87278E6C0FEC0CA38
:1091000036727BE620C2367278E61FFE1AD23672C0
:109110007821563C07DA2171070A267136200328F8
:1091200071362BC32871362D2336202378E61F078E
:10913000B707E5C532E53B3E0032E63B32E73BCDC3
:109140005108C1E13AF03B77233AF13B77233AF2F9
:109150003B772336252336202378070A657107DA33
:109160006B71C36E71362B23C36E71362D2336207F
:10917000233600192011156%CCD0F083A513CE6CE
:109180 00FE32513C3A0E3C4F3A0F3C4721A170AFA2
:1091900079964F23788E47DAA87160691E05CD4500
:1091A00087932F87FC300083E0032F87FC300081B
:1091B0003AE03B0FD288723A513CE67F32513C3E56
:1091C000832F97F3E0032F87F47CDFF713E023210
:1091D000F87F47CDFF71111BFC1A32F87F47CDFF99
:1091E00071131A32F87F47CDFF71131A32F87F4797
:1091F000CDFF71131A32F87F47CDFF71C384712EF2
:10920000203AFA7F2DCA1F7207D201722E203AFA35
:109210007F2DCA1F72E620CA0E723AF87FB8C83393
:1092200033C349723A533CE67FC26E723AFA7F1FEB
:10923000D25E72C366723A513CE601C249723A513B
:109240003CF60132513CC384713A513CF60432513D
:109250003C3ECF32F97F3A513CF64032513C3ACE57
:109260003BF65032CE3B21A0724D44CD6C083ACE35
:109270003BF61032CE3B3ADE3BFE06C288720142C1
:1092800012AF07FEBCD120801940111B972C018BB
:109290008C30008019201111BD72CD0F08C300087
:1092A0004C4F41442034F4E54524F4C204D414C63
```

```
:1092B00046554E4354494F4E003F3F3F002020202B
:1092C000202025202000034513CF620E6FE32513C79
:1092D00021543C3600C3847178FEFEC2FE723A51BE
:1092E0003CE6DE32513CC351723A543C471F1F1FCB
:1092F0001FE60F4F78E60F89CA5672C351723A543F
:109300003CC60132543CCD0C73C3F967321AF7378C5
:109310000600BEC220733A523CF60132523C04C9E8
:1093200023BEC22F733A533CF60132533C04C92387
:109330000BEC23E733A523CF60432523C04C923BECC
:10934000C24D733A533CF60232533C04C923BEC2A9
:109350005C733A533CF60432523C04C923BEC26BDF
:109360000733A523CF60232533C04C923BEC27A73AD
:109370003A533CF60332533C04C923BEC28973ABF
:10938000523CF60832523C04C923BEC03A523CF665
:109390001032523C04C978FE00CA36723A543CC6B8
:1093A0001032543C3A513CE6FE32513CC38471D0F9
:1093B000D1D2D3D4D5D6D73DCD240821DE39360D2E
:1093C00023360D1060011F374CD12081172030140A
:1093D0004803CD2708010A02111075CD1208018239
:1093E0002113175CD12083A513CE640CA00743A78
:1093F000533CE680CA007401B40211E676CD12082F
:10940000CD0674C303083A523CFE00CA9274E603C8
:10941000CA4474FE03C223743A513CF60432513CF0
:10942000C344743A523C0FD23574015200011C675D0
:10943000F5CD1208F10FD2447401520011E275F516
:10944000CD1208F13A523CE60CFE0CC260743A515F
:109450003CF60432513C3A523C0F0F0F0FC3837459
:109460003A523C0F0F0FD27474017A00118D75F5CA
:10947000CD1208F10FD28374017A0011A875F5CDD1
:109480001208F10FD2927401A200115075F5CD129D
:109490008F13A533C0FD2A47401F2001101 76F5A1
:1094A000CD1208F10FD2B374011A01 11A76F5CD5D
:1094B0001208F10FD2C274014201113376F5CD12B8
:1094C0008F10FD2D174016A01114C76F5CD120862
:1094D000F13A513C0F0F0FD2E574019201116576FC
:1094E000F5CD1208F10FD001CA00117E76F5CD122C
:1094F0008F1C94C4F414429434F4E54324F4C2029
:109500005741524E494E47204445344149434539001F
:109510005354454543542F454E544455220544F20FB
:109520005245-D454E41424C45204D4F44554C455A
:10953000005354454543542F454E544455220544FFB
:1095400020444F5341424C4520444F44554C450021
:10955000485944524F5354441542053454E534F524F
:109560002F43414C45204641494C454400544F0D
:109570005251554520485542205354454E534F22F86
:1095800043414C452046414194C45440053504507
:10959000454452D555020524541159532F4341428B
:1095A0004C45204F50454E005350454542D55509 5
:1095B0002052454C4159532F434142C4520534 87A
:1095C0004F52544544005344C4F572D444F574E2053
:1095D0005245415932F43414C45205F504531
:1095E0004E00534C4F572D44F574E2052454C413F
:1095F00059532F43414C4520534F52544544400
:109600000D4F44554C4520464149 4C454420208F
:1096100020455252F22044310D4F44554C4C4545
:1096200020464149 4C454420202045525524F52206B
:109630004433004D4F44554C4520464149C4544428
:109640002020204552524F522044434044F445563
:109650004C45204641494C454420204552524F1 C
:109660005220443 6004D4F44554C52046414194C0C
:109670004544202045525244F522044 43800524544
:10968000434149 42524154494F4E20 45454476
:109690004544001370211 BC76CD1208 3A513C3ED9
:1096A00080325132523C36002336002155 3C3655
:1096B0003A553CFE05C2B176C3B87320494E2021
:1096C00050524F47524553532D003A533CF6803287
:1096D000533C3A513CF64032513C01B40211 E67619
:1096E000CD1208C30308 D4495341424C454442D33
:1096F00021DE3B360823360 3CD2408 CD6608 0161
:109700007001152 77CD1208017A00116D77CD1242
:1097100080142011 4477CD12083A533CE680CA51
:109720002E7701510111E676CD1208C3030801 51CD
:109730001113A77CD1208C30308 2D454E41424C 22
```

```
:109740004544420004D4F44554C4520535441545 5EC
:1097500052004C4F414420434F4E54524F4C204DE8
:109760004F44554C4520534554205500053454CCB
:109770004543542F454E544552204 64F52204D4F9D
:109780004455404520544553540021513C36002343
:109790003600233680CD03703A513CE60CCAAC77D4
:1097A0000197001 1CA77CD1208C3030801970 01171
:1097B000D377CD120801BA0110078CD1208013219
:1097C00002112278CD1208C303082D4641494C45A9
:1097D0000442D002D5041535345442D00FFFFFFFFF02
:1097E000FFFFFFFFFFFFFFFFFFFFFFFFFFFFFFFF 89
:1097F000FFFFFFFFFFFFFF12A0FFFFFFFFFFFFFFFFC5
:10980000544F52515545204 655422054 4553542FEA
:1098100043414C494252415445 2044554441494CEE
:10982000530048594452 4F20534 54E534F522054F1
:109830004553542F43414C494252415420 4445DD
:1098400054414940530 03A533CE680CA70783A532D
:109850003CE67F32533C3E0032F97F11510101 5FC
:10986 00001CD27080151011 13A77CD1208C3030831
:109870003A533CF68032533C3E0432F97F01510 1A9
:1098800011E674CD1208C3030821DE3B360C2336 E1
:109890000 0FCD24080103001 12273CD120 30 15A02CD
:1098A0001 1B273CD120801FA021 15277CD1208C3 15
:1098B00003085 3454C 4543542F454E44 552 2054 BC
:1098C0004F2043414 C494252415 4500117802 0116
:1098D00007F02CD27031 15000012702CD270 8215112
:1098E0003C3 600233600233 6003 E 0832F 97F3E0 323
:1098F0004732F87FCDCA793E7247 32F87FCDCA79B9
:109900003E0032F87F01B10211BC76CD12083E0054
:1099100032553C3A553CFE0DC21379 0E002E 203ACA
:10992000FA7F2DCAEC79E620CA1F793AF87FFEFF4C
:10993000CA9979577 9FE 00 CA3D7 9C3477 95 A0C3E D6
:1099400000 32F87FC31D7 97BD60 1 32983C5F7A9351
:109950002100205FCD45 08 6C6 311008019 D26179 28
:1099600000379 3299 3CF5E 9 D5C5111AFC21 983CCD17
:109970003908C1D1E1F13E0432F97F117802017F4B
:1099800002CD27080178 02 11D377CD12 08 11B10 258
:1099900016D02CD27 08C 30 30 832 F87F2E203AFA12
:1099A0007F2DCAEC79E620CA9E793AF87FFEFECA7E
:1099B00067A47CD 0C7378 FE00CABF79C3997 93A0D
:1099C000513CF60432513CC39979 2E203AFA7F2D4E
:1099D000CAEA7907D3CC792E203AFA7F2DCAEA79E1
:1099E000E620CAD979 36F87F8C83333A513CF601
:1099F00043251 3C1 17 80 2017F0 2CD27 081 1500 03A
:109A000012F02CD2708C04743E0432F97F11B133
:109A10000201BD02CD27080178 0 211CA 77CD1208D4
:109A2000C3030 8C3F1 7621DE3B360923360 2CD2479
:109A300080103001100 78CD12 08015 200 11587 A74
:109A4000CD 1 208017C00117 87ACD1 208 01FA0211BA
:109A5000 5277CD1208C303085 3454 C4 543542F45 54
:109A60004E 44552205 44F20 4 4 4 5 5 3 54 2 0 54 4F5 2 85
:109A700051554520 4 8 5 5 4 2 00 31 2E2 0 4 5 4E 4 7 4 9 4E 0C
:109A8000452 04D55 53 4204 2 4 5 2 0 52 55 4 E 4 E 4 9 4 E 87
:109A90004700C3F17611A2 000 15 70 2CD270801AC 9F
:109AA00011BC76CD12083E0832F97F3E0332F 831
:109AB0007F47CD487B3EBD32F87F47CD487B3E0097
:109AC00032F87F0E002E203AFA7F2DCAAB7BE620BB
:109AD000CAC77A79FE00CAE37AFE01CA027BFE0 297
:109AE000CA147B3AF87FFEEBC2AB7B32F97F32F 8C7
:109AF0007F0C3E0032553C3A553CFE03CAC 57AC343
:109B0000F77A3AF87FFEDBC2AB7B32F97F32F87F1F
:109B1000CC3F27A3AF87FFECBC26D7B11AC000128
:109B2000E800CD27 0801AC0011D377CD120811F29F
:109B300000010702CD2708 0132021 1127CCD120864
:109B40003E0432F97FC3030 82E203AFA7F2DCA68FB
:109B50007B07D24A7B2E203AFA7F2DCA487BE6200B
:109B6000CA577B3AF87FB8C83333C3AB7B32F87F30
:109B7 0002E203AFA7F2DCAAB7BE620CA727B3AF8D8
:109B80007FFEFECA547BFE3BCA937BFE3CCA9F7B32
:109B9000C3AB7B0142011 1CE7BCD1208C36D7B01AB
:109BA000F20011F07BCD1208C36D7B019201 1165AB
:109BB00076CD120811AC00018300CD27 08 01AC0029
:109BC00011CA77CD12083E0432F97FC30308544FFF
```

```
:109BD00052515545204855422053454E534F522F20
:109BE0004341424C45202045525F522033420 0BF
:109BF000544F52515545204855422053454E534FDE
:109C0000522F4341424C45202045525F52203 0
:109C100043004E4F204C4F41442F46554C4C204C56
:109C20004F4144205445515545204341404C4942E5
:109C30005241544494F4E00CD240821DE3936 0A23C1
:109C400036070103001127CCD1208017A00117B46
:109C50007CCD1208 01CC00119 7CCD12080 1F400CD
:109C600011B97CCD1208 011C0111D37CCD1208015C
:109C7000FA02115277CD1208C3030 84E4F204C4F01
:109C8000414420544F52515545204341404C492582
:109C9000414944F4E204445544149 4E 4C5300 0312EC4
:109CA0002052554E204E47494E45204154 2048AC
:109CB00049474820494 44C5 00322E2 0454E4741F3
:109CC000474520534550415241544F5220414E4444
:109CD00020464545444552 00332E20 534C454543CC
:109CE000542F454E444552 00116801018F01CD2774
:109CF0008112D013F01CD27083E0 332F97F3EB2
:109D00000 332F87F47CD847D3EEA32F87F47CD8429
:109D10007D 2E0032F87F012D0111BC76CD12082E 53
:109D200002 03AFA7F2DCAA67DE620CA217D3AF87F27
:109D30002DECBC2A67D32F97F3E003255 3C3A55 3CFF
:109D4000FE02C23D7D32F87F2E203AFA7F2DCAA650
:109D50007DE620CA4A7D3AF87FD60132783CF5E587
:109D6000D5C5111 8FC21983CCD36 08C1D1E1F111BF
:109D70002D013F01CD27080 12D0111D37 7CD120F
:109D80008C3C47D2E203AFA7F2DCAA47D07D2864F
:109D90007D2E203AFA7F2DCAA47DE620CA937D3A13
:109DA000FS7FB8C833330 16A0 11657 6CD12081104
:109DB0002D013F01CD27080 12D0111CA77CD1208
:109DC0008C3030 811680101F702CD27 081180 123
:109DD00011901CD270 821DE3B23360 F01920111 25
:109DE000C7ECD1208 01E4 0111 317ECD1208 10C68
:109DF000211497ECD1208 013 402115C7ECD120879
:109E000015C0211817ECD1208C3030 846554C4CFB
:109E1000204C4F4144205 0 4F52515545204 3414C12
:109E200049 42524154494F4E2044 5544149 4C5354
:109E30000 0312E204F4E2F4F4646203574 9544352
:109E4000 4820 544F204F464600322E20 42454 74975
:109E50004E204 34F4D2494E494E47003 22E204924
:109E6000 4E43 5245415345205 3504544204 54E9D
:109E70005494C204655 4C4C204C4F41444454484
:109E800034 2E205 3454 C454 3542F454E 44455 2E3
:109E90001160 2017F02CD270 80 16D0211BC7611
:109EA0000CD120811A80 201CF02CD27083E0032557D
:109EB0003C3A553CFE02C23 17E32F87F2E203AFA7F
:109EC0007F2DCA147FE620CABE7E3AF87F5F 3A181B
:109ED000FC4F7B9 9 2100 805FCD4503 6C6311 6444 5D
:109EE00019D2557E0379328 3CF5E5D5C51119 FC08
:109EF0002198 3CCD3608C1D1E1F13E0 432F 97F1101
:109F0000 6D02017F02CD27080 16D0211D377CD128A
:109F10008C30 30 801AA0 21165 76CD120 81160 268
:109F200017F02CD27080 16D0211CA77CD1208C 347
:109F30003 08C3F1764C4F41442043 4F4E54524FD7
:109F40004C00434F505952494748542031 39838301A
:109F50002042592044494 34B4592D4A 4F484E 20F1
:109F6000434F52502E00040A370 0 0 0 0 4FFFF0 872
:109F70004B8730D0D93761 00CA760901F17603BC
:109F80008A7708 46 780 E0 89 780F0CCC781371
:109F9000C237A0B08267A1309 9 27A02 0 9 957A0 E15
:109FA0009377C070AE87C0F0A917E130A327FFF8B
:109FB000FFFFFFFFFFFFFFFFFFFFFFFFFFFFFFB1
:109FC000FFFFFFFFFFFFFFFFFFFFFFFFFFFFFFA1
:109FD000FFFFFFFFFFFFFFFFFFFFFFFFFFFFFF91
:109FE000FFFFFFF0370EFFFFFFFFFFF657F6F7F36
:109FF000357F0613800922E4FFFFFFFFFFFFFF0D
```

E000H=53H

*BYT E000 TO EFFFH

E000H=53H 43H 41H 45H 54H 20H 53H 50H 45H 45H 44H 20H 4DH 4FH 4EH 49H

```
E010H=54H 4FH 52H 20H 4DH 4FH 44H 55H 4CH 45H 00H 01H 00H 00H 96H E0H
E020H=02H 00H 00H 96H E0H 04H 00H 00H 96H E0H 06H 00H 00H 96H E0H 10H
E030H=00H 00H 96H E0H 20H 00H 00H D4H E0H 00H 00H C0H 40H E1H 00H 00H
E040H=00H FFH FFH 07H 01H 47H E3H 02H 05H 0FH E3H 04H 05H 0FH E3H 06H
E050H=05H 0FH E3H 08H 05H 0FH E3H 0AH 05H 0FH E3H 0CH 05H 0FH E3H 06H
E060H=06H 4FH E3H 14H 14H BCH EAH 14H 07H 33H EAH FFH FFH 00H 01H DCH
E070H=E0H 19H 09H 04H 55H 01H 02H DCH E0H 1AH 04H E2H 55H 02H 04H DCH
E080H=E0H 1BH 04H D3H 55H 03H 02H DCH E0H 1CH 02H E3H 46H 04H 10H F1H
E090H=E0H 1DH 01H 05H 64H FFH 3AH 69H 3CH FEH 01H CAH A6H E0H FEH 04H
E0A0H=CAH 00H 08H C3H CEH E0H CDH 71H E1H CDH 78H E1H DAH 00H 03H 3AH
E0B0H=C2H 33H FEH 04H C2H 00H 03H 3AH 68H 3CH 32H 68H 3CH CDH 00H
E0C0H=E2H 3AH 61H 3CH 32H 62H 3CH AFH 32H 61H 3CH C3H 00H 03H CDH 22H
E0D0H=E1H 23H 46H 23H 5EH 23H 56H EBH 50H E9H 55H 64H CDH 93H E1H CDH
E0E0H=71H E1H CDH 78H E1H DAH 00H 03H CDH B2H E1H CDH E3H E1H C3H 00H
E0F0H=03H CDH 93H E1H CDH 71H E1H CDH 78H E1H DAH 00H 03H 01H 05H 01H
E100H=16H 10H CDH 1BH EAH D2H 21H E1H 21H DBH E0H 01H 21H 03H CDH B0H
E110H=E1H D3H 20H E1H 21H DAH E0H 01H 73H 03H CDH B0H E1H C3H 21H E1H
E120H=37H CDH E0H E1H CDH 00H E3H 3AH 68H 3CH 3CH 32H 68H 3CH FEH 03H
E130H=C2H 00H 03H 3AH 61H 3CH 32H 62H 3CH AFH 32H 61H 3CH C3H 00H 03H
E140H=3AH 68H 3CH FEH 04H C2H 00H 03H 3EH 0FH 32H FDH CFH CDH 35H E2H
E150H=CDH 03H E2H CDH 42H E2H CDH B2H E2H 3AH C2H 35H FEH 17H C2H 00H
E160H=02H 3EH 01H 32H 68H 3CH CDH 00H E3H C3H 00H 03H 3AH 48H 3CH 17H
E170H=C9H 2AH 0EH 3CH 22H 67H 3CH C9H 01H E3H 03H 2AH 67H 3CH 7DH 91H
E180H=7CH 98H C9H 01H 08H 00H 21H 6DH E0H 3AH C2H 3BH 2EH C8H D8H 09H
E190H=C3H 8CH E1H 3AH FCH CFH 6FH 3AH FCH CFH 67H 22H 69H 3CH CDH 83H
E1A0H=E1H 01H 04H 00H 09H 7EH 32H FDH CFH 3EH FFH 32H FCH CFH 32H FCH
E1B0H=CFH C9H CDH 83H E1H 01H 05H 00H 09H 46H 23H 4EH 23H D5H E5H 11H
E1C0H=E8H 0AH CDH 48H 08H E5H 2AH 67H 3CH E5H CDH 42H 08H 61H 6AH E3H
E1D0H=55H 16H 00H E3H 01H 00H 00H CDH 42H 08H 41H 4AH 11H 64H 00H CDH
E1E0H=48H 08H EBH 2AH 69H 3CH 75H 95H 7AH 9CH C1H D1H C9H DAH F6H E1H
E1F0H=7AH 2FH 4FH 3AH 61H 3CH A1H 32H 61H 3CH C9H 3AH 61H 3CH B2H 32H
E200H=61H 3CH C9H 3EH 7FH 32H FDH CFH 3EH 01H 32H FEH CFH 00H 36H F8H
E210H=CFH 32H 63H 3CH 3EH 04H 32H F8H CFH 00H 3AH F8H CFH 2FH 32H 64H
E220H=3CH 06H 75H CDH 40H E2H C2H 23H E2H 3EH 01H 3EH 01H 3EH 01H 2AH
E230H=67H 3CH 32H F8H CFH 3EH 04H 32H F8H CFH 3EH 0FH 32H FDH CFH C9H
E240H=6EH C9H 3EH 19H 32H FDH CFH 0EH 00H 3AH 65H 3CH 32H 66H 3CH AFH
E250H=32H 65H 3CH 06H 05H 11H 40H 1FH 3AH FCH CFH 6FH 3AH FCH CFH 67H
E260H=7DH 93H 7CH 9AH DAH 6EH E2H 11H E0H 2EH 78H 95H 7AH 9CH 79H 1FH
E270H=4FH 05H C2H 55H E2H B7H 79H 1FH 1FH 1FH 4FH 3AH 65H 3CH 47H 3AH
E280H=66H 3CH B0H 2FH A1H 32H 65H 3CH C9H 01H FCH CFH 11H F8H CFH 3EH
E290H=17H 12H 3EH 00H 02H 3EH 81H 02H 3EH 01H 12H 26H 02H 2EH E1H 3EH
E2A0H=88H 02H 70H 02H AFH 02H 02H 02H 02H 2CH 25H C2H 9FH E2H 3EH 19H
E2B0H=12H C9H 01H FCH CFH 11H F8H CFH 3EH 17H 12H 3EH D0H 02H 3EH 86H
E2C0H=02H 3EH 01H 12H 26H 05H 2EH C1H 3EH A8H 02H 7DH 02H AFH 02H 02H
E2D0H=3EH FFH 02H 02H 2CH 25H C2H C8H E2H 3EH 19H 12H 3EH 02H 32H F8H
E2E0H=CFH 3EH 7FH 12H C9H AFH 32H 61H 3CH 32H 62H 3CH 32H 63H 3CH 32H
E2F0H=64H 3CH 32H 65H 3CH 32H 66H 3CH 32H 60H 3CH 3EH 01H 32H 6BH 3CH
E300H=CDH B2H E2H C9H 02H 01H 04H 02H 04H 04H 08H 10H 08H 08H FFH 3AH
E310H=DFH 3BH 21H 04H E4H 01H 08H 00H BEH CAH 23H E3H DAH 03H 03H 09H
E320H=C3H 18H E3H 23H 56H 23H 60H 3CH AAH 32H 60H 3CH 57H CDH 95H E3H
E330H=C3H 03H 03H E0H E3H 52H 00H EBH E3H A2H 00H 03H E4H F2H 00H 1BH
E340H=E4H 42H 01H 33H E4H 92H 01H CDH 24H 03H 3EH 05H 32H DEH 3BH CDH
E350H=66H 03H 3EH 15H 32H DFH 3BH 01H 04H 00H 11H 00H E0H CDH 12H 03H
E360H=01H 1FH 00H 11H D8H E3H CDH 12H 03H 21H 32H E3H 3EH 05H 55H 23H
E370H=56H 23H 4EH 23H 46H 23H F5H E5H CDH 12H 03H E1H F1H 3DH C2H 6EH
```

```
370H=56H 23H 4EH 23H 46H 23H F5H E5H C1H 12H 03H E1H F1H 3DH C2H 6EH
380H=E3H 34H 60H 3CH 57H C1H 95H E3H C3H 03H 03H 50H 00H 5AH 00H 00H
390H=01H A3H 01H 57H 01H 21H 83H E3H 1EH 03H 4EH 23H 46H 23H 7AH 1FH
3A0H=57H D5H E5H D2H AFH E3H 11H 6AH E4H CDH 12H 03H C3H B5H E3H 11H
3B0H=5FH E4H CDH 12H 03H E1H D1H 1DH C2H 9AH E3H C3H 03H 03H 53H 48H
3C0H=41H 46H 54H 20H 53H 50H 45H 45H 44H 20H 4DH 4FH 4EH 49H 54H 4FH
3D0H=52H 20H 46H 41H 49H 4CH 55H 52H 45H 53H 00H 4DH 45H 4EH 55H 00H
3E0H=53H 48H 4FH 45H 20H 41H 4CH 45H 52H 54H 00H 54H 41H 49H 4CH 49H
3F0H=4EH 47H 53H 20H 45H 4CH 45H 56H 41H 54H 4FH 52H 20H 41H 4CH 45H
400H=52H 54H 00H 43H 4CH 45H 41H 4EH 20H 47H 52H 41H 49H 4EH 20H 45H
410H=4CH 45H 56H 41H 54H 4FH 52H 20H 41H 4CH 45H 52H 54H 00H 42H 45H
420H=41H 54H 45H 52H 2FH 43H 43H 4FH 50H 50H 45H 52H 20H 41H 4CH 45H
430H=52H 54H 00H 41H 49H 52H 20H 53H 43H 52H 45H 45H 4EH 20H 41H 4CH
440H=45H 52H 54H 00H 53H 43H 41H 46H 54H 20H 4DH 4FH 4EH 49H 54H 4FH
450H=52H 20H 4DH 4FH 44H 55H 4CH 45H 20H 41H 4CH 45H 52H 54H 00H 2DH
460H=45H 4EH 41H 42H 4CH 45H 44H 20H 20H 00H 2DH 44H 49H 53H 41H 42H
470H=4CH 45H 44H 20H 00H 53H 48H 4FH 45H 20H 20H 20H 20H 20H 20H 20H
480H=20H 20H 53H 48H 41H 46H 54H 20H 45H 41H 49H 4CH 55H 52H 45H 20H
490H=20H 20H 20H 20H 20H 30H 31H 30H 31H 30H 00H 53H 48H 4FH 45H 20H
4A0H=20H 20H 20H 20H 20H 20H 20H 53H 45H 4EH 53H 4FH 52H 2FH 43H
4B0H=41H 42H 4CH 45H 20H 4FH 50H 45H 4EH 20H 20H 30H 31H 30H 31H 31H
4C0H=00H 53H 48H 4FH 45H 20H 20H 20H 20H 20H 20H 20H 20H 2DH 53H 45H
4D0H=4EH 53H 4FH 52H 2FH 43H 41H 42H 4CH 45H 20H 53H 48H 4FH 52H 54H
4E0H=2DH 30H 31H 30H 31H 32H 00H 53H 48H 4FH 45H 20H 20H 20H 20H 20H
4F0H=20H 20H 20H 2DH 53H 42H 41H 46H 54H 20H 4DH 4FH 44H 55H 4CH 45H
500H=20H 46H 41H 55H 4CH 54H 20H 30H 31H 30H 31H 33H 00H 54H 41H 49H
510H=4CH 49H 4EH 47H 20H 45H 4CH 45H 56H 20H 53H 48H 41H 46H 54H 20H
520H=46H 41H 49H 4CH 55H 53H 45H 20H 20H 20H 20H 20H 2DH 30H 31H 30H
530H=32H 30H 00H 54H 41H 49H 4CH 49H 4EH 47H 20H 45H 4CH 45H 56H 20H
540H=53H 45H 4EH 53H 4FH 52H 2FH 43H 41H 42H 4CH 45H 20H 4FH 50H 45H
550H=4EH 20H 2DH 30H 31H 30H 32H 31H 00H 54H 41H 49H 4CH 49H 4EH 47H
560H=20H 45H 4CH 45H 56H 20H 53H 45H 4EH 53H 4FH 52H 2FH 43H 41H 42H
570H=4CH 45H 20H 53H 48H 4FH 52H 54H 20H 30H 31H 30H 32H 32H 00H 54H
580H=41H 49H 4CH 49H 4EH 47H 20H 45H 4CH 45H 56H 20H 53H 48H 41H 46H
590H=54H 20H 4DH 4FH 44H 55H 4CH 45H 20H 45H 41H 55H 4CH 54H 20H 30H
5A0H=31H 30H 32H 33H 00H 43H 2EH 47H 52H 41H 49H 4EH 20H 45H 4CH 45H
5B0H=56H 20H 53H 48H 41H 46H 54H 20H 46H 41H 49H 4CH 55H 52H 45H 20H
5C0H=20H 20H 20H 20H 2DH 30H 31H 30H 33H 30H 00H 43H 2EH 47H 52H 41H
5D0H=49H 4EH 20H 45H 4CH 45H 56H 20H 53H 45H 4EH 53H 4FH 52H 2FH 43H
5E0H=41H 42H 4CH 45H 20H 4FH 50H 45H 4EH 20H 2DH 30H 31H 30H 33H 31H
5F0H=00H 43H 2EH 47H 52H 41H 49H 4EH 20H 45H 4CH 45H 56H 20H 53H 45H
600H=4EH 53H 4FH 52H 2FH 43H 41H 42H 4CH 45H 20H 53H 48H 4FH 52H 54H
610H=2DH 30H 31H 30H 33H 32H 00H 43H 2EH 47H 52H 41H 49H 4EH 20H 45H
620H=4CH 45H 56H 20H 53H 48H 41H 46H 54H 20H 4DH 4FH 44H 55H 4CH 45H
630H=20H 45H 41H 55H 4CH 54H 20H 30H 31H 30H 33H 33H 00H 42H 45H 41H
640H=54H 45H 52H 2FH 43H 43H 4FH 50H 20H 20H 53H 48H 41H 46H 54H 20H
650H=46H 41H 49H 4CH 55H 52H 45H 20H 20H 20H 20H 20H 2DH 30H 31H 30H
660H=34H 30H 00H 42H 45H 41H 54H 45H 52H 2FH 43H 43H 4FH 50H 20H 20H
670H=53H 45H 4EH 53H 4FH 52H 2FH 43H 41H 42H 4CH 45H 20H 4FH 50H 45H
680H=4EH 20H 2DH 30H 31H 30H 34H 31H 00H 42H 45H 41H 54H 45H 52H 2FH
690H=43H 43H 4FH 50H 20H 20H 53H 45H 4EH 53H 4FH 52H 2FH 43H 41H 42H
6A0H=4CH 45H 20H 53H 48H 4FH 52H 54H 20H 30H 31H 30H 34H 32H 00H 42H
6B0H=45H 41H 54H 45H 52H 2FH 43H 43H 4FH 50H 20H 20H 53H 48H 41H 46H
6C0H=54H 20H 4DH 4FH 44H 55H 4CH 45H 20H 46H 41H 55H 4CH 54H 20H 30H
6D0H=31H 30H 34H 33H 00H 41H 49H 52H 20H 53H 43H 52H 45H 45H 4EH 20H
```

```
E6E0H=20H 2DH 52H 48H 41H 46H 54H 20H 46H 41H 49H 4CH 55H 52H 45H 20H
E6F0H=20H 20H 20H 20H 2DH 30H 31H 30H 35H 30H 00H 41H 49H 52H 20H 53H
E700H=43H 52H 45H 45H 4EH 20H 20H 53H 45H 4EH 53H 4FH 52H 2FH 43H
E710H=41H 42H 4CH 45H 20H 4FH 50H 45H 4EH 20H 20H 20H 30H 31H 30H 35H 31H
E720H=03H 41H 49H 52H 20H 53H 43H 52H 45H 45H 4EH 20H 20H 20H 53H 45H
E730H=4EH 53H 4FH 52H 2FH 43H 41H 42H 4CH 45H 20H 53H 43H 4FH 52H 54H
E740H=2DH 30H 31H 30H 35H 32H 00H 41H 49H 52H 20H 53H 43H 52H 45H 45H
E750H=4EH 20H 20H 20H 53H 48H 41H 46H 54H 20H 4DH 4FH 44H 55H 4CH 45H
E760H=20H 46H 41H 55H 4CH 54H 20H 30H 31H 30H 35H 33H 00H 3AH 65H 3CH
E770H=4FH 3AH 66H 3CH A1H 4FH 3AH 63H 3CH B1H 4FH 3AH 64H 3CH B1H 4FH
E780H=C9H 75H E4H 9BH E4H C1H E4H E7H E4H 0DH E5H 33H E5H 59H E5H 7FH
E790H=E5H A3H E5H CBH E5H F1H E5H 17H E6H D5H E6H FBH E6H 21H E7H 47H
E7A0H=E7H 3DH E6H 63H E6H 89H E6H AFH E6H 36H 09H E5H 2AH 80H 36H E8H
E7B0H=E1H 73H 23H 72H C9H 21H 6DH 3BH 70H 2BH 71H 2AH 80H 36H 22H 7DH
E7C0H=3BH 2AH B8H 3AH 22H 7FH 3BH 2AH 82H 36H 44H 4DH CDH 3BH 7BH 1FH
E7D0H=D2H E3H 87H 0EH 00H C5H 2AH 82H 36H E5H 11H 00H 00H 01H 00H 00H
E7E0H=CDH 25H 83H 2AH B8H 36H 22H 80H 36H 01H 6EH 3BH CDH E6H 77H 1FH
E7F0H=D2H F5H 87H 21H AFH 3AH 12H 55H 2AH 82H 36H 44H 4DH CDH 23H 7BH
E800H=CDH E7H E9H 3AH 63H 3CH 4FH 3AH 64H 3CH 57H 3AH 65H 3CH 5FH 2AH
E810H=66H 3CH A3H 5FH 21H 81H E7H 3EH 05H F5H 73H 1FH 47H D2H 81H E8H
E820H=79H 1FH 4FH D2H 3DH E8H C5H D5H 11H 02H 00H 19H 4EH 23H 46H 11H
E830H=05H 00H 19H E5H CDH 6CH 08H E1H D1H C1H C3H 96H E8H 7AH 1FH 57H
E840H=D2H 5AH E8H C5H D5H 11H 04H 00H 19H 4EH 23H 46H 11H 03H 00H 19H
E850H=E5H CDH 6CH 08H E1H D1H C1H C3H 99H E8H 7BH 1FH 5FH D2H 74H E8H
E860H=C5H D5H 11H 06H 00H 19H 4EH 23H 46H 23H E5H CDH 6CH 08H E1H D1H
E870H=C1H C3H 9CH E8H C5H D5H 4EH 23H 46H 11H 07H 00H 19H CDH 6CH E1H
E880H=D2H 83H E8H E5H CDH 6CH 08H E1H D1H C1H C3H 9CH E8H D5H 11H 08H
E890H=00H 19H D1H 79H 1FH 4FH 7AH 1FH 57H 7BH 1FH 5FH F1H 3DH C2H 19H
E8A0H=E8H C9H 1AH 01H 95H E4H B5H E4H E1H E4H 07H E5H 21H 01H 2DH E5H
E8B0H=53H E5H 79H E5H 9FH E5H 28H 01H C5H E5H EBH E5H 11H E6H 37H E6H
E8C0H=36H 01H F5H E6H 15H E7H 41H E7H 67H E7H 2FH 01H 5DH E8H 83H E6H
E8D0H=A9H E6H CFH E6H 3AH DEH 32H FEH 06H C2H 00H 03H 3AH 68H 3CH FEH
E8E0H=01H CAH ECH E8H FEH 04H CAH ECH E8H C3H 00H 03H CDH 6CH E1H DAH
E8F0H=F9H E8H CDH 6DH E7H 41H C3H 02H E9H 3AH 61H 3CH 47H 3AH 62H 3CH
E900H=A0H 47H E6H 1FH C2H 1CH E9H 11H F2H 00H 01H 0DH 01H CDH 27H 08H
E910H=11H 1AH 01H 01H 3AH 01H CDH 27H 08H C3H 00H 03H C5H 01H F2H 00H
E920H=11H BEH E3H CDH 12H 08H C1H 3AH 63H 3CH 4FH 3AH 64H 3CH 57H 3AH
E930H=65H 3CH 5FH 3AH 66H 3CH A3H 5FH 21H A2H E8H 3EH 05H F5H 73H 1FH
E940H=47H D2H BDH E9H 79H 1FH 4FH D2H 63H E9H C5H D5H 4EH 23H 46H 23H
E950H=23H 23H 5EH 23H 56H E5H CDH 12H 08H E1H 11H 05H 00H 19H D1H C1H
E960H=C3H D9H E9H 7AH 1FH 57H D2H 83H E9H C5H D5H 4EH 23H 46H 11H 05H
E970H=00H 19H 5EH 23H 56H E5H CDH 12H 08H E1H 11H 03H 00H 19H D1H C1H
E980H=C3H DCH E9H 7BH 1FH 5FH D2H A0H E9H C5H D5H 4EH 23H 46H 11H 07H
E990H=00H 19H 5EH 23H 56H E5H CDH 12H 08H E1H 23H D1H C1H C3H DFH E9H
E9A0H=C5H D5H 4EH 23H 46H 23H 5EH 23H 56H CDH 6CH E1H D2H B4H E9H E5H
E9B0H=CDH 12H 08H E1H 11H 07H 00H 19H D1H C1H C3H DFH E9H D5H C5H 5EH
E9C0H=23H 56H 42H 7BH C6H 05H 4FH 78H CEH 00H 47H E5H CDH 27H 08H E1H
E9D0H=C1H 11H 09H 00H 19H D1H 79H 1FH 4FH 7AH 1FH 57H 7BH 1FH 5FH F1H
E9E0H=3DH C2H 3DH E9H C3H 00H 03H CDH 6CH E1H DAH F3H E9H C5H 6DH E7H
E9F0H=C3H FCH E9H 3AH 61H 3CH 4FH 3AH 62H 3CH A1H 4FH 3AH 60H 3CH 2FH
EA00H=A1H 47H 79H E6H 1FH C3H 78H E6H 1FH 3AH CEH 3BH C2H 15H EAH F6H
EA10H=10H 32H CEH 3BH C9H F6H 50H 32H CEH 3BH C9H D5H 11H 8EH 0AH CDH
EA20H=46H 08H E8H 2AH 67H 3CH CDH 42H 08H 2AH 69H 3CH 7AH 3BH 79H
EA30H=9CH D1H C9H CDH 24H 08H 3EH 14H 32H DEH 3BH 01H 02H 00H 11H 00H
EA40H=EBH CDH 12H 08H 01H 52H 00H 11H 24H EBH CDH 12H 08H 01H 7CH 00H
```

```
EA50H=11H 49H EBH CDH 12H 03H 01H CAH 00H 11H 60H EBH CDH 12H 03H 01H
EA60H=F4H 00H 11H 87H EBH CDH 12H 03H 01H 1CH 01H 11H ACH EBH CDH 12H
EA70H=03H 01H 6AH 01H 11H C9H EBH CDH 12H 03H 01H 94H 01H 11H ECH EBH
EA80H=CDH 12H 03H 01H E2H 01H 11H 11H ECH CDH 12H 03H 01H 32H 02H 11H
EA90H=35H ECH CDH 12H 03H 01H 5CH 02H 11H 5BH ECH CDH 12H 03H 01H 84H
EAA0H=02H 11H 7DH ECH CDH 12H 03H 01H D2H 02H 11H A2H ECH CDH 12H 03H
EAB0H=01H 22H 03H 11H C9H ECH CDH 12H 03H C3H 03H 03H CDH 24H 03H 3EH
EAC0H=15H 32H DEH 35H 32H DFH 35H 01H 7AH 00H 11H D3H ECH CDH 12H 03H
EAD0H=01H CAH 00H 11H F5H ECH CDH 12H 03H 01H 1AH 01H 11H 19H EDH C9H
EAE0H=12H 03H 01H 6AH 01H 11H 35H EDH CDH 12H 03H 01H 9AH 01H 11H 5BH
EAF0H=EDH CDH 12H 03H 01H 3CH 02H 11H 7FH EDH CDH 12H 03H C3H 03H 03H
EB00H=54H 52H 4FH 55H 42H 4CH 45H 53H 48H 4FH 4FH 54H 49H 4EH 47H 20H
EB10H=53H 43H 41H 4EH 54H 20H 53H 45H 4EH 53H 4FH 52H 53H 2EH 43H 41H
EB20H=42H 4CH 45H 00H 31H 20H 4CH 4FH 4FH 4BH 20H 46H 4FH 52H 20H 50H
EB30H=48H 59H 53H 49H 43H 41H 4CH 20H 44H 41H 4DH 41H 47H 45H 20H 54H
EB40H=4FH 20H 53H 45H 4EH 52H 4FH 52H 00H 50H 41H 52H 54H 53H 20H 4FH
EB50H=52H 20H 53H 45H 4EH 53H 4FH 52H 20H 4CH 45H 41H 44H 53H 2EH 00H
EB60H=32H 20H 43H 48H 45H 43H 4BH 20H 46H 4FH 52H 20H 31H 2FH 33H 20H
EB70H=49H 4EH 43H 48H 20H 43H 4CH 45H 41H 52H 41H 4EH 43H 45H 20H 42H
EB80H=45H 54H 57H 45H 45H 4EH 00H 4DH 41H 47H 4EH 45H 54H 20H 46H 4CH
EB90H=41H 54H 20H 41H 4EH 44H 20H 53H 57H 49H 54H 43H 48H 20H 57H 48H
EBA0H=45H 4EH 20H 53H 48H 41H 46H 54H 20H 49H 53H 00H 52H 4FH 54H 41H
EBB0H=54H 45H 44H 20H 54H 4FH 20H 4EH 45H 41H 52H 45H 53H 54H 20H 50H
EBC0H=4FH 53H 49H 54H 49H 4FH 4EH 2EH 00H 33H 20H 41H 44H 4AH 55H 53H
EBD0H=54H 20H 43H 4CH 45H 41H 52H 41H 4EH 43H 45H 20H 49H 46H 20H 4EH
EBE0H=45H 43H 45H 53H 53H 41H 52H 59H 20H 42H 59H 00H 4CH 4FH 4FH 53H
EBF0H=45H 4EH 49H 4EH 47H 20H 41H 4EH 44H 20H 52H 45H 50H 4FH 53H 49H
EC00H=54H 49H 4FH 4EH 49H 4EH 47H 20H 42H 52H 41H 43H 4BH 45H 54H 2EH
EC10H=00H 34H 20H 53H 45H 43H 55H 52H 45H 4CH 59H 20H 46H 41H 53H 54H
EC20H=45H 4EH 20H 41H 4CH 4CH 20H 53H 45H 4EH 53H 4FH 52H 20H 50H 41H
EC30H=52H 54H 53H 2EH 00H 35H 20H 44H 49H 53H 43H 4FH 4EH 4EH 45H 43H
EC40H=54H 20H 53H 45H 4EH 53H 4FH 52H 20H 4CH 45H 41H 44H 53H 20H 42H
EC50H=59H 20H 54H 57H 49H 53H 54H 49H 4EH 47H 00H 41H 4EH 44H 20H 50H
EC60H=55H 4CH 4CH 49H 4EH 47H 20H 53H 49H 4DH 55H 4CH 54H 41H 4EH 45H
EC70H=4FH 55H 53H 4CH 59H 20H 4FH 45H 20H 54H 43H 45H 00H 43H 4FH 55H
EC80H=53H 49H 4EH 47H 2EH 20H 43H 4CH 45H 41H 4EH 20H 43H 4FH 4EH 54H
EC90H=41H 43H 54H 53H 20H 49H 46H 20H 43H 4FH 52H 52H 4FH 44H 45H 44H
ECA0H=2EH 00H 36H 20H 52H 45H 50H 41H 49H 52H 20H 57H 49H 52H 45H 20H
ECB0H=42H 59H 20H 52H 50H 4CH 49H 43H 49H 4EH 47H 2CH 53H 4FH 4CH 44H
ECC0H=45H 52H 2CH 20H 54H 41H 50H 45H 00H 4EH 45H 58H 54H 20H 50H 41H
ECD0H=47H 45H 00H 59H 4FH 55H 20H 48H 41H 56H 45H 20H 6AH 59H 53H 54H
ECE0H=20H 53H 45H 45H 4EH 20H 41H 4EH 20H 41H 42H 42H 52H 45H 56H 49H
ECF0H=41H 54H 45H 44H 00H 44H 45H 43H 4FH 4EH 53H 54H 52H 41H 54H 49H
ED00H=4FH 45H 20H 4FH 46H 20H 53H 45H 52H 56H 49H 43H 45H 20H 44H 49H
ED10H=41H 47H 4EH 4FH 53H 54H 49H 43H 00H 50H 53H 4FH 43H 45H 44H 55H
ED20H=52H 45H 53H 20H 54H 48H 41H 54H 20H 43H 41H 4EH 20H 42H 45H 20H
ED30H=6DH 41H 44H 45H 00H 41H 56H 41H 49H 4CH 41H 42H 4CH 45H 20H 54H
ED40H=4FH 20H 4FH 57H 4EH 45H 52H 53H 20H 4FH 52H 20H 44H 45H 41H 4CH
ED50H=45H 52H 53H 20H 56H 49H 41H 00H 41H 4EH 20H 41H 44H 44H 2DH 4FH
ED60H=4EH 20H 4CH 41H 52H 47H 45H 20H 43H 41H 50H 41H 43H 49H 54H 59H
ED70H=20H 4DH 45H 4DH 4FH 52H 59H 20H 4DH 4FH 44H 55H 4CH 45H 00H 43H
ED80H=4FH 55H 52H 54H 45H 53H 59H 20H 4FH 46H 20H 49H 42H 2FH 44H 4AH
ED90H=00H 2DH 20H 20H 20H 2DH 20H 20H 53H 43H 41H 4EH 54H 20H 52H
EDA0H=45H 4EH 53H 4FH 52H 2FH 43H 41H 42H 4CH 45H 20H 4CH 4FH 43H 41H
EDB0H=56H 49H 4FH 4EH 53H 00H 2DH 2DH 2DH 2DH 2DH 2DH 2DH 2DH 2DH
```

While the invention has been illustrated and described above with reference to a specific embodiment, the invention is not limited thereto. On the contrary, those skilled in the art may devise various alternatives, changes and modifications upon reading the foregoing descriptions. Accordingly, the invention includes such alternatives, changes and modifications insofar as they fall within the spirit and scope of the appended claims.

The invention is claimed as follows:

1. In a monitoring system for an agricultural machine including a plurality of sensors for detecting a plurality of machine functions and for producing corresponding sensor signals, said monitoring system including monitoring circuit means responsive to said sensor signals for producing indication signals corresponding to said plurality of machine functions, the improvement comprising: diagnostic means coupled with said monitoring circuit means and comprising diagnostic memory means for containing data corresponding to the expected range of values of each of said sensor signals if produced by a properly functioning sensor and comparing means coupled with said monitoring circuit means and with said diagnostic memory means for comparing the expected range of values of each sensor signal with its actual value and for producing a failure signal in the event of a predetermined comparison therebetween, said monitoring circuit means including means responsive to said failure signal for producing indication signals corresponding to a failure of a corresponding sensor.

2. The improvement of claim 1 wherein a plurality of cable means respectively coupling said sensors with said monitoring circuit means, said diagnostic memory means also containing data corresponding to expected values of said sensor signals received over properly functioning cables, said comparing means further comparing said expected value for each sensor signal with its actual and producing a further failure signal in response to a predetermined comparison therebetween, said monitoring circuit means being further responsive to said further failure signal for producing indication signals corresponding to failure of a corresponding cable means.

3. The improvement according to claim 1 or claim 2 and further including display means and display driving means responsive to said indication signals for causing said display means to produce an observable display corresponding to said indication signals.

4. The improvement according to claim 3 wherein said display means comprises a video display capable of displaying a plurality of lines of alphanumeric information.

5. The improvement according to claim 4 wherein said memory means further contains data corresponding to values of said sensor signals expected in response to one or more different possible modes of failure of each sensor, and data corresponding to failure mode information specifically identifying each sensor and a plurality of failure modes thereof and corresponding instructional information for the correction of each said failure mode, and wherein said comparing means further compares each sensor signal with the data corresponding to one or more different possible failure modes thereof and upon a predetermined comparison therebetween causes said memory means to feed the corresponding failure mode information and instructional information to said display driving means for alphanumeric display thereof on said video display.

6. The improvement according to claim 4 wherein said memory means further contains data corresponding to values of said sensor signals expected in response to open-circuit and short-circuit conditions of the associated cable means and failure mode information specifically identifying a short-circuit or open-circuit condition for each said cable means and instructional information for the correction thereof, and wherein said comparing means compares the cable failure mode information with said sensor signals and upon a predetermined comparison therebetween causes said memory means to feed the corresponding open-circuit or short-circuit information and instructional information to said display driving means for alphanumeric display thereof on said video display.

7. The improvement according to claim 4 further including calibrating means coupled with said monitoring circuit means including calibration memory means for containing data corresponding to instructional information for calibrating said monitoring system for use with a particular machine having given characteristics, and means for actuating said display driving means to select said data corresponding to the calibration instructions and to display said instructions in alphanumeric form on said video display.

8. In a monitoring system for an agricultural machine including a plurality of sensor means for detecting a plurality of machine functions and for producing corresponding sensor signals, said monitoring system including monitoring circuit means responsive to said sensor signals for producing indication signals corresponding to said plurality of machine functions, the improvement comprising: video display means capable of displaying a plurality of lines of alphanumeric information, memory means containing calibration data corresponding to instructions for the calibration of said monitoring system for operation with a particular machine, and display driving means responsive to said calibration data for causing said video display means to display said instructions in alphanumeric form, wherein said agricultural machine comprises a combine, and wherein said plurality of sensor means include load sensor means for sensing the operation of one or more parts of said combine which are variably loaded during the combining operation and ground speed sensor means for sensing the ground speed of said combine, and further including load control circuit means for adjusting the ground speed of the combine in accordance with a predetermined relationship between the operation of said variably loaded combine parts and said ground speed so as to control the load imposed upon said one or more variably loaded combine parts, said calibration data including data corresponding to operations for calibrating said load control means for operation with a particular combine having particular operating characteristics, and automatic calibration means responsive to said calibration data for calibrating said load control means for operation of said particular combine.

9. A modular monitoring and control system for an agricultural machine comprising; data bus means, executive monitoring and control means responsive to data received from said data bus means for producing indication signals corresponding to said data, at least one monitoring module means including input means for receiving sensor signals from sensor means which detect operating conditions of said agricultural machine and produce corresponding sensor signals and signal converting means for converting said sensor signals to data usable by said executive monitoring and control means, said monitoring module means being capable of being coupled with said data bus means for bidirectional transfer of data with said executive monitoring and control means, said executive monitoring and control means including a central processing unit capable of operating in a predetermined cycle for individually and sequentially interrogating each of a plurality of said monitoring module means to receive the data therefrom, and each of said monitoring module means including memory means containing data identifying that monitoring module means and the functioning thereof including data identifying the portions of said predetermined cycle during which that monitoring module is to be interrogated by said central processing unit, a plurality of similar monitoring module means being selectively capable of being coupled with said data bus means to form, together with said executive monitoring and control means, a monitoring and control system comprising a desired number of monitoring module means.

10. In a monitoring system for a combine including a plurality of sensor means for sensing the operation of one or more combine parts which are variably loaded during the combining operation and ground speed sensor means for sensing the ground speed of said combine, and a load control circuit means for adjusting the ground speed of the combine in accordance with a predetermined relationship between the operation of the variably loaded parts and the ground speed of the combine, the improvement comprising an automatic load calibration system for calibrating the operation of said load control means for a particular combine having particular operating characteristics and comprising memory means containing calibration data corresponding to calibration operations for use in calibrating said load control means for operation with a particular combine and automatic calibrating means responsive to said calibration data and to said sensors for calibrating said load control means.

11. A modular monitoring and control system for a combine comprising: data bus means, executive monitoring and control means responsive to data received from said data bus means for producing indication signals corresponding to said data, monitoring module means including input means for receiving sensor signals from sensor means which detect operating conditions of said combine and produce corresponding sensor signals and signal converting means for converting said sensor signals to data usable by said executive monitoring and control means, said monitoring module means being capable of being coupled with said data bus means for bidirectional transfer of data with said executive monitoring and control means, and monitoring and control module means including means for receiving sensor signals from sensor means which respond to at least one controllable combine function for producing corresponding sensor signals, second signal converting means for converting said sensor signals to data usable by said executive monitoring and control means and output circuit means for delivering control signals for said controllable combine functions, said monitor and control module means being capable of being coupled with said data bus means for bidirectional transfer of data with said executive monitoring and control means, said monitoring module means and said monitor and control module means being capable of being coupled with said data bus means to form, together with said executive monitoring and control means, a monitoring and control system comprising a desired number of module means.

12. A modular monitoring and control system according to claim 11 and wherein said monitor and control module means include intelligent monitor and control module means comprising input means for receiving sensor signals from sensor means which detect at least one controllable combine function and processing means operable independently of said executive monitoring and control means for processing said sensor signals to derive control signals for controlling said controllable combine function and output means for delivering said control signals to said combine, said signal processing means further converting said sensor signals into data usable by said executive monitoring and control circuit means, said intelligent monitor and control module means being couplable with said data bus means for delivering said data to said executive monitoring and control circuit means.

13. A modular monitoring and control system according to claim 12 and further including display means and display driver means responsive to said indication signals produced by said executive monitoring and control means for producing an observable display corresponding to the operation of the monitored functions of said combine.

14. A modular monitoring system according to claim 11 and further including a diagnostics module comprising memory means containing data corresponding to a plurality of failure modes of each of said plurality of sensor means and to corresponding instructional information for the correction of each said failure mode, and wherein said executive monitoring and control means includes comparing means for comprising the data corresponding to each sensor signal with selected data from said memory means and upon a predetermined comparison therebetween causes said memory means to feed the data corresponding to failure mode information and instructional information to said monitoring and control means for production of indication signals corresponding thereto.

15. A modular monitoring and control system according to claim 11 wherein said executive monitoring and control means comprises a central processing unit operating in a predetermined cycle for individually and sequentially interrogating each of said modules to receive the data therefrom.

16. A modular monitoring and control system according to claim 15 wherein each of said module means includes memory means containing data identifying that module and the functioning thereof including data identifying the portions of said predetermined cycle during which said module is to be interrogated by said central processing unit.

17. A modular monitoring and control system according to claim 14 wherein said executive monitoring and control means comprises a central processing unit and wherein each of said monitoring module means, said monitoring and control module means and said diagnostic module means includes module memory means for identification of the module and its operation and wherein said central processing means operates in a predetermined cycle for interrogating each module and receiving the data therefrom, said module memory means further including information for controlling said cycle of operation, and wherein said cycle includes portions interruptable by operator selection of said diagnostics module.

18. A modular monitoring and control system according to claim 12 wherein said monitoring module means includes a machine parameters module including input means for receiving sensor signals from sensor means which detect operating parameters of the combine engine and produce corresponding sensor signals, a grain loss module including input means for receiving sensor signals from grain loss sensor means which produce grain loss signals corresponding to the grain loss during the combining operation, and a shaft monitor module including input means for receiving sensor signals from sensor means for detecting the rotational speed of a plurality of rotating members in said combine and producing a corresponding rotation signal wherein said intelligent monitor and control module means includes a load control module including input means for receiving sensor signals from a plurality of sensor means which are responsive to the operation of combine parts which are variably loaded during combine operation and produce corresponding load signals and from a ground speed sensor responsive to the ground speed of the combine for producing a corresponding ground speed signal, said signal processing means being responsive to said load signals and said ground speed signal for producing an output control signal to regulate the ground speed of the combine in accordance with a preselected desired load.

19. A monitoring system for an agricultural machine including a plurality of sensors for detecting a plurality of machine functions and for producing corresponding sensor signals, said monitoring system comprising: executive monitoring and control means responsive to data derived from said sensor signals for producing data corresponding to indications of said plurality of machine functions, video display means capable of displaying a plurality of lines of alphanumeric information, display driving means responsive to said indication signals for causing said video display means to produce an observable display corresponding to said indication signals, diagnostic memory means containing data corresponding to values of said sensor signals expected in response to a plurality of failure modes of each sensor and data corresponding to failure mode information identifying each sensor and a plurality of failure modes thereof and corresponding instructional information for the correction of each said failure mode, comparing means coupled with said diagnostic memory means and with said executive monitor and control means for comparing the expected values with the actual values of the sensor signals and upon a predetermined comparison therebetween for selecting the data corresponding to failure mode information and instructional information from said diagnostic memory for delivery to said display driving means for alphanumeric display thereof on said video display means, calibration memory means coupled with said executive monitoring and control means for containing data corresponding to instructional information for calibration of said monitoring system for use with a particular machine having given characteristics and means for actuating said display driving means to select said data corresponding to calibration instructional information and for displaying said instructions in alphanumeric form on said video display, and wherein said executive monitoring and control means includes actuating means accessible to an operator for selecting one of said data corresponding to indications of said plurality of machine functions, said data corresponding to failure mode and instructional information, or said data corresponding to calibration instructional information for display on said video display means.

20. A monitoring system according to claim 19 wherein said last mentioned means includes operator accessible control means comprising no more than two independently actuatable control members for selecting among a plurality of predetermined screens of alphanumeric display, including a plurality of display screens corresponding to said indication signals, a plurality of display screens corresponding to said failure mode information and corrective instructional information and a plurality of display screens corresponding to said calibration instructional information.

21. A monitoring and control system for an agricultural machine including a plurality of sensors for detecting a plurality of machine functions and for producing corresponding sensor signals, said monitoring and control system including executive monitoring and control means responsive to input data for producing display signals, a video display capable of displaying a plurality of lines of alphanumeric information in response to said display signals, memory means containing calibration data corresponding to operations for the calibration of said monitoring and control system for operation with a particular machine and coupled with said executive monitor and control means for display of said calibration data, automatic load calibration means for calibrating the operation of one or more combine parts which are variably loaded during the combining operation and responsive to said calibration data and to selected ones of said sensors for calibrating load control means for control of the operation of said variably loaded combine parts, monitoring module means capable of being coupled with said executive monitor and control means and including means responsive to selected ones of said sensors for converting said sensor signals to data usable by said executive monitor and control means, and control module means capable of being coupled with said executive monitor and control means and including means responsive to selected ones of said sensors for converting said sensor signals to data usable by said executive monitor and control means and diagnostic means including diagnostic memory means for containing failure data corresponding to the expected range of values of each of said sensor signals if produced by a properly functioning sensor and capable of being coupled with said executive monitor and control means for comparing the expected range of values of each sensor signal with its actual value and for producing failure data in the event of a predetermined comparison therebetween for display of corresponding failure and diagnostic information.

* * * * *

UNITED STATES PATENT AND TRADEMARK OFFICE
CERTIFICATE OF CORRECTION

PATENT NO. : 4,376,298

DATED : March 8, 1983

INVENTOR(S) : DAVID G. SOKOL, ROGER B. WHITAKER, JOHN J. LORD, and
DAVID M. BEAMS It is certified that error appears in the above-identified patent and that said Letters Patent is hereby corrected as shown below:

Column 5, line 41, change "of microprocessor" to --or microprocessor--;

Column 9, line 27, change "write (MR and MW)" to --write ($\overline{MR}$ and $\overline{MW}$)--;

Column 11, line 35, change "the regulator power source" to
   --the regular power source--;

Column 13, line 68, change "circuit of a plurality" to --circuit of
   FIG. 7B. (New paragraph)A plurality--;

Column 76, line 52, change "actual and producing" to --actual value
   and producing--;

Column 79, line 47, change "for comprising the data" to --for comparing
   the data--.

Signed and Sealed this

Thirteenth Day of September 1983

[SEAL]

Attest:

GERALD J. MOSSINGHOFF

Attesting Officer

Commissioner of Patents and Trademarks